(12) United States Patent
Schulte et al.

(10) Patent No.: US 7,597,331 B2
(45) Date of Patent: Oct. 6, 2009

(54) RECONFIGURABLE WHEELED VEHICLE

(75) Inventors: Anthony G. Schulte, East Aurora, NY (US); Ross Rumfola, III, Akron, NY (US)

(73) Assignee: Mattel, Inc., El Segundo, CA (US)

( * ) Notice: Subject to any disclaimer, the term of this patent is extended or adjusted under 35 U.S.C. 154(b) by 265 days.

(21) Appl. No.: 11/502,632

(22) Filed: Aug. 11, 2006

(65) Prior Publication Data
US 2007/0052199 A1 Mar. 8, 2007

Related U.S. Application Data

(60) Provisional application No. 60/707,528, filed on Aug. 12, 2005.

(51) Int. Cl.
B62M 1/02 (2006.01)
B62K 13/02 (2006.01)
(52) U.S. Cl. ................. 280/7.15; 280/259; 280/7.1; 280/7.14
(58) Field of Classification Search ........... 280/7.15, 280/259, 7.1, 7.14
See application file for complete search history.

(56) References Cited

U.S. PATENT DOCUMENTS

| 1,395,552 | A |   | 11/1921 | Bridges |  |
|---|---|---|---|---|---|
| 2,209,058 | A | * | 7/1940 | Johnson | ................. 280/7.15 |
| 2,212,741 | A |   | 8/1940 | Johnson |  |
| 2,451,665 | A |   | 10/1948 | Bartolomeo |  |
| 2,458,127 | A |   | 1/1949 | Ahrens |  |
| 2,541,952 | A |   | 2/1951 | Williams |  |
| 2,591,534 | A |   | 4/1952 | Gallo et al. |  |
| 2,995,378 | A |   | 8/1961 | Whetstone |  |
| 3,258,273 | A |   | 6/1966 | Matthews |  |
| 3,368,823 | A |   | 2/1968 | Templeton |  |
| 3,532,351 | A | * | 10/1970 | Kaufman | ................. 280/7.15 |
| 3,658,354 | A |   | 4/1972 | Read |  |
| 5,133,569 | A |   | 7/1992 | Rieber et al. |  |
| 5,556,116 | A |   | 9/1996 | Sloss et al. |  |
| D392,343 | S |   | 3/1998 | Sloss |  |
| 6,164,666 | A |   | 12/2000 | Prea |  |
| 6,769,708 | B2 | * | 8/2004 | Ackerly | ................. 280/295 |

* cited by examiner

*Primary Examiner*—Lesley D. Morris
*Assistant Examiner*—Marlon A Arce
(74) *Attorney, Agent, or Firm*—Edell, Shapiro & Finnan, LLC

(57) ABSTRACT

The present invention relates to a unique convertible ride-on vehicle. The ride-on vehicle of the present invention includes at least one font wheel, at least two rear wheels mounted on a rear axle, a frame supported by the at least one front wheel and the at least two rear wheels, a torque input mechanism, a torque transfer mechanism for transferring torque from the torque input mechanism to the rear wheels. The ride-on vehicle of the present invention is convertible between a first, tricycle configuration in which the rear wheels are spaced apart on the rear axle and a second, bicycle configuration in which the rear wheels are in close proximity to each other. Finally, the present application discloses a clean, simple method and apparatus for adjusting the tension of a chain or belt utilized to drive a ride-on vehicle.

15 Claims, 49 Drawing Sheets

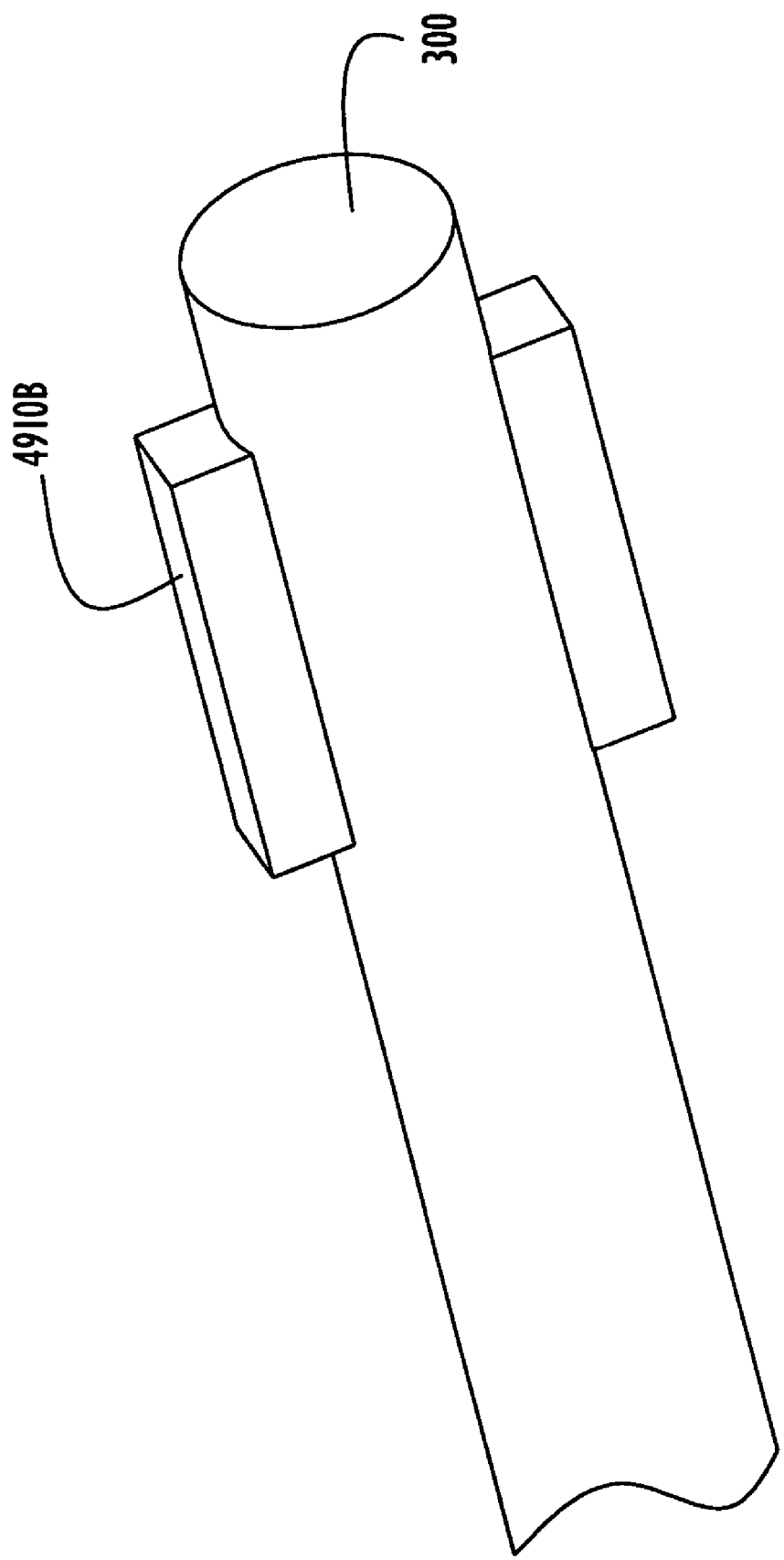

RECONFIGURABLE WHEELED VEHICLE

CROSS-REFERENCE TO RELATED APPLICATIONS

This application claims priority from U.S. Provisional Patent Application Ser. No. 60/707,528, entitled "Trike to Bike" and filed Aug. 12, 2005. The disclosure of the above-mentioned provisional application is incorporated herein by reference in its entirety.

SUMMARY OF THE INVENTION

Generally, the present invention relates to a children's ride-on vehicle convertible from a training configuration to a more experienced rider configuration. More specifically, the present invention relates to a ride-on vehicle that is adapted to evolve between a tricycle configuration and a bicycle configuration. Tricycles exist for use by young children. For older children, bicycles, optionally fitted with stabilizing side wheels (a.k.a. "training wheels") also exist. The present invention provides a solution to the new problem of adaptability and interchangeability of cycles, notably cycles for use by children.

As the motor skills of children develop, parents who purchased a tricycle are obliged to then fairly quickly purchase a bicycle fitted with removable stabilizing training wheels. Apart from the problem of cost, a learning problem may arise due to the physical change between a tricycle and a different bicycle product. The apparatus of the instant invention comprises an attachment which may be manufactured in at least two forms and utilized to convert a tricycle into a bicycle for use by a child in converting from a standard tricycle to a bicycle, the converted tricycle of the instant invention being designed for use by a child during the transition period between his riding a tricycle and his riding a conventional bicycle.

Thus, the present invention not only provides a two-wheeled ride-on vehicle for use by a small child in learning to ride a conventional bicycle, but does so in a conventional tricycle-type ride-on vehicle with a frame and feel with which the child is basically familiar and accustomed to. Also, a tricycle converted in accordance with the present invention produces an extremely low bicycle-type ride-on vehicle which may be readily handled by a small child with assurance that he will not fall from the greater height at which he would be riding if he was riding even a small bicycle of conventional design. A parent may convert his child's tricycle into a bicycle with a nominal effort and ultimately delay the greater expenditure involved in the purchase of a conventional bicycle until such time as the child has mastered riding the converted tricycle, at which time the child may easily make the transition to a conventional bicycle.

Further, in one form of the invention to be illustrated and described hereinafter more fully, a tricycle may be converted into a bicycle-like riding configuration in accordance with the present invention and thereafter back into a tricycle for use by younger children after an older child has mastered riding the converted tricycle and has been given a conventional bicycle. Additionally, the present invention may also be utilized in converting a tricycle once converted into a bicycle-like riding configuration back into a tricycle for use by younger children or further use by a child deemed not ready for the transition to a bicycle. Finally, the present invention incorporates a clean, simple method and apparatus for adjusting the tension of a chain or belt utilized to drive the children's ride-on vehicle of the present invention.

BRIEF DESCRIPTION OF THE DRAWINGS

FIG. 49 illustrates a close-up view of torque projections extending from the rear axle of the children's ride-on vehicle of FIG. 32.

Like reference numerals have been used to identify like elements throughout this disclosure.

DETAILED DESCRIPTION OF THE INVENTION

In accordance with the present invention, a children's ride-on vehicle is disclosed. The children's ride-on vehicle of the present invention is convertible from a training configuration to a more experienced rider configuration.

Figure 1:
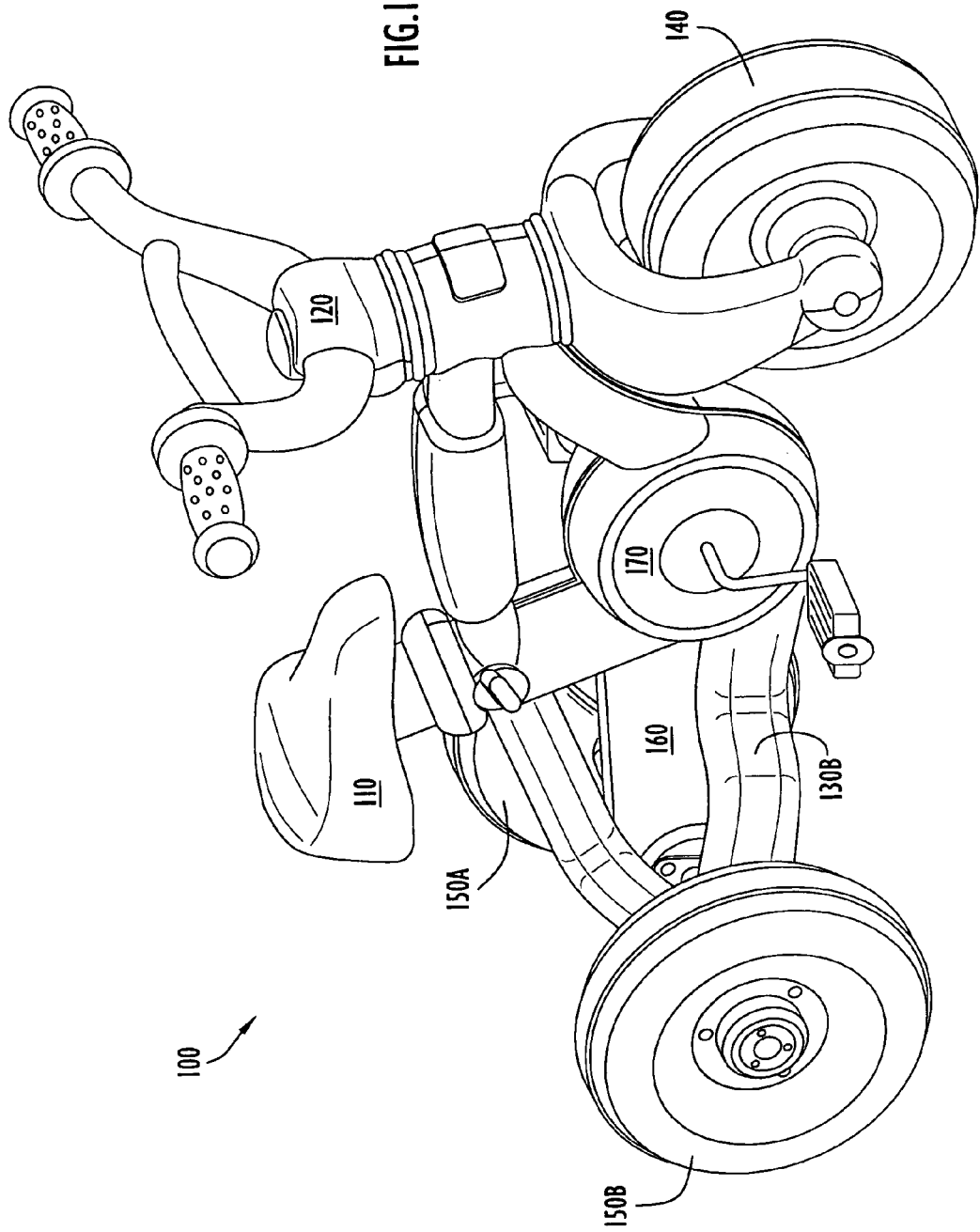
FIG. 1 illustrates a perspective view of a children's ride-on vehicle in accordance with an embodiment of the present invention, with the children's ride-on vehicle configured in a first, stabilized riding position.

FIG. 1 illustrates a perspective view of a children's ride-on vehicle 100 in accordance with an embodiment of the present invention. In the view shown, the children's ride-on vehicle 100 is configured in a first, stabilized riding position. In the first, stabilized riding position, the rear wheels 150A, 150B of the ride-on vehicle 100 are spaced apart on the rear axle in a tricycle configuration. The children's ride-on vehicle 100 of the present invention includes a seat 110, a steering assembly 120, frame members 130A, 130B, a front wheel 140, rear wheels 150A, 150B, a crankcase 160, and a crank/pedal assembly 170.

Figure 2:
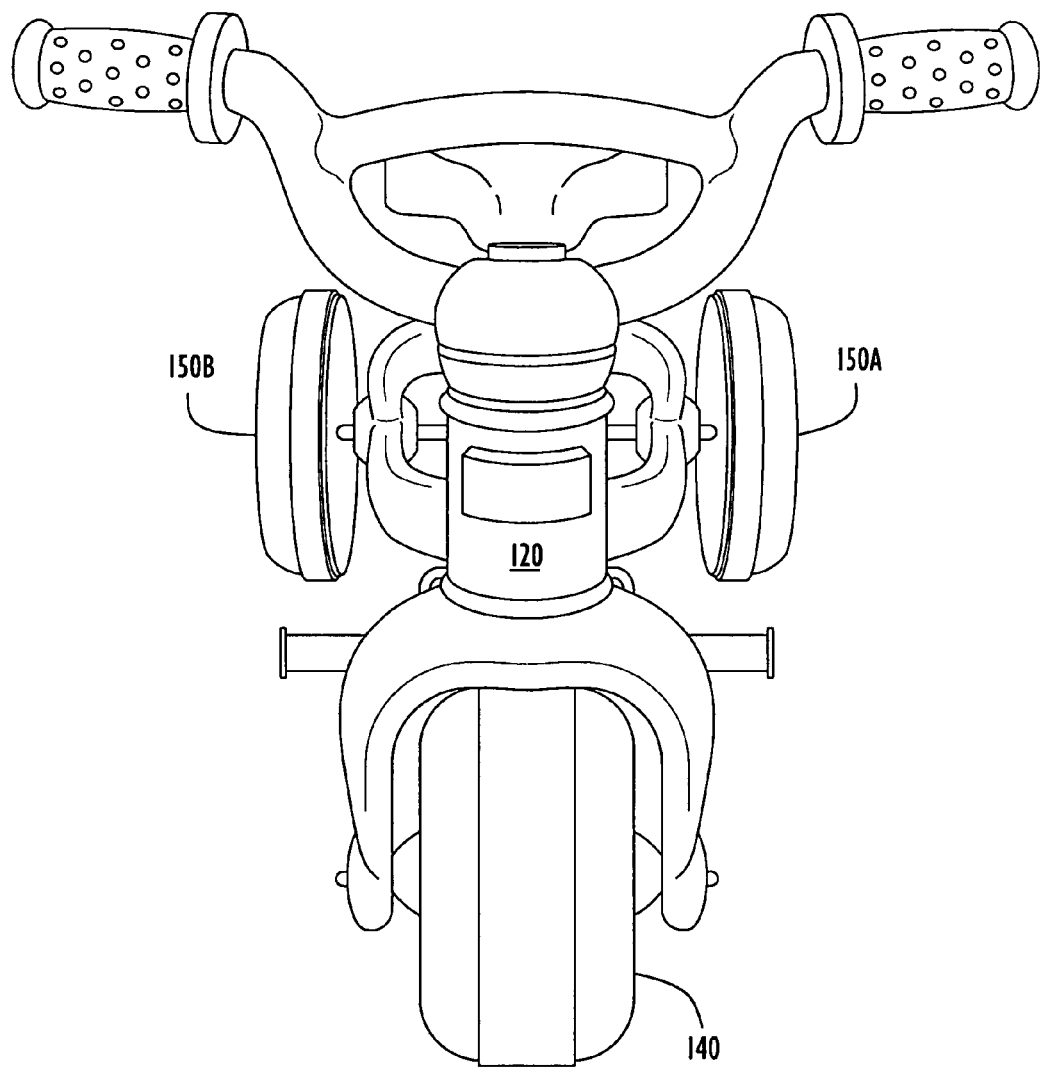
FIG. 2 illustrates a front view of the children's ride-on vehicle of FIG. 1.
Figure 3:
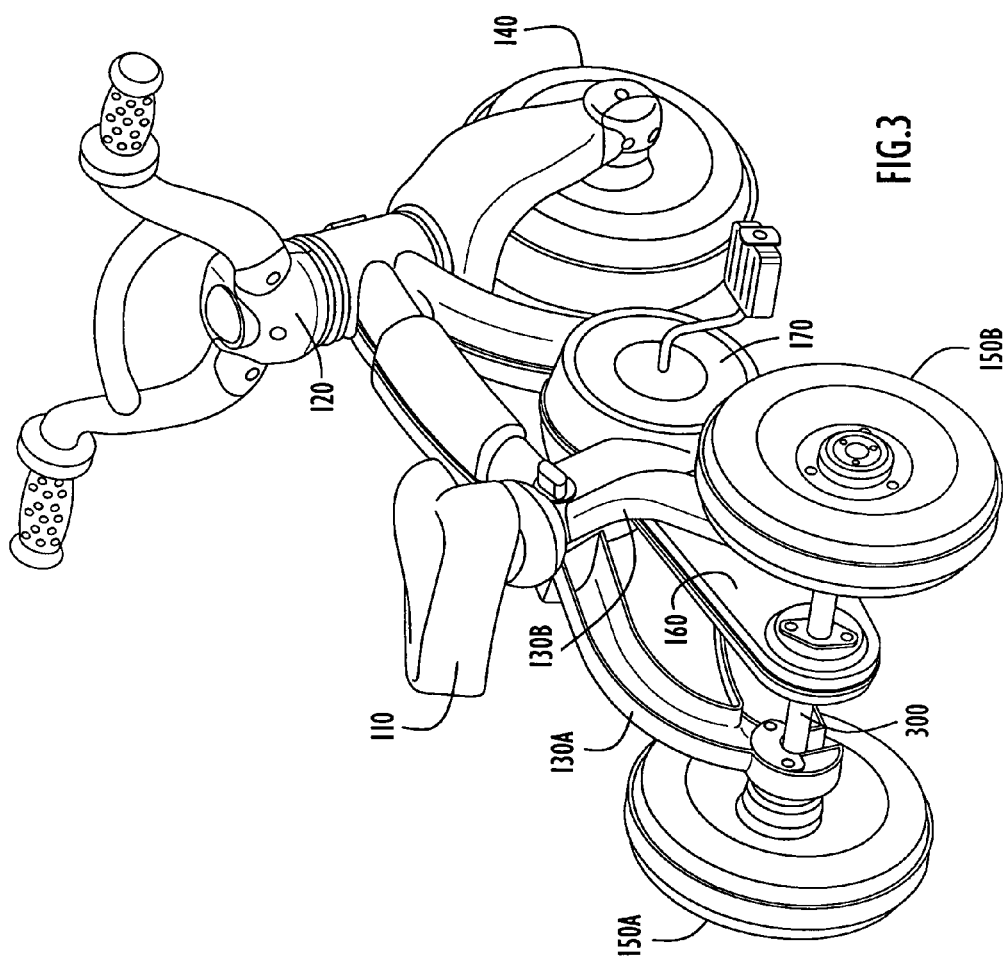
FIG. 3 illustrates a rear perspective view of the children's ride-on vehicle of FIG. 1.

FIG. 2 illustrates a front view of the children's ride-on vehicle 100 of FIG. 1. As illustrated, in this, the first, stabilized riding position, the rear wheels 150A, 150B of the ride-on vehicle 100 are spaced apart on the rear axle in a tricycle configuration. FIG. 3 illustrates a rear perspective view of the children's ride-on vehicle 100 of FIG. 1 in the first, stabilized riding position. As shown, the rear wheels 150A, 150B of the ride-on vehicle 100 are spaced apart along the rear axle 300 in a conventional tricycle configuration. In this, first, stabilized riding position, the rear wheels 150A, 150B of the ride-on vehicle 100 are also spaced apart (along the rear axle 300) from the crankcase 160.

Figure 4:
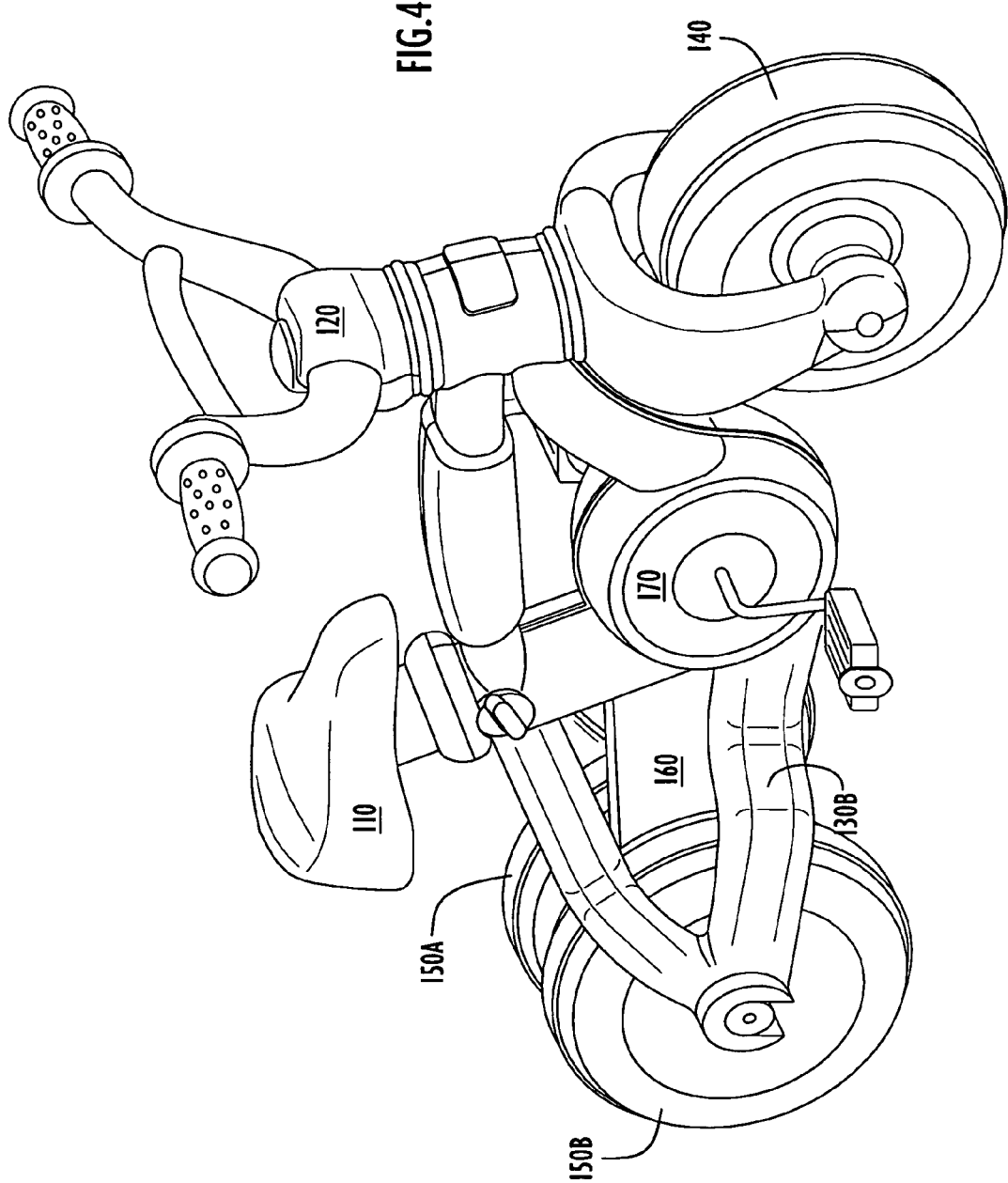
FIG. 4 illustrates a perspective view of a children's ride-on vehicle in accordance with an embodiment of the present invention, with the children's ride-on vehicle configured in a second, bicycle-like riding position.

FIG. 4 illustrates a perspective view of a children's ride-on vehicle 100 in accordance with an embodiment of the present invention, with the children's ride-on vehicle 100 configured in a second, bicycle-like riding configuration. In the second, bicycle-like riding configuration, the two rear wheels 150A, 150B of the ride-on vehicle 100 are positioned in close proximity to the crankcase 160 and to each other. This configuration allows a child to experience a riding configuration that is somewhat less stable (more challenging) than the first, stabilized riding position (described above), but is somewhat more stable than a conventional bicycle configuration (with perfectly aligned front and back wheels).

Figure 5:
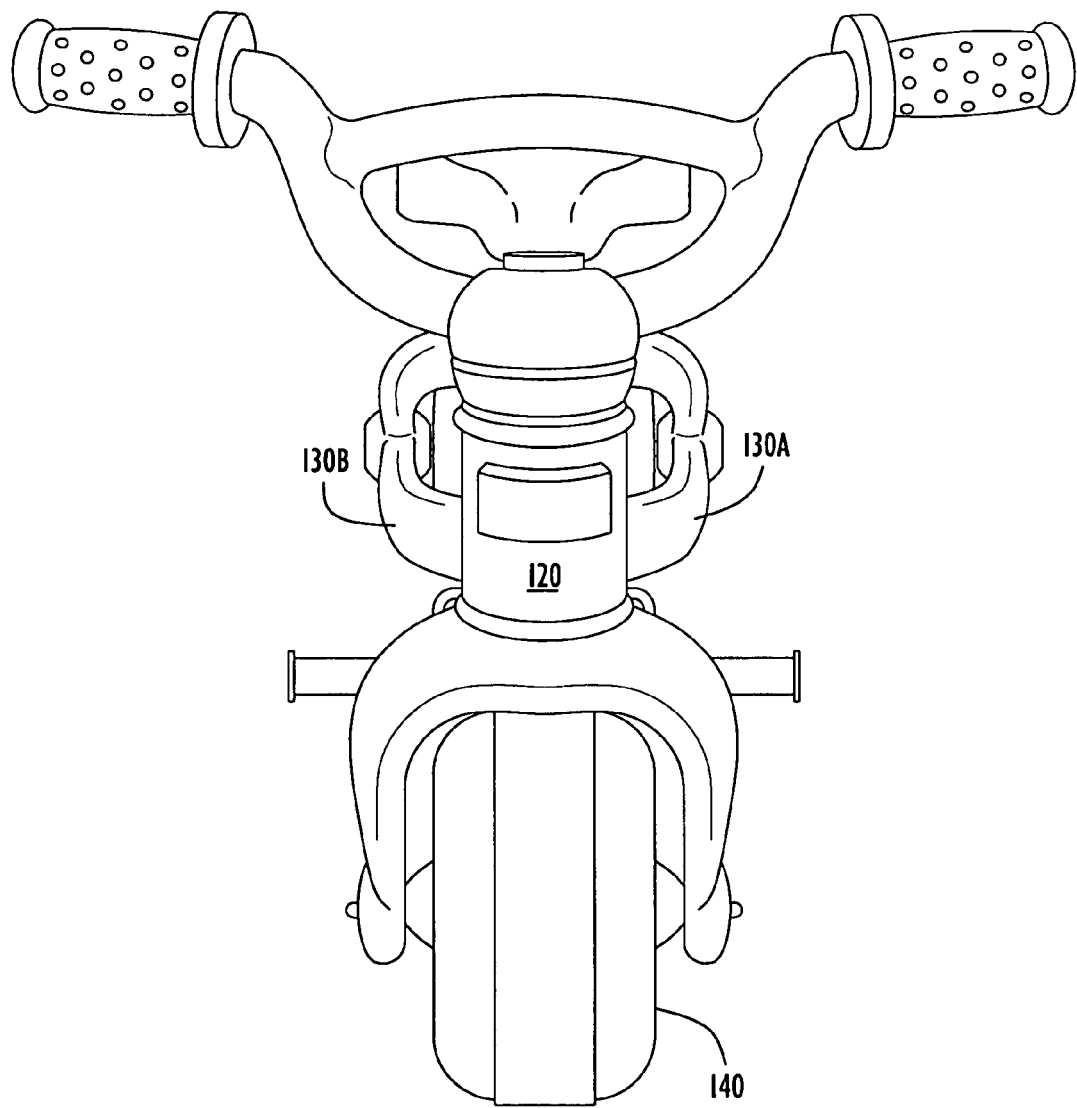
FIG. 5 illustrates a front view of the children's ride-on vehicle of FIG. 4.
Figure 6:
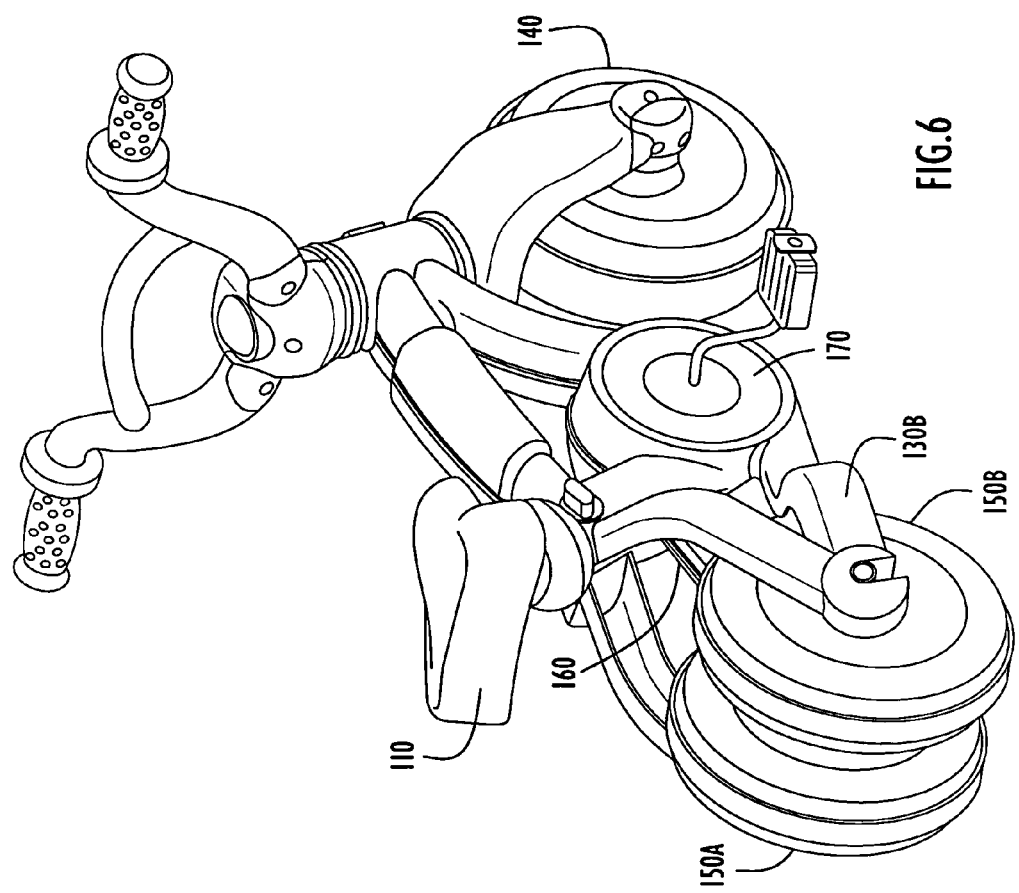
FIG. 6 illustrates a rear perspective view of the children's ride-on vehicle of FIG. 4.

FIG. 5 illustrates a front view of the children's ride-on vehicle 100 of FIG. 4. FIG. 6 illustrates a rear perspective view of the children's ride-on vehicle 100 of FIG. 4. Again, in this, second, bicycle-like riding configuration, the two rear wheels 150A, 150B of the ride-on vehicle 100 are positioned in close proximity to the crankcase 160 and to each other. Also, the two rear wheels 150A, 150B of the ride-on vehicle 100 are positioned inside of frame members 130A, 130B (as opposed to outside of respective frame members 130A, 130B as shown in the first, stabilized riding position of FIGS. 1-3).

Figure 7:
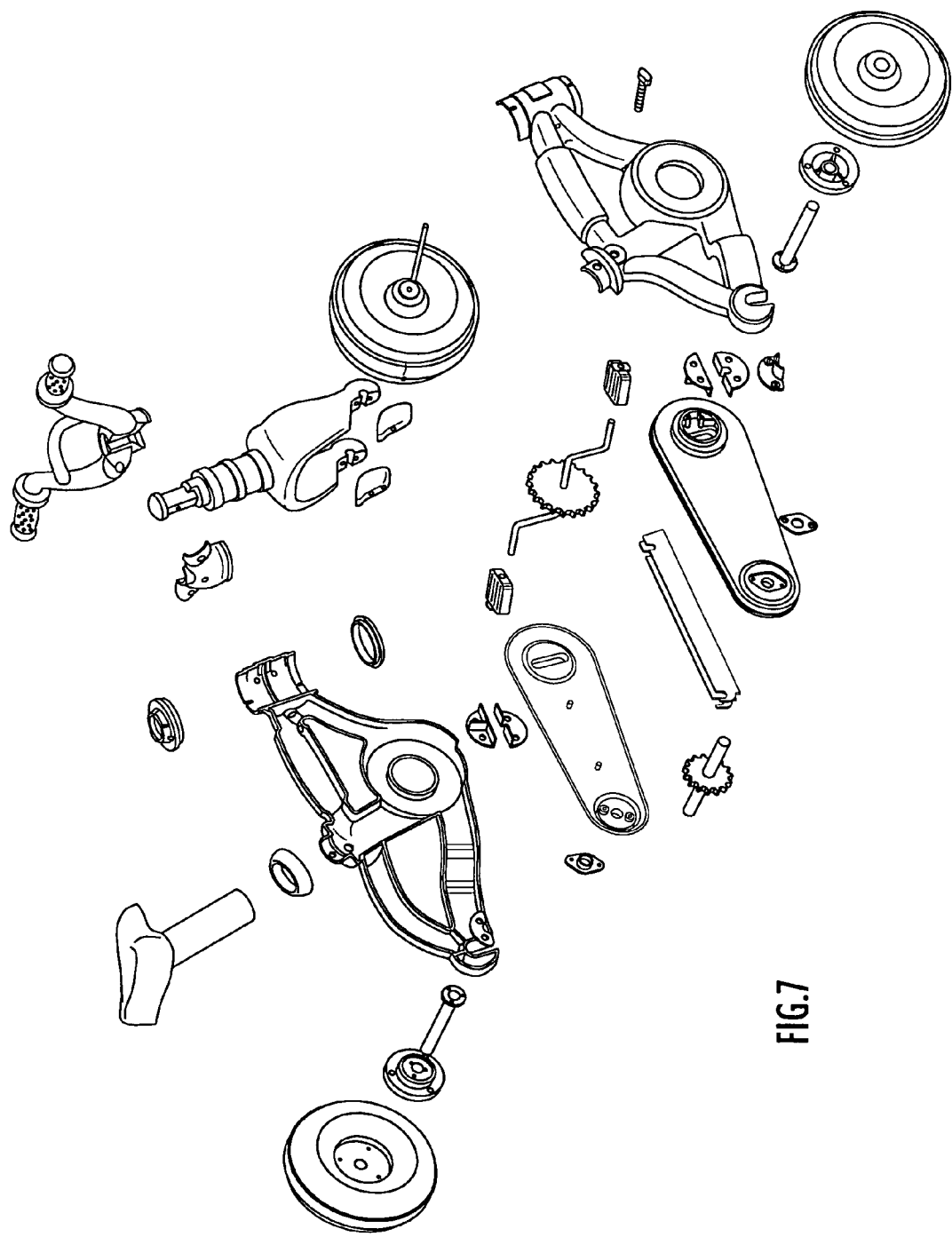
FIG. 7 illustrates an exploded view of a children's ride-on vehicle in accordance with an embodiment of the present invention.
Figure 8:
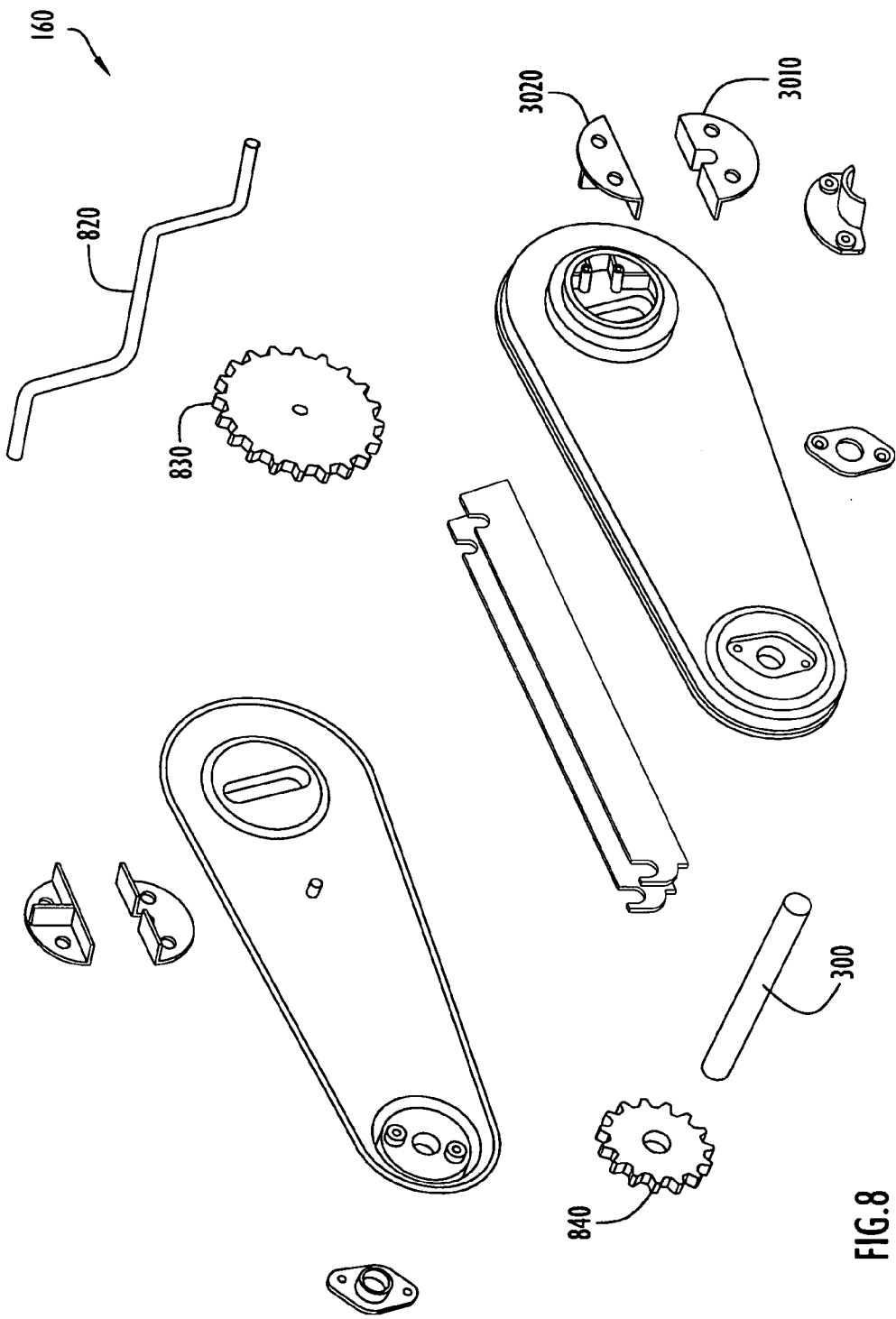
FIG. 8 illustrates an exploded view of the crankcase assembly of a children's ride-on vehicle in accordance with an embodiment of the present invention.

FIG. 7 illustrates an exploded view of a children's ride-on vehicle 100 in accordance with an embodiment of the present invention. Although not shown herein, the crankcase 160 includes a chain or belt that connects the pedal sprocket/axle ("crank") to the sprocket mounted on the rear axle 300. Thus, when a child pedals the crank, the sprocket mounted on the rear axle 300 is driven by the chain/belt to turn the rear axle 300 and the rear wheels 150A, 150B mounted thereto. FIG. 8 illustrates an exploded view of the crankcase assembly 160 of a children's ride-on vehicle 100 in accordance with an embodiment of the present invention. During conversion between its stabilized mode and its bicycle-like mode, the crankcase assembly of the children's ride-on vehicle 100 pivots relative to frame members 130A, 130B while maintaining the pedal crank axle 820 a constant distance from the rear axle 300. The ability of the crank case assembly 160 to pivot about the pedal crank axle 820 will be discussed below.

Figure 9:
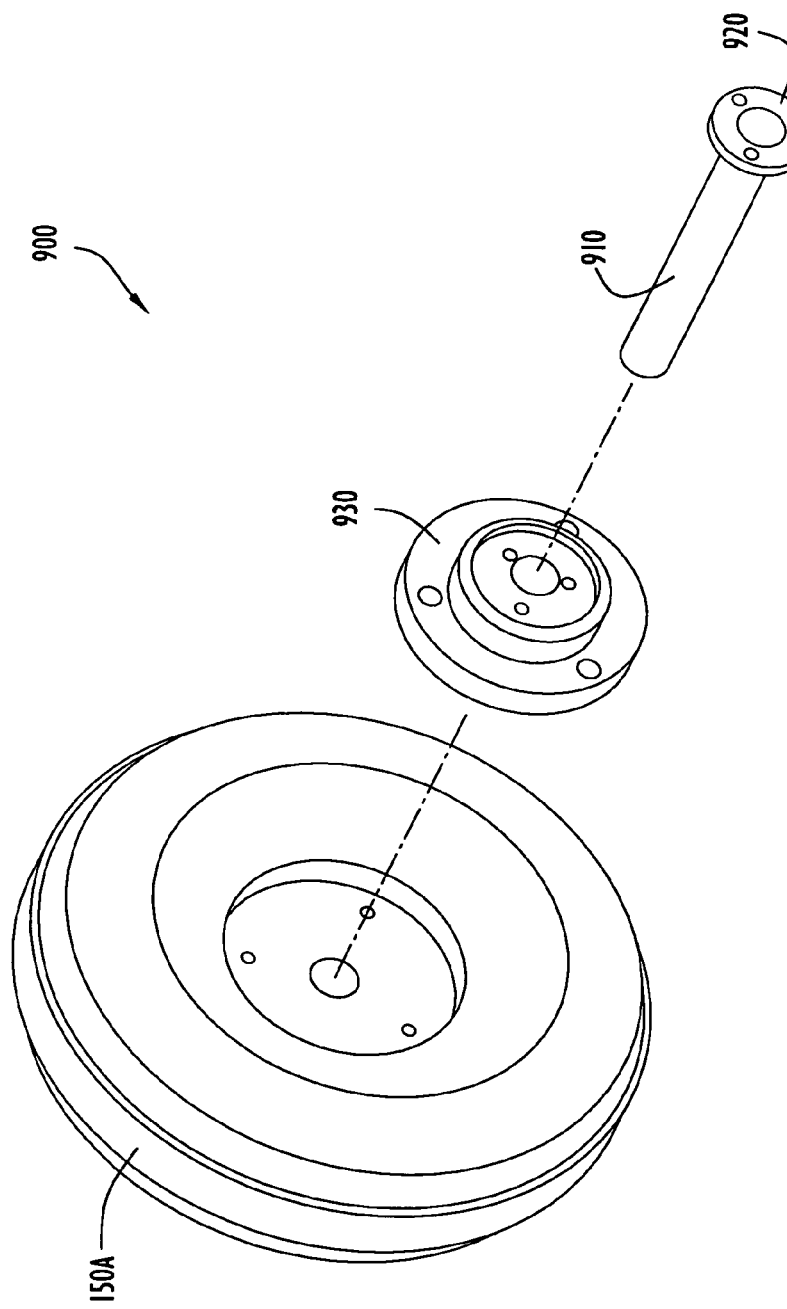
FIG. 9 illustrates an exploded view of one of the rear wheel assemblies of a children's ride-on vehicle in accordance with an embodiment of the present invention.

FIG. 9 illustrates an exploded view of one of the rear wheel assemblies 900 of a children's ride-on vehicle in accordance with an embodiment of the present invention. Each rear wheel assembly 900 includes a rear wheel 150A/150B, a rear wheel hub 930 and a stub axle 910. Each stub axle 910 includes a flange 920 adapted to mount the stub axle 910 to the rear wheel hub 930 and ultimately to the rear wheel 150A/150B.

Figure 10:
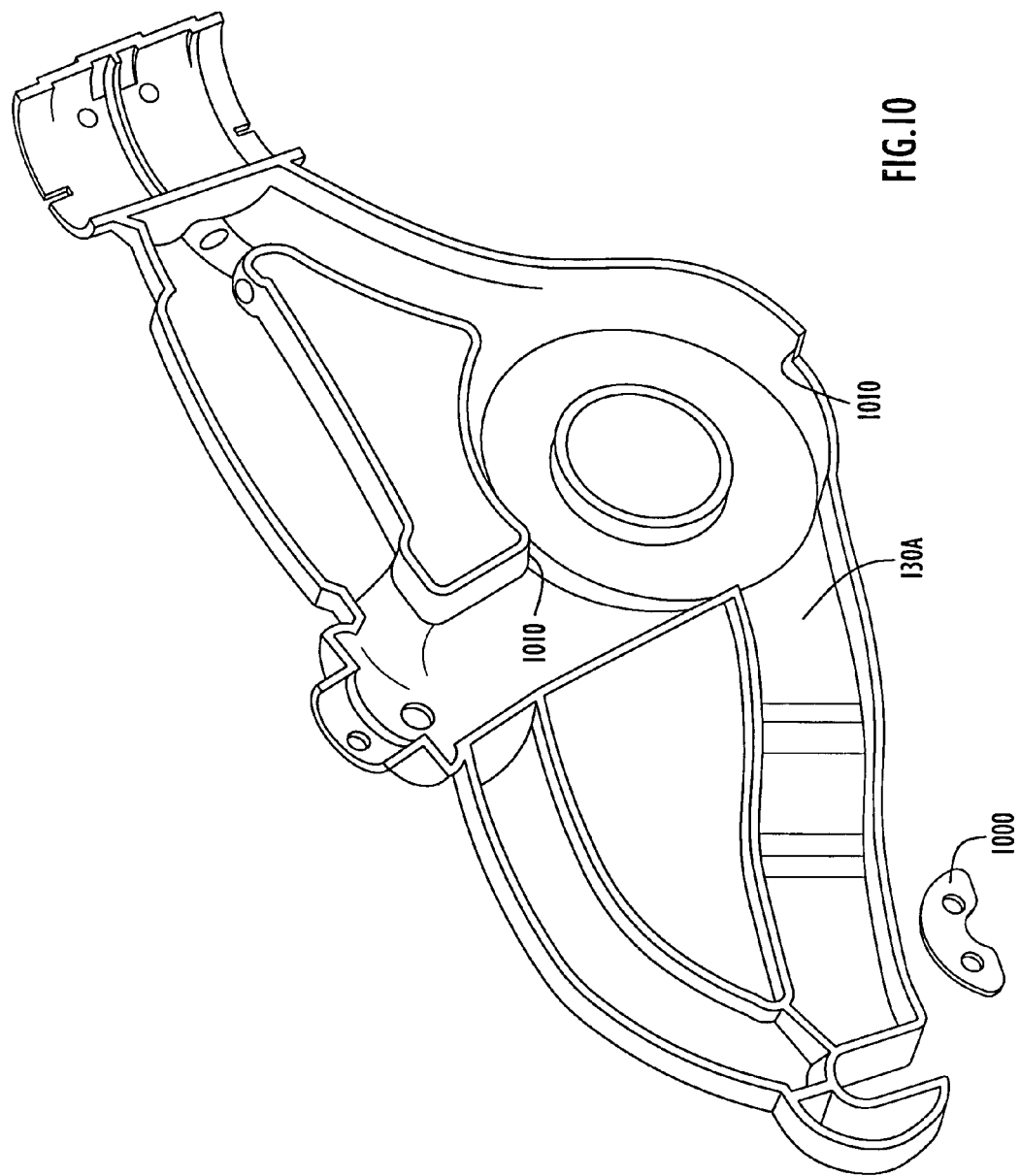
FIG. 10 illustrates an exploded view of one of the rear axle bushings and frame members of a children's ride-on vehicle in accordance with an embodiment of the present invention.
Figure 11:
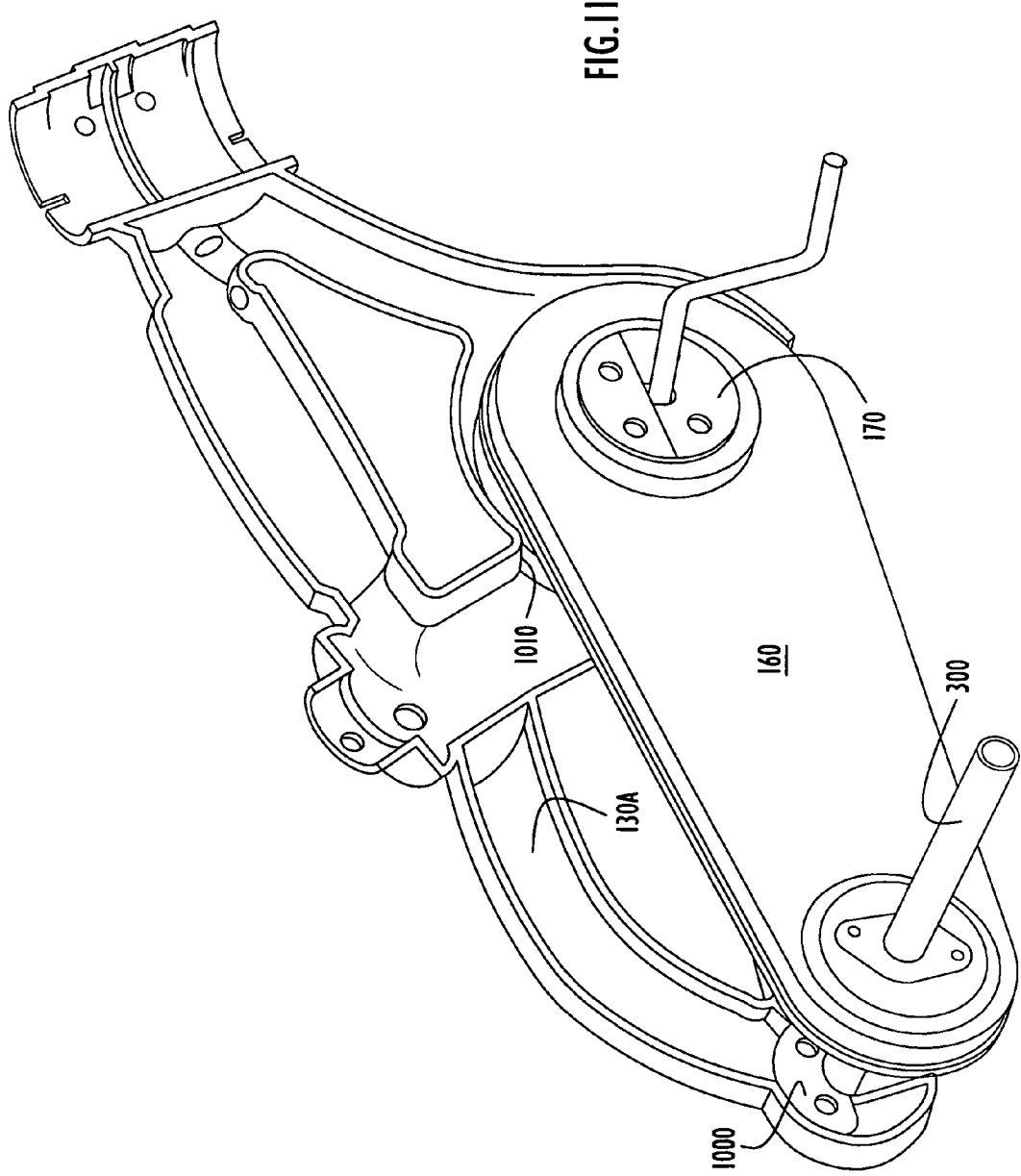
FIG. 11 illustrates a cut-away view showing the attachment of the crankcase to one of the frame members on a children's ride-on vehicle in accordance with an embodiment of the present invention.

FIG. 10 illustrates an exploded view of one of the rear axle bushings 1000 and one of the frame members 130A of the children's ride-on vehicle 100 of the present invention. Each rear axle bushing 1000 is attached to one of the frame members 130A, 130B and is adapted to rotationally receive the rear axle 300 of the children's ride-on vehicle 100. As shown, and as described below, each of the frame members 130A, 130B includes a cut-out portion 1010 (notches) which allows the frame members 130A, 130B to be rotated with respect to the crankcase assembly 160. FIG. 11 illustrates a cut away view showing the attachment of the crankcase 160 to one of the frame members 130A on a children's ride-on vehicle 100 of the present invention.

Figure 12:
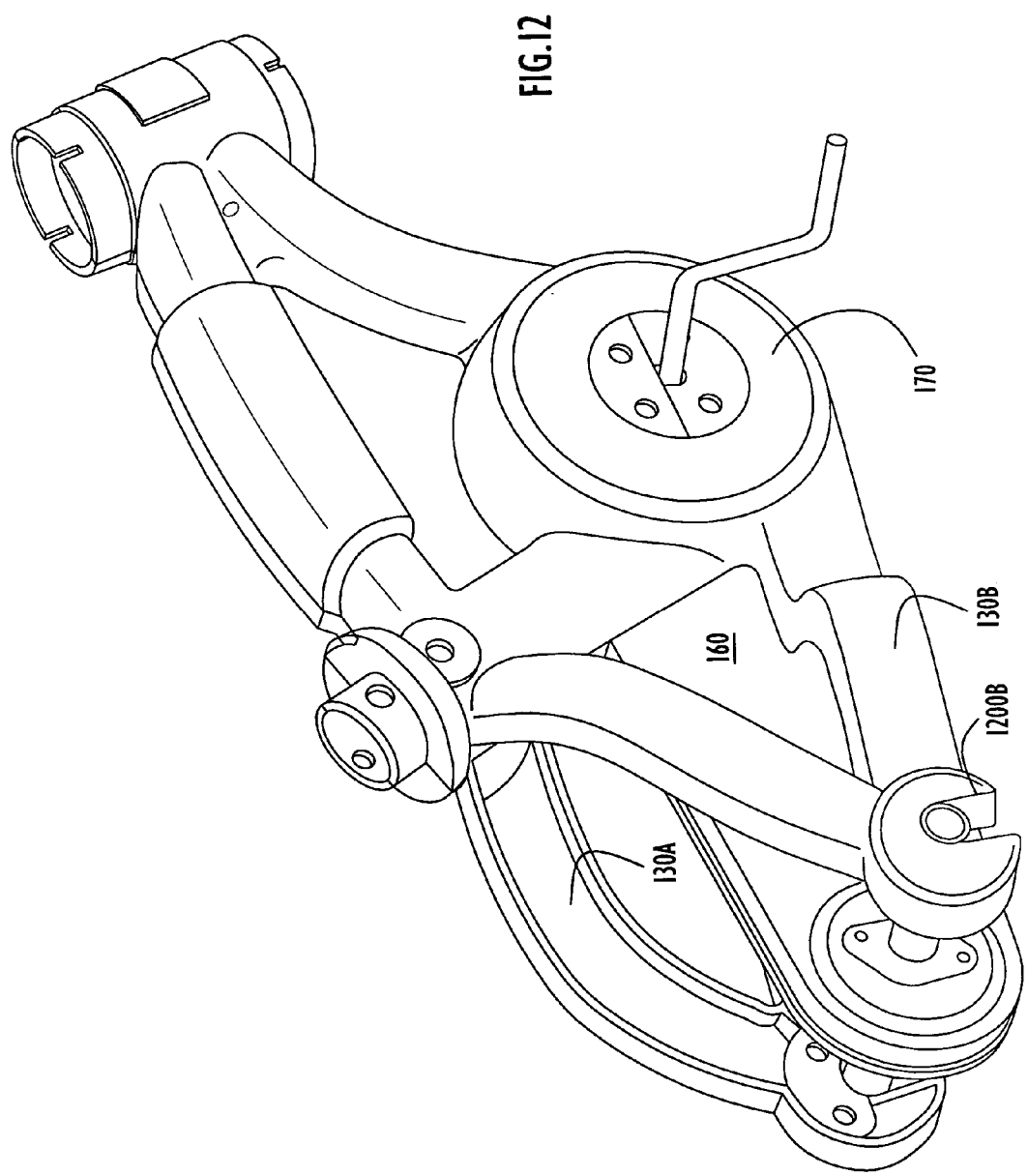
FIG. 12 illustrates a perspective view of the attachment of frame members to the crankcase on a children's ride-on vehicle in accordance with an embodiment of the present invention.

FIG. 12 illustrates a perspective view of the attachment of frame members 130A, 130B to the crankcase 160 on a children's ride-on vehicle 100 in accordance with an embodiment of the present invention. As shown, each of the frame members 130A, 130B includes a slot 1200A, 1200B to receive the ends of rear axle 300. The slots 1200A, 1200B also allow the crankcase 160 and rear axle 300 to pivot into an out of engagement with the frame members 130A, 130B. As discussed above, the crankcase assembly 160 maintains a constant distance between the pedal crank axle 820 and the rear axle 300. The crank case assembly 160 pivots about the pedal crank axle 820 during conversion between vehicle modes. Pivoting about the pedal crank axle 820 allows the rear axle 300 to swing toward and away from the frame members 130A, 130B so that the rear axle 300 swings into and out of the slots 1200A, 1200B of the frame members 130A, 130B about the pedal crank axle 820.

Figure 13:
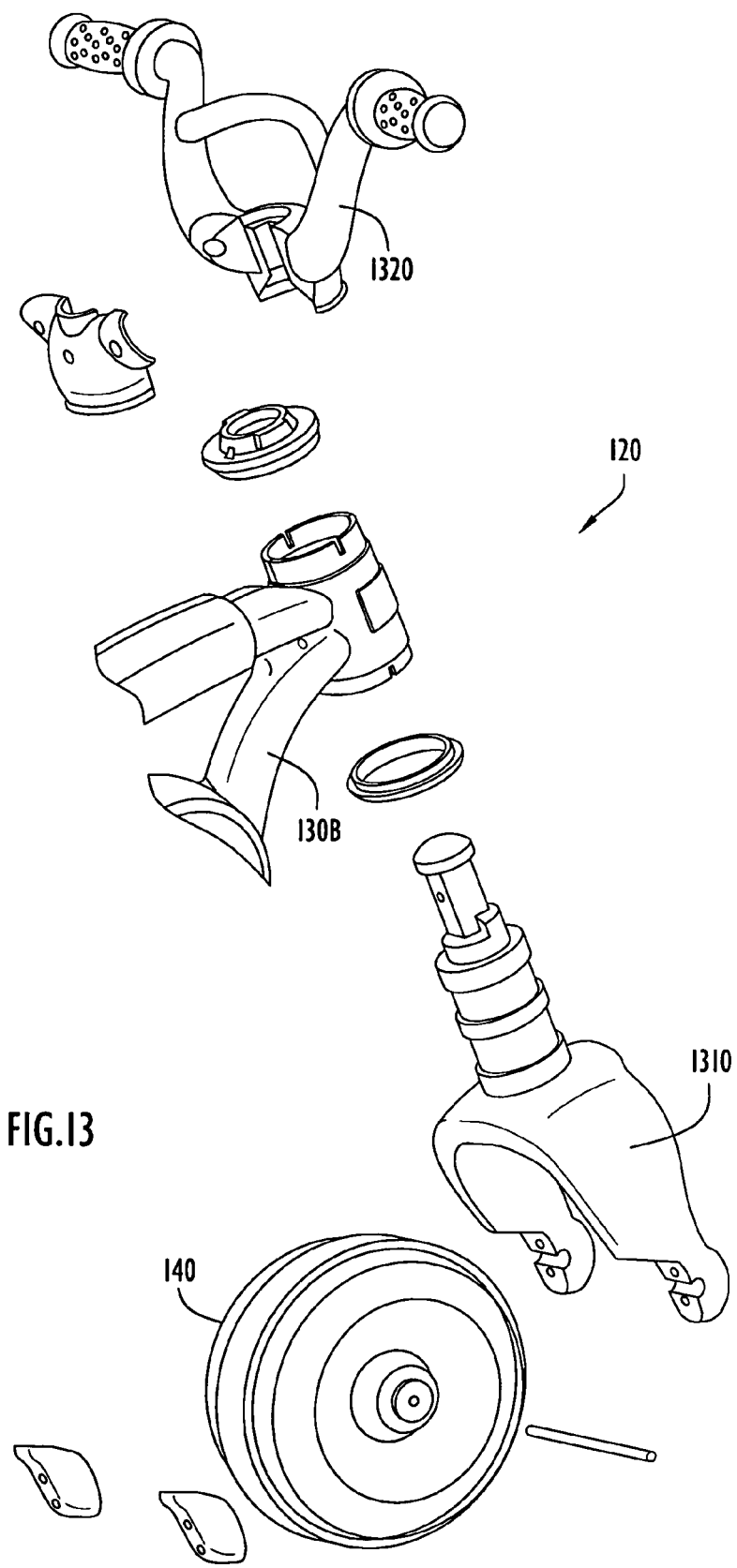
FIG. 13 illustrates an exploded view of the front steering assembly of a children's ride-on vehicle in accordance with an embodiment of the present invention.

FIG. 13 illustrates an exploded view of the front steering assembly 120 of a children's ride-on vehicle 100 in accordance with an embodiment of the present invention. The front steering assembly 120 includes front fork 1310 and handlebars 1320. The front fork 1310 is adapted to receive font wheel 140.

Figure 14:
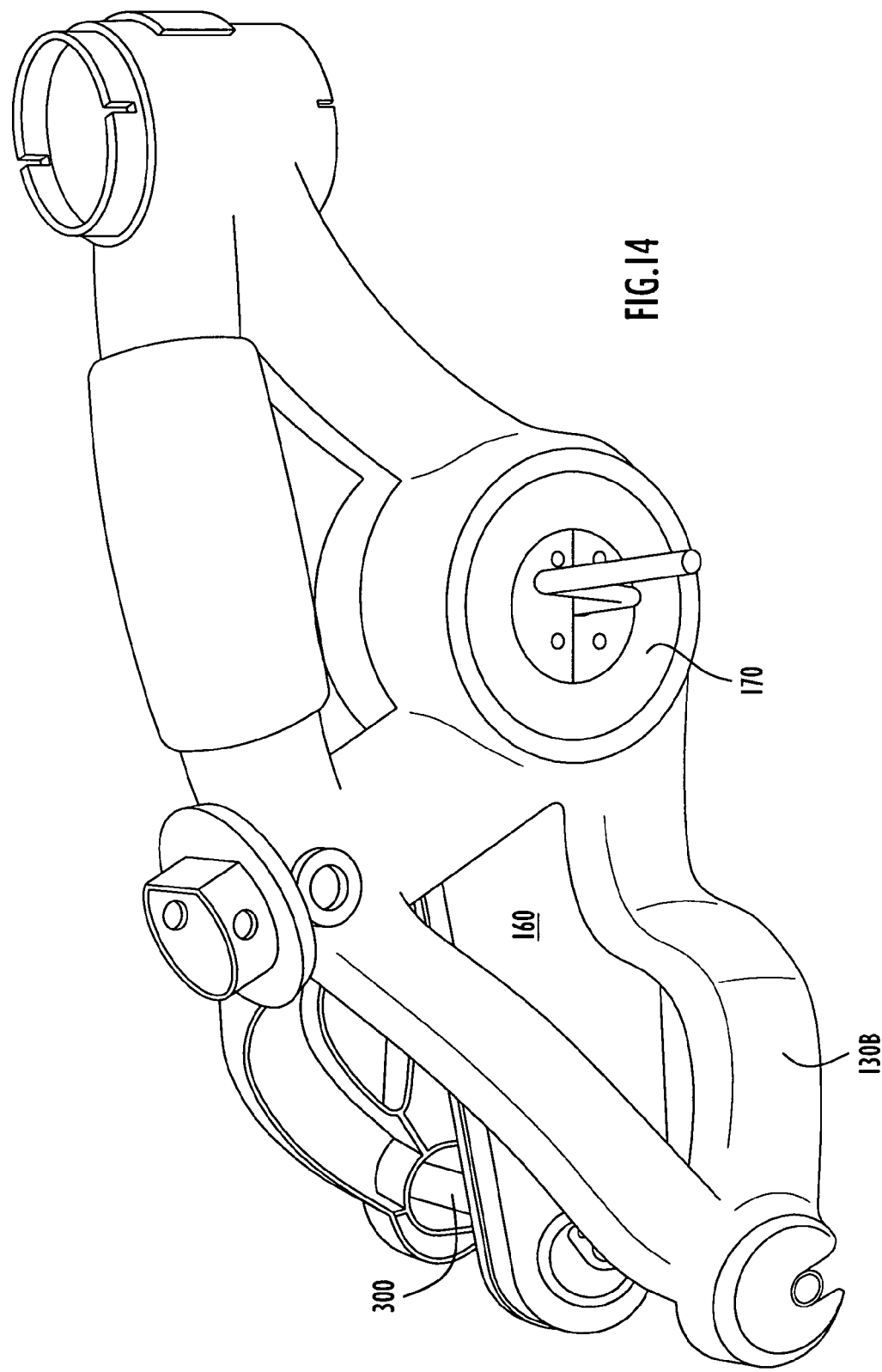
FIG. 14 illustrates an isolated perspective view of the frame members, crankcase, rear axle, and pedal axle ("crank") of a children's ride-on vehicle in accordance with an embodiment of the present invention.
Figure 15:
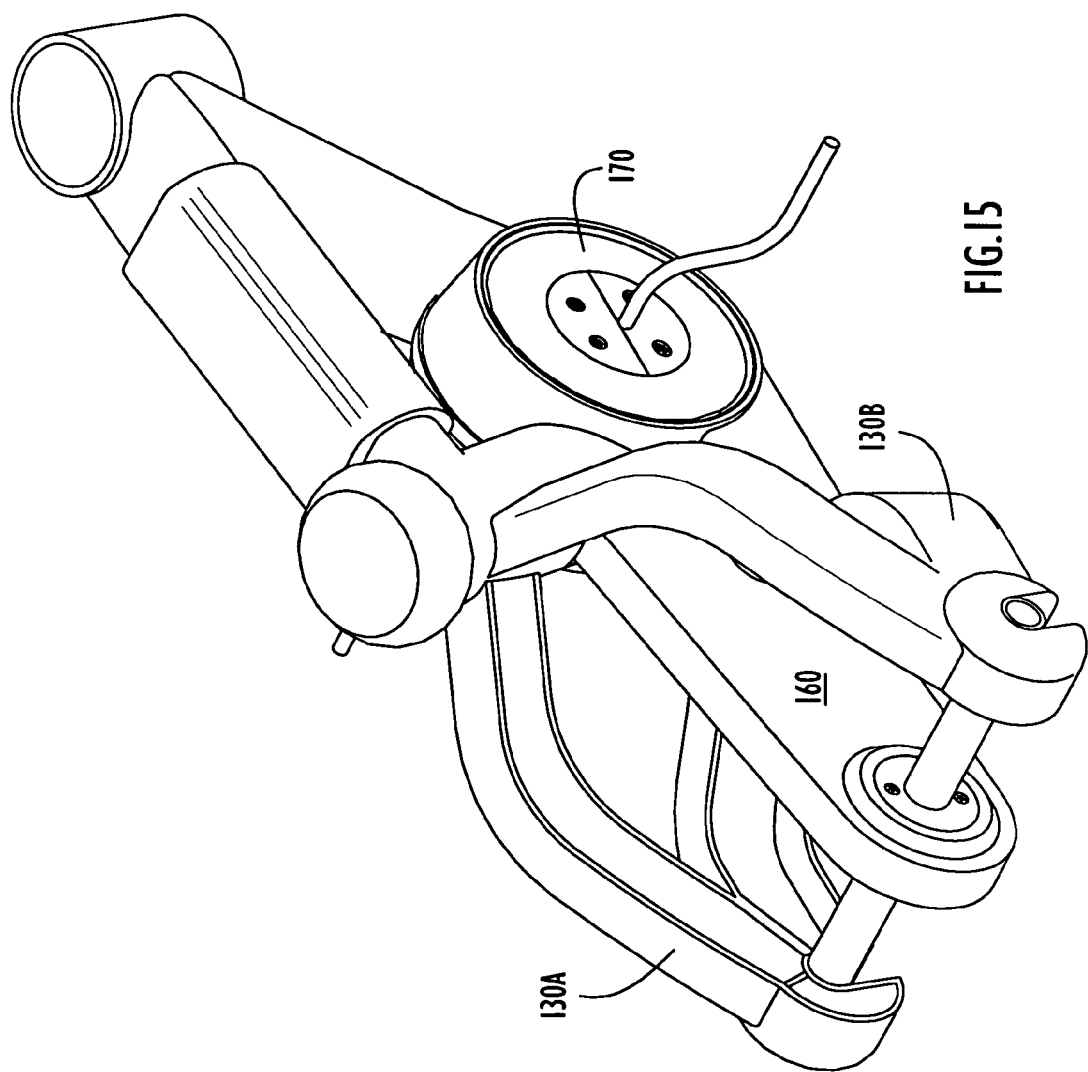
FIG. 15 illustrates a rear perspective view of the children's ride-on vehicle of FIG. 14.

FIG. 14 illustrates an isolated perspective view of the frame members 130A, 130B, crankcase 160, rear axle 300, and pedal axle ("crank") of a children's ride-on vehicle 100 in accordance with an embodiment of the present invention. FIG. 15 illustrates a rear isolated perspective view of the children's ride-on vehicle 100 of FIG. 14.

Figure 16:
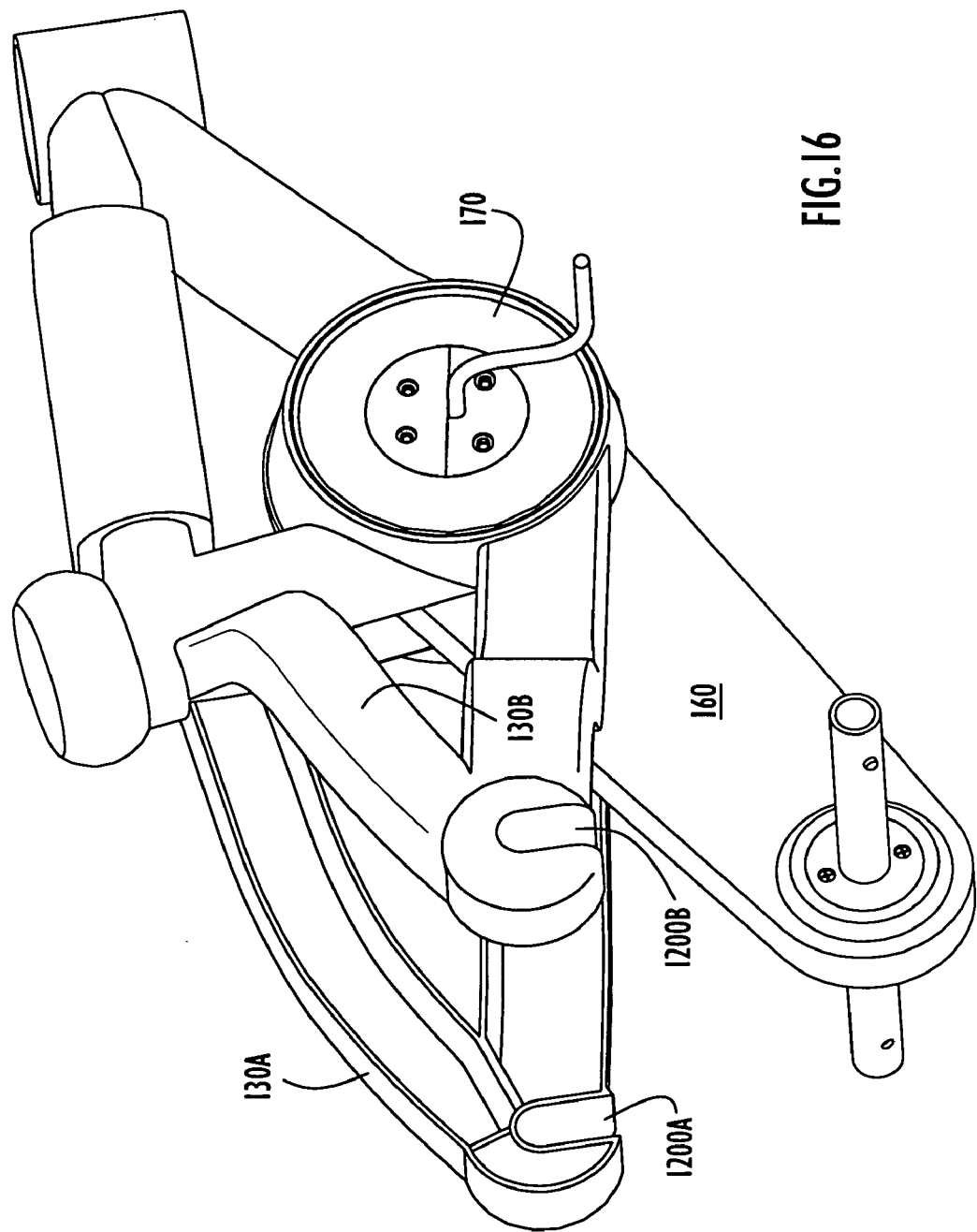
FIG. 16 illustrates a rear perspective view of the children's ride-on vehicle of FIG. 14 in a position in which the frame is rotated away from the crankcase and rear axle.

FIG. 16 illustrates a rear isolated perspective view of the children's ride-on vehicle 100 of FIG. 14 in a position in which the frame members 130A, 130B are rotated away from the crankcase 160 and rear axle 300. Thus a user can reconfigure the ride-on vehicle 100 from the first, stabilized riding configuration of FIGS. 1-3 to the second, bicycle-like riding configuration of FIGS. 4-6 by rotating the frame members 130A, 130B away from the crankcase 160 and rear axle 300 and reconfiguring the rear wheel assemblies 900 as described in detail below.

Figure 17:
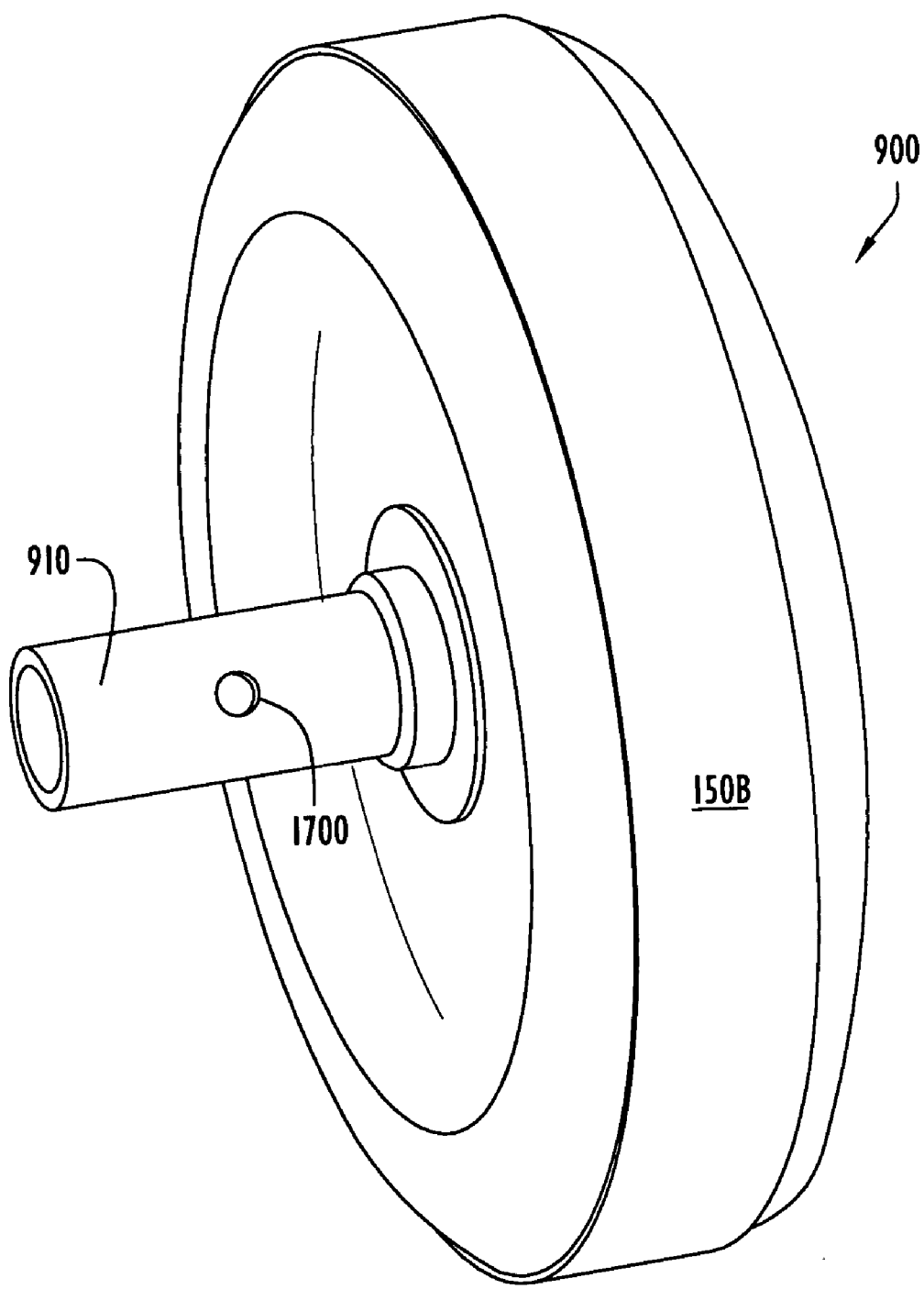
FIG. 17 illustrates a rear isolated perspective view of one of the rear wheel assemblies of a children's ride-on vehicle in accordance with an embodiment of the present invention.
Figure 18:
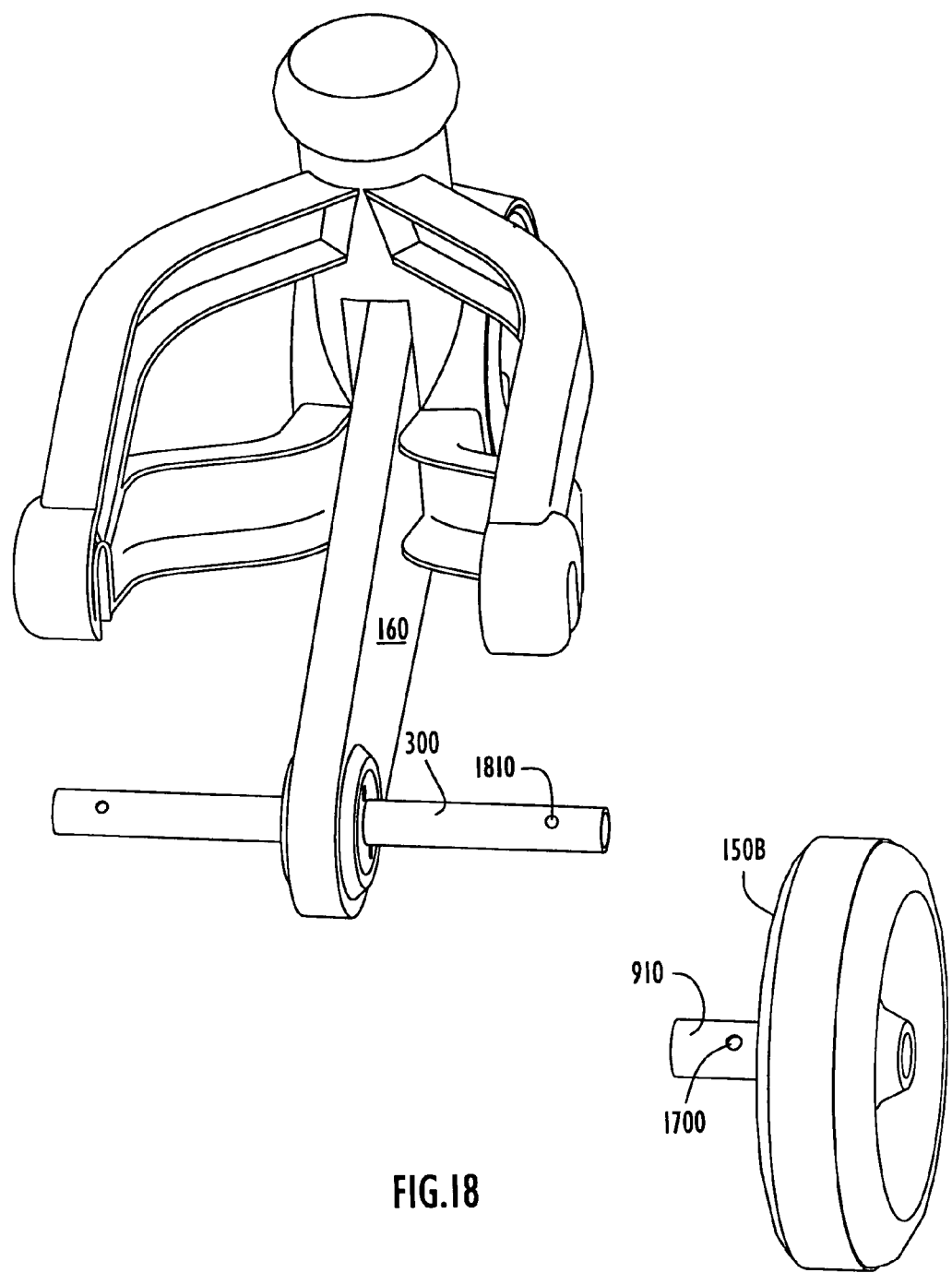
FIG. 18 illustrates a close-up rear perspective view of one of the rear wheel assemblies in proximity to the crankcase and rear axle of a children's ride-on vehicle in accordance with an embodiment of the present invention.

FIG. 17 illustrates a rear isolated perspective view of one of the rear wheel assemblies 900 of a children's ride-on vehicle 100 in accordance with an embodiment of the present invention. As mentioned above with respect to FIG. 9, the rear wheel assembly 900 includes stub axle 910. Stub axle 910 includes and orifice 1700 adapted to receive a spring-loaded button (a "valco button") that is integrated into rear axle 300. FIG. 18 illustrates a rear isolated perspective view of one of the rear wheel assemblies 900 in proximity to the crankcase 160 and rear axle 300 of a children's ride-on vehicle in accordance with an embodiment of the present invention. As illustrated, rear axle 300 includes a spring-loaded button 1810 adapted to mate with orifice 1700 of stub axle 910. Alternatively, the features of stub axle 910 (orifice 1700) could be included on the rear axle 300 and the rear axle 300 (spring-loaded button) features located on the stub axle 910.

Figure 19:
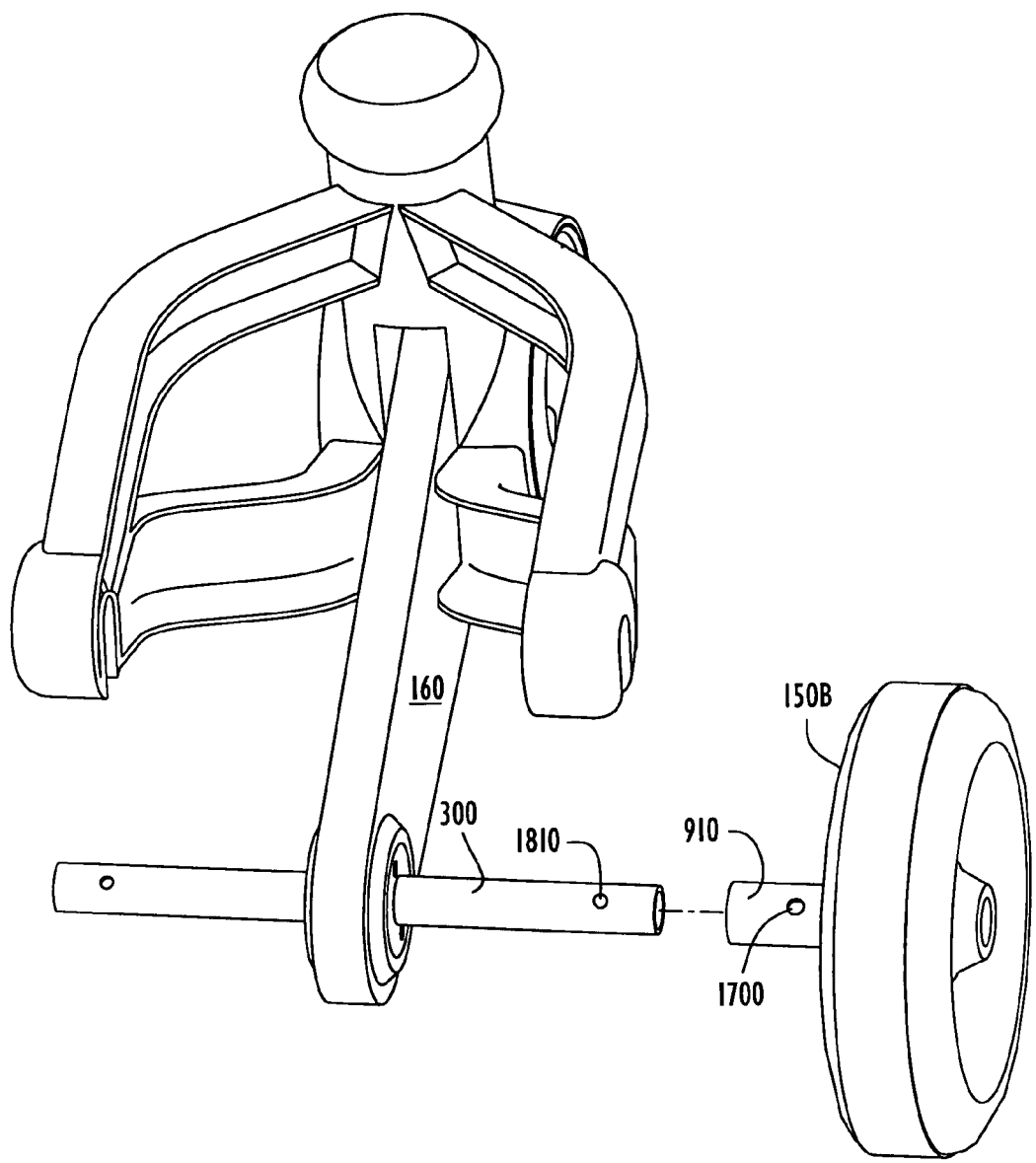
FIG. 19 illustrates a rear isolated perspective view of the attachment of one of the rear wheel assemblies to the rear axle of a children's ride-on vehicle in accordance with an embodiment of the present invention.
Figure 20:
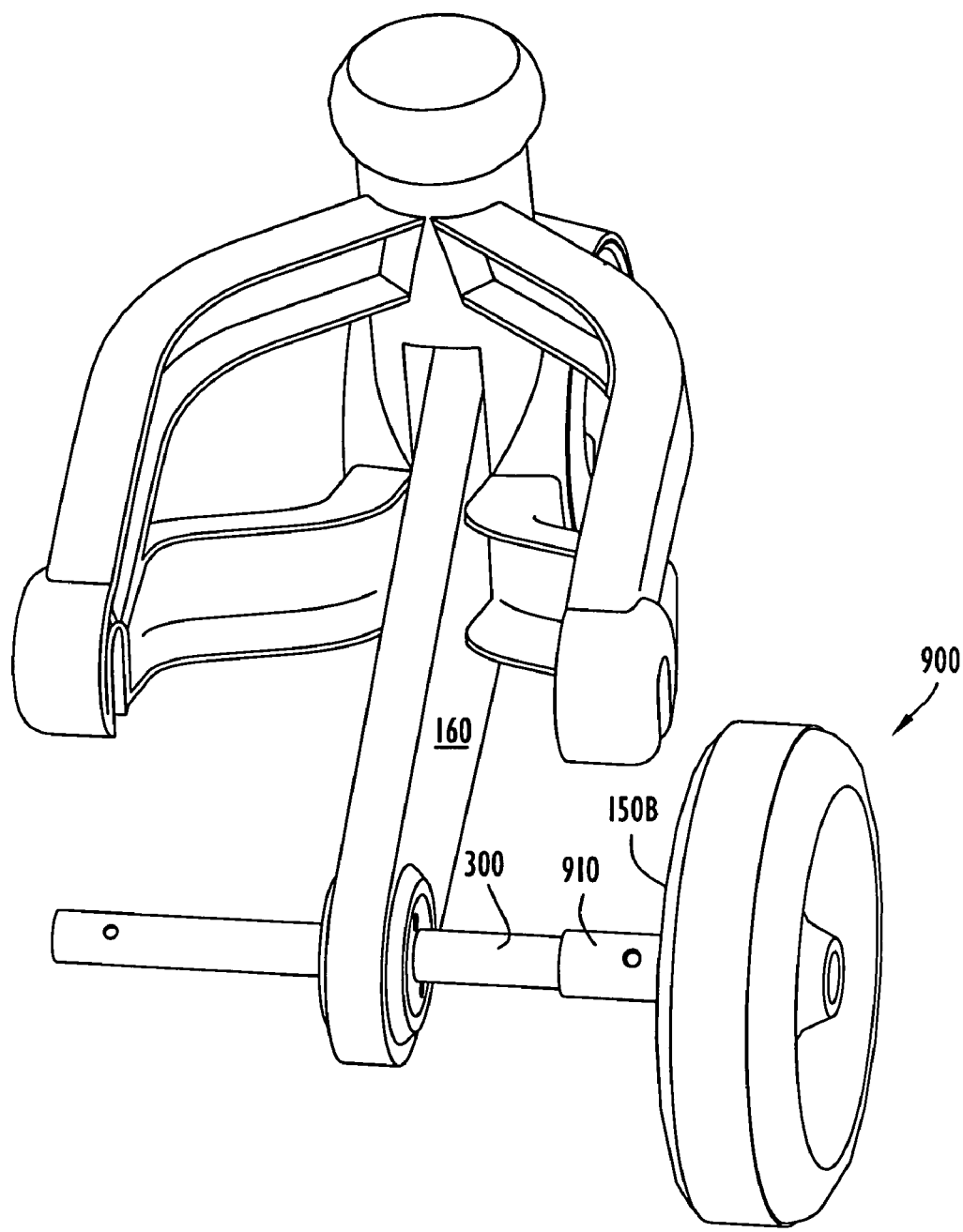
FIG. 20 illustrates a rear isolated perspective view of one of the rear wheel assemblies attached to the rear axle of a children's ride-on vehicle in accordance with an embodiment of the present invention, the wheel assembly being positioned in the first, stabilized riding position.

FIG. 19 illustrates a rear isolated perspective view of the attachment of one of the rear wheel assemblies 900 to the rear axle of a children's ride-on vehicle 100. As shown, spring-loaded button 1810 on rear axle 300 is pressed inward to allow rear axle 300 to slide inside of stub axle 910 until the spring-loaded button 1810 emerges from orifice 1700 to lock the rear wheel assembly 900 and the rear wheel 150B to the rear axle 300. Thus, when rear axle 300 rotates, rear wheel 150B rotates therewith. Also, the receipt of spring-loaded button 1810 into orifice 1700 fixes rear wheel 150B longitudinally on rear axle 300. FIG. 20 illustrates a rear isolated perspective view of one of the rear wheel assemblies 900 attached to the rear axle 300 of a children's ride-on vehicle 100 in accordance with the present invention, the wheel assembly 900 being longitudinally positioned in the first, stabilized riding position of FIGS. 1-3.

Figure 21:
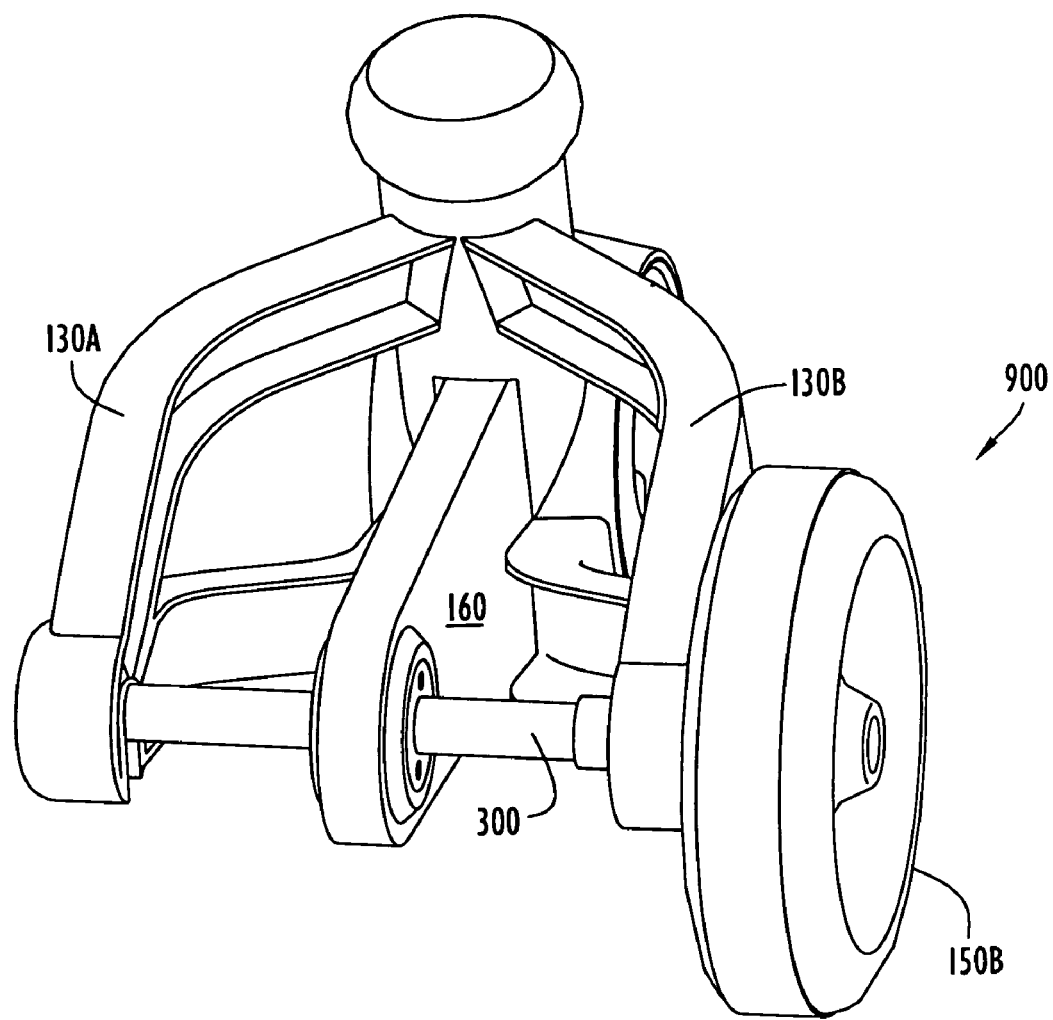
FIG. 21 illustrates a rear isolated perspective view of one of the rear wheel assemblies, the frame members, crankcase, and rear axle, of a children's ride-on vehicle in accordance with an embodiment of the present invention, the rear wheel assembly being positioned in the first, stabilized riding position and the frame members rotated back into position over the rear axle.
Figure 22:
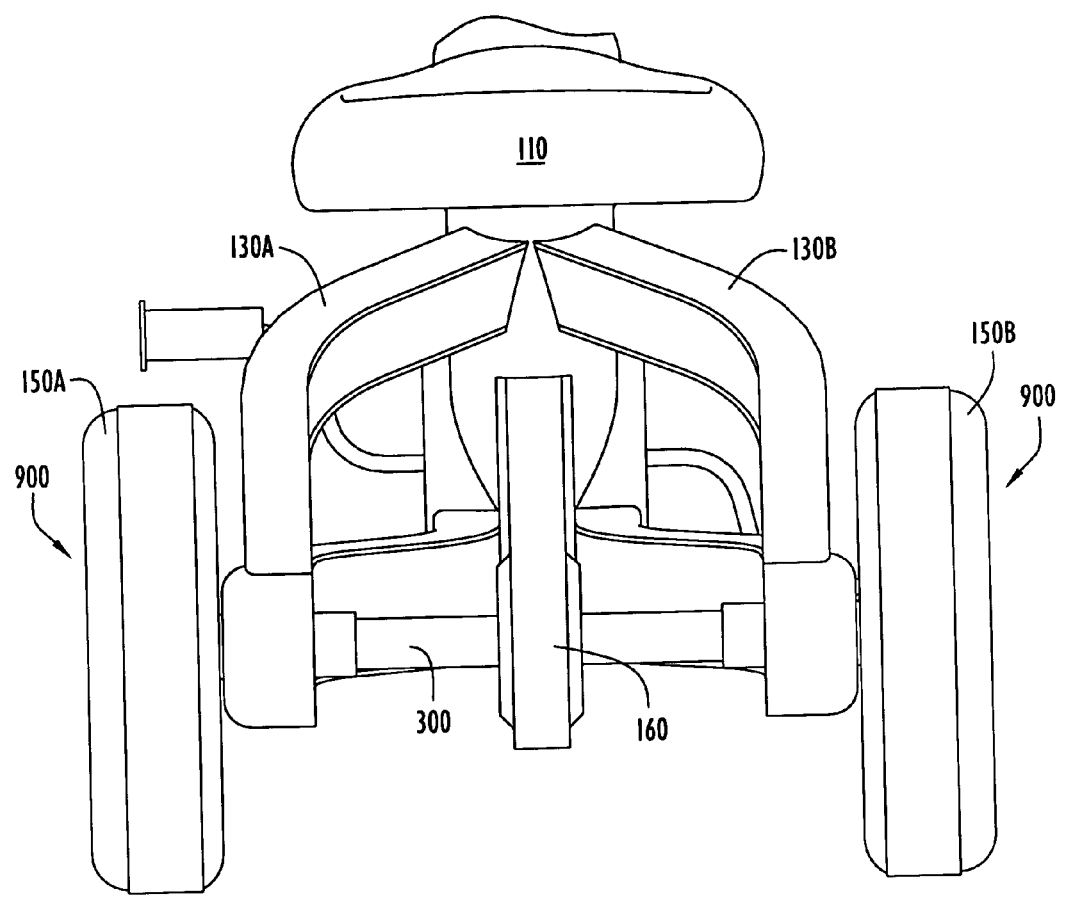
FIG. 22 illustrates a close-up rear perspective view of both of the rear wheel assemblies, the frame members, the crankcase, and the rear axle, of a children's ride-on vehicle in accordance with an embodiment of the present invention, the rear wheel assemblies being positioned in the first, stabilized riding position and the frame members rotated back into position over the rear axle.

FIG. 21 illustrates a rear isolated perspective view of one of the rear wheel assemblies 900 attached to the rear axle 300 of a children's ride-on vehicle 100 in accordance with an embodiment of the present invention, the wheel assembly 900 being positioned in the first, stabilized riding configuration (of FIGS. 1-3). In this position, as compared with FIGS. 16-20, the frame members 130A, 130B have been rotated back downward toward the crankcase 160 and rear axle 300. FIG. 22 illustrates a rear isolated perspective view of both of the rear wheel assemblies 900, the frame members 130A, 130B, the crankcase 160, and the rear axle 300, of a children's ride-on vehicle 100 in accordance with an embodiment of the present invention, the rear wheel assemblies 900 (including rear wheels 150A, 150B) being positioned in the first, stabilized riding position (of FIGS. 1-3) and the frame members 130A, 130B rotated back down into position over the rear axle 300.

To transition from the first, stabilized riding configuration (of FIGS. 1-3) to the second, bicycle-like riding configuration (of FIGS. 4-6), the user pivots the frame members 130A, 130B away from the crankcase 160 and rear axle 300 and removes the wheel assemblies 900 by depressing the spring-loaded button 1810 on rear axle 300. The stub axles 910 of the rear wheel assemblies 900 can then be slid off of the rear axle 300. Next, as illustrated in FIG. 23, the rear wheel assembly 900 is rotated 180 degrees from its position shown in FIG. 18 (i.e., the wheel assembly is reversed with stub axle 910 extending outward).

Figure 23:
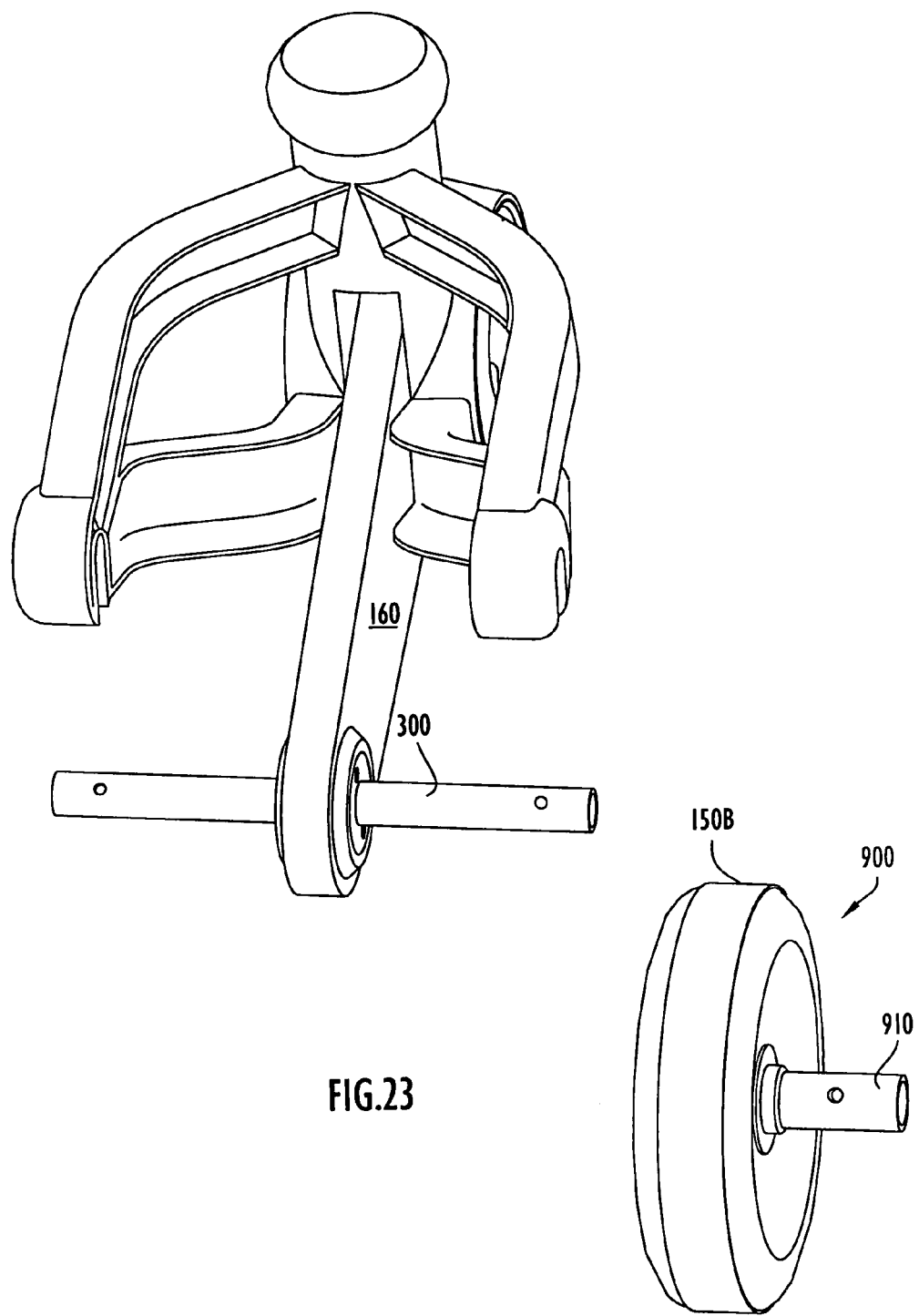
FIG. 23 illustrates a rear isolated perspective view of one of the rear wheel assemblies in proximity to the crankcase and rear axle of a children's ride-on vehicle in accordance with an embodiment of the present invention, where the rear wheel assembly has been rotated 180 degrees from its position in FIG. 18.
Figure 24:
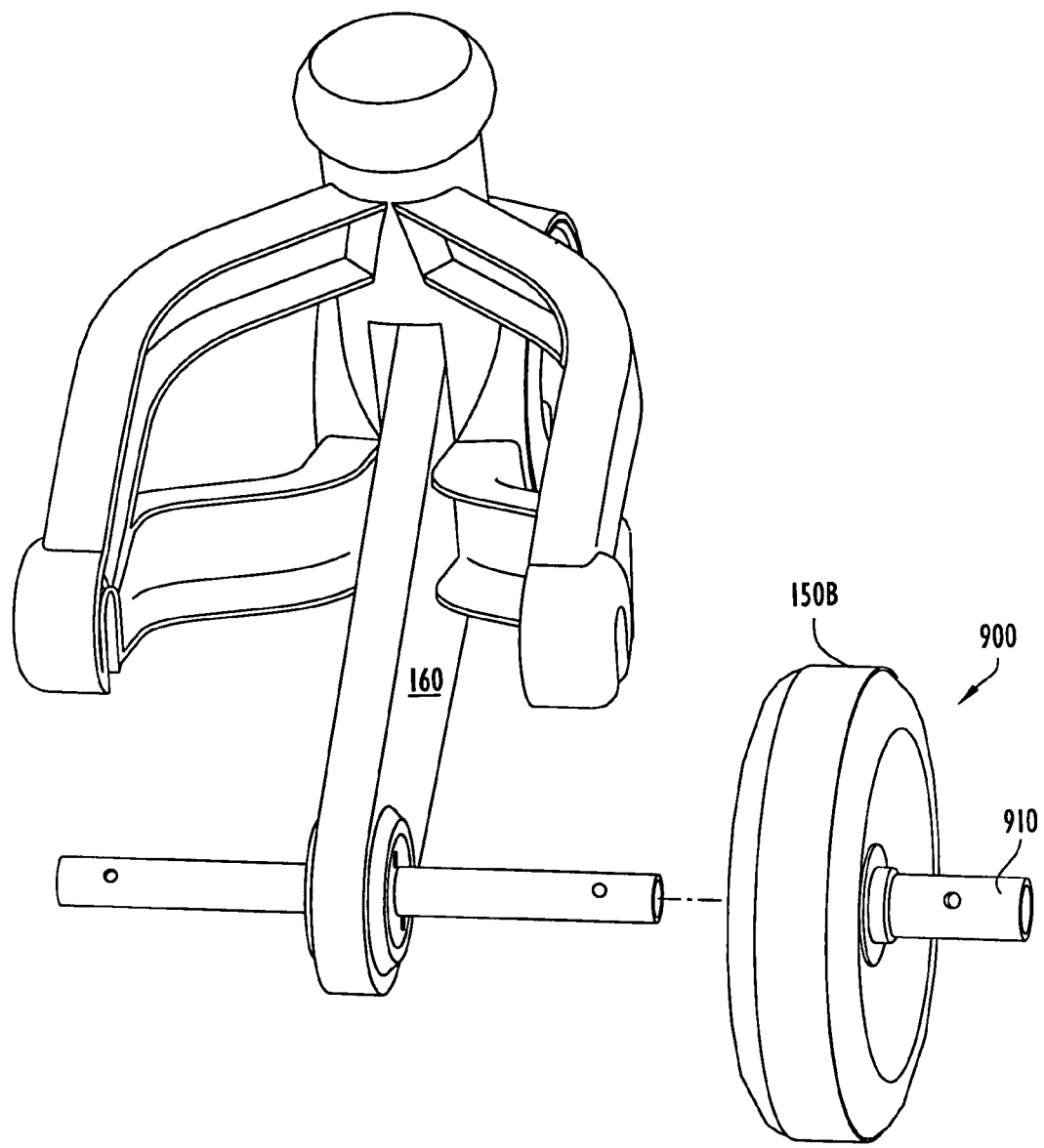
FIG. 24 illustrates a rear isolated perspective view of the attachment of one of the rear wheel assemblies to the rear axle of a children's ride-on vehicle in accordance with an embodiment of the present invention.
Figure 25:
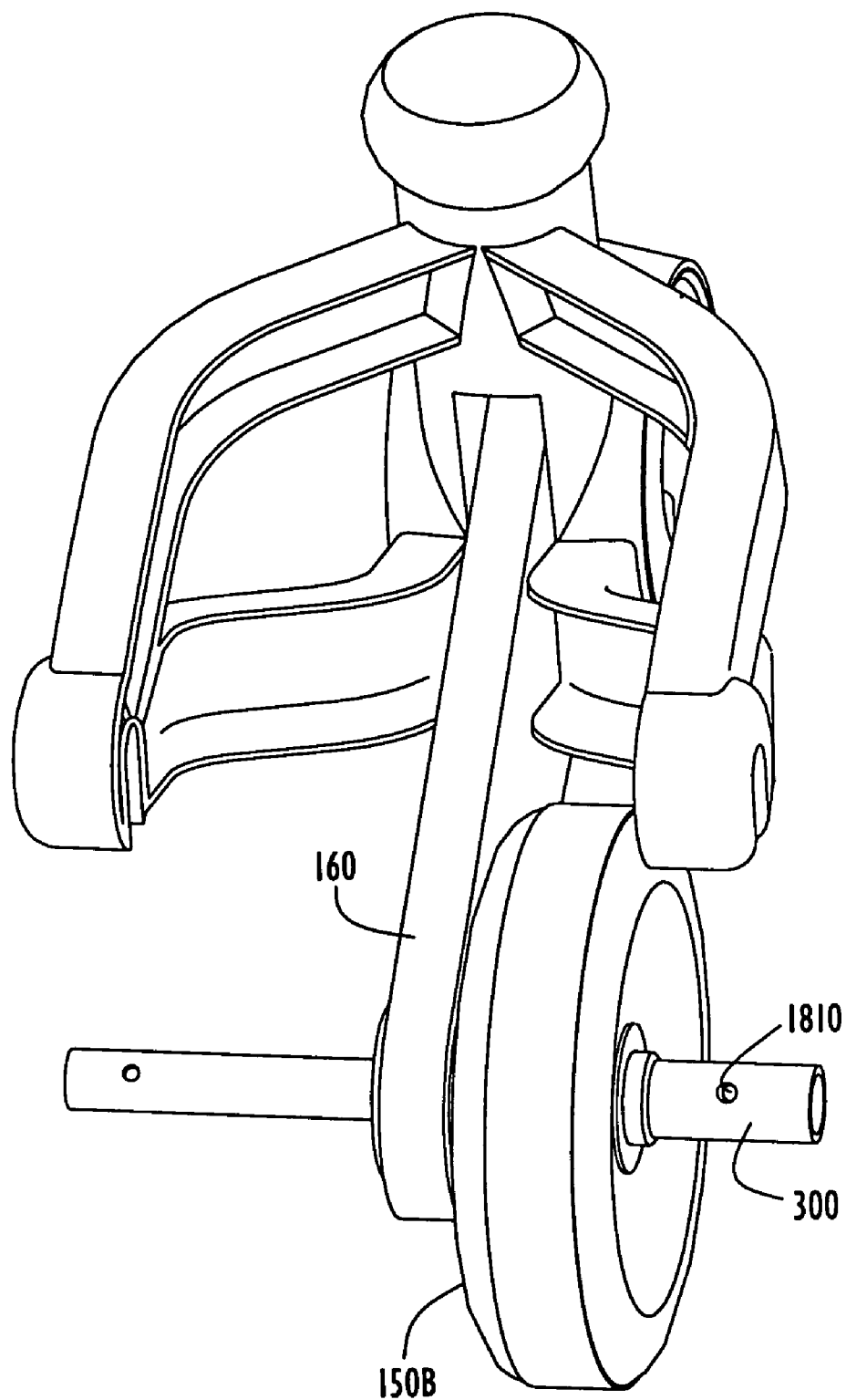
FIG. 25 illustrates a rear isolated perspective view of one of the rear wheel assemblies attached to the rear axle of a children's ride-on vehicle in accordance with an embodiment of the present invention, the wheel assembly being positioned in the second, bicycle-like riding position.

As shown in FIGS. 23, 24, and 25, spring-loaded button 1810 on rear axle 300 is pressed inward to allow rear axle 300 to slide inside of stub axle 910 until the spring-loaded button 1810 emerges from orifice 1700 to lock the rear wheel assembly 900 to the rear axle 300. The other rear wheel assembly 900 (including wheel 150A) is attached to the other side of rear axle 300 in a likewise manner. This wheel reversal method allows the mounting of the rear wheel assemblies 900 in close proximity to crankcase 160 and to each other. In another embodiment of the present invention (discussed in greater detail below), rear wheels 150A, 150B can be permanently connected to the rear axle 300. In these embodiments, reconfiguration is accomplished by simply sliding wheels 150A, 150B along the rear wheel axle 300 which never requires wheel removal from or wheel reversal on the rear axle 300.

Figure 26:
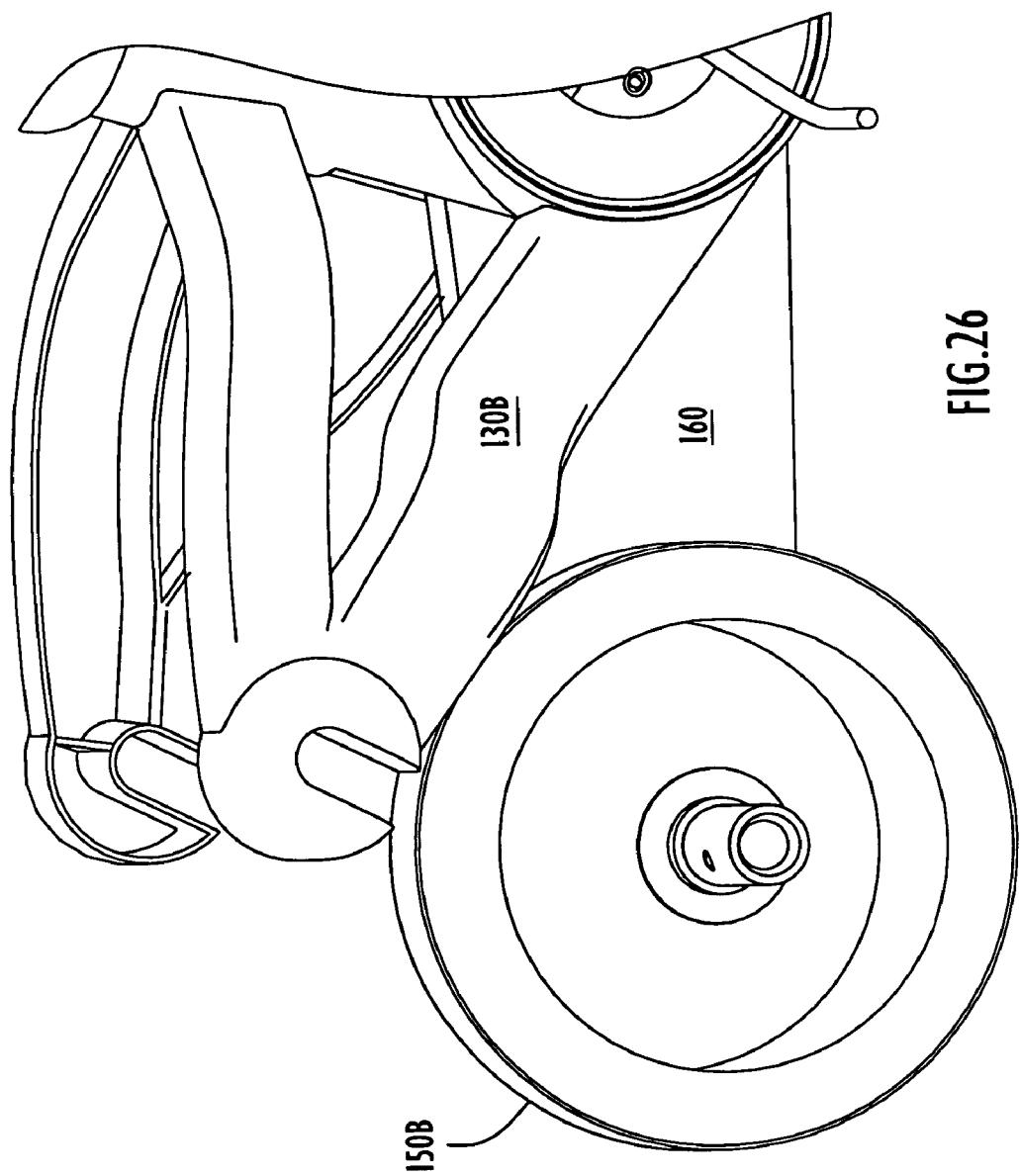
FIG. 26 illustrates an isolated perspective view of the children's ride-on vehicle of FIG. 25 in a position in which the frame is rotated away from the crankcase and rear axle.
Figure 27:
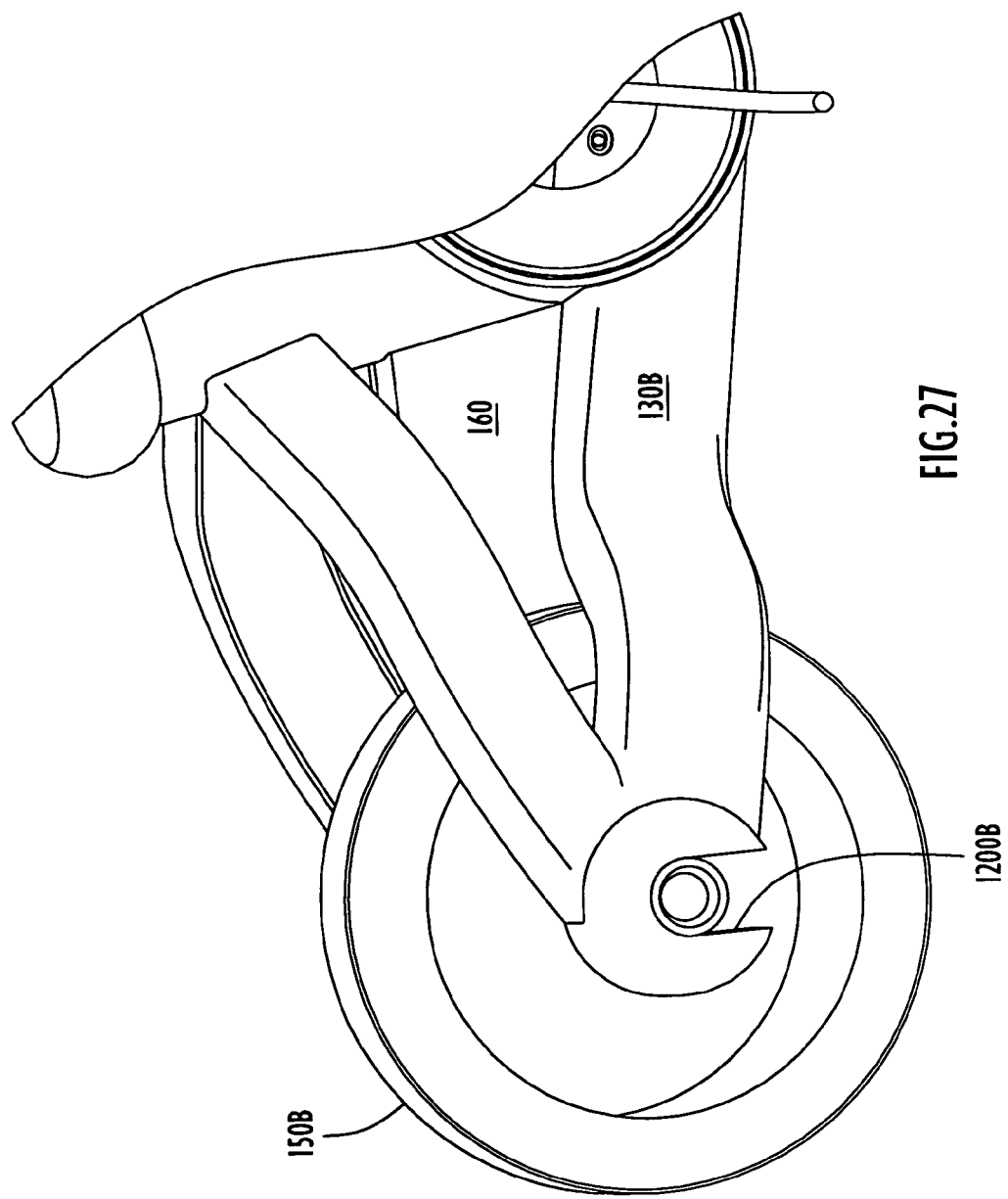
FIG. 27 illustrates an isolated perspective view of the children's ride-on vehicle of FIG. 25, with one of the rear wheel assemblies being positioned in the second, bicycle-like riding position and the frame members rotated back into position over the rear axle.
Figure 28:
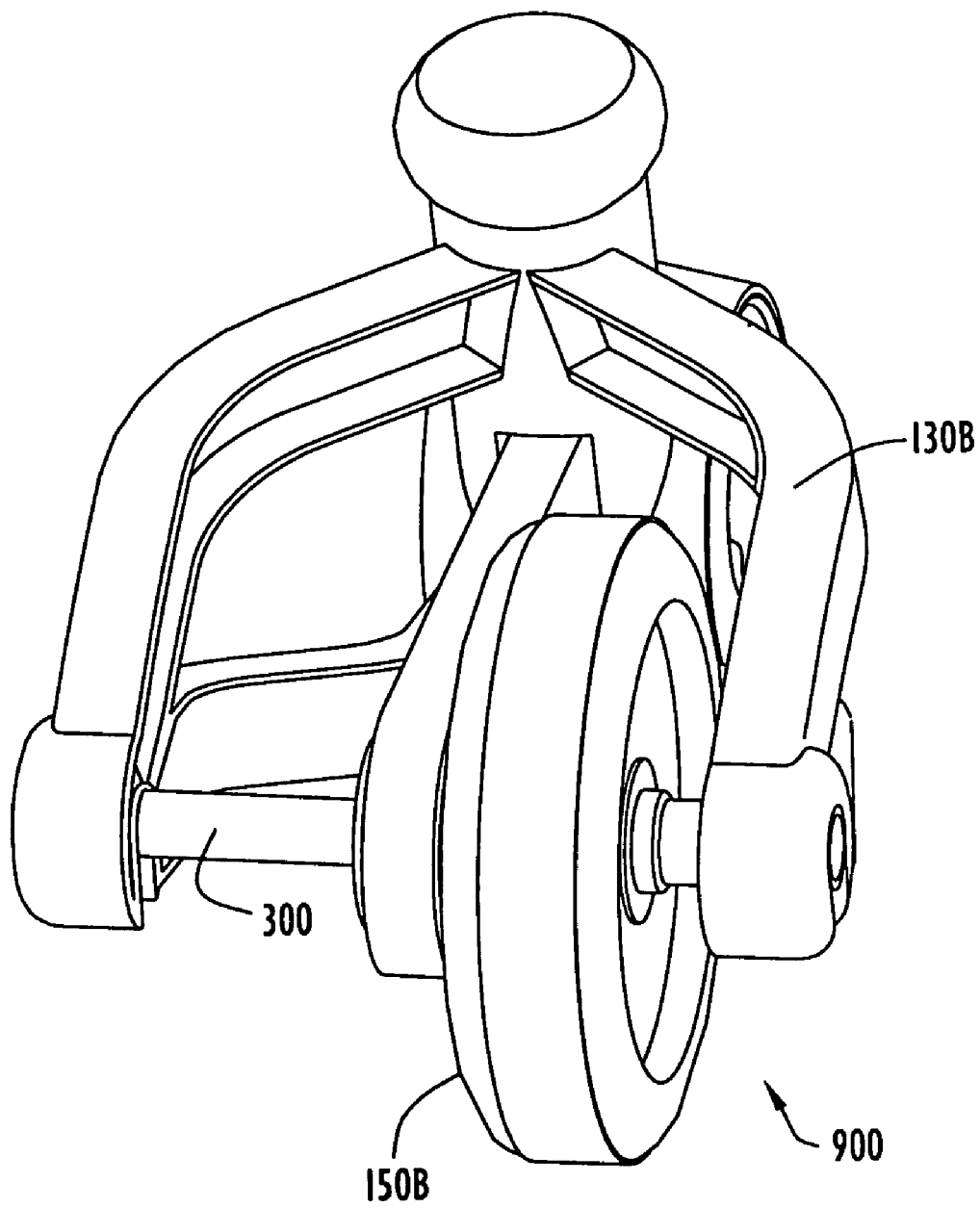
FIG. 28 illustrates an isolated perspective view of the children's ride-on vehicle of FIG. 27.
Figure 29:
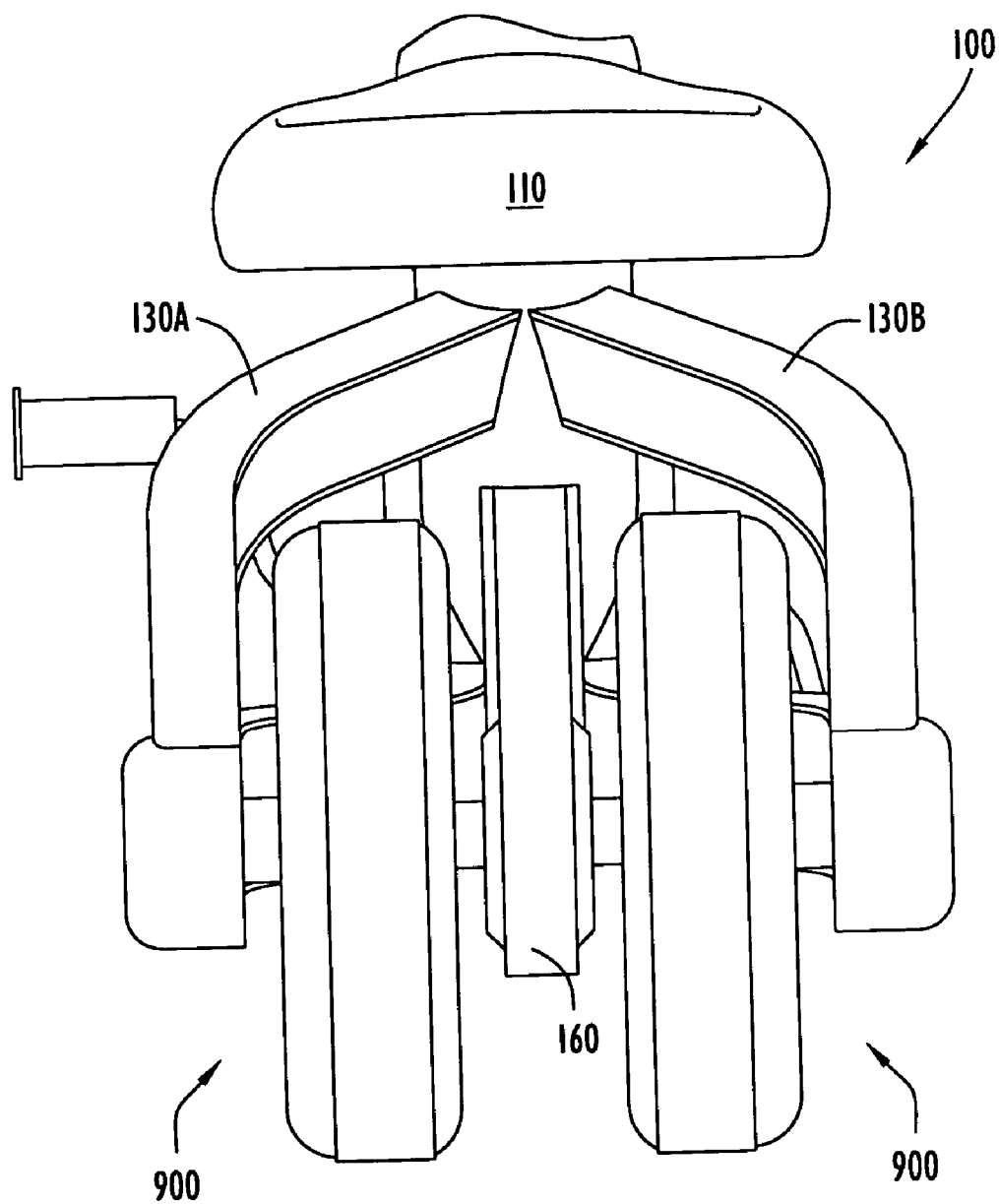
FIG. 29 illustrates a rear isolated perspective view of both of the rear wheel assemblies, the frame members, the crankcase, and the rear axle, of a children's ride-on vehicle in accordance with an embodiment of the present invention, the rear wheel assemblies being positioned in the second, bicycle-like riding position and the frame members rotated back into position over the rear axle.

FIG. 26 illustrates an isolated perspective view of the children's ride-on vehicle 100 of FIG. 25 in a configuration in which the frame members 130A, 130B are rotated away from the crankcase 160 and rear axle 300. Next, as illustrated in FIG. 27, the frame members 130 are rotated toward the crankcase 160 and into contact with the rear axle 300 to assume the second, bicycle-like riding configuration. FIG. 28 illustrates an isolated rear perspective view of the children's ride-on vehicle 100 of FIG. 25, with only one of the rear wheel assemblies 900 (including wheel 150B) being positioned in the second, bicycle-like riding configuration (with the frame members 130A, 130B rotated back into position over the rear axle 300). FIG. 29 illustrates a rear isolated perspective view of both of the rear wheel assemblies 900, the frame members 130A, 130B, the crankcase 160, and the rear axle 300, of a children's ride-on vehicle 100 in accordance with an embodiment of the present invention, the rear wheel assemblies 900 being positioned in the second, bicycle-like riding position (of FIGS. 4-6) and the frame members 130A, 130B rotated back into position over the rear axle 300. As shown, in this second position, the rear wheel assemblies 900 are in close proximity to crankcase 160 and to each other.

Figure 30:
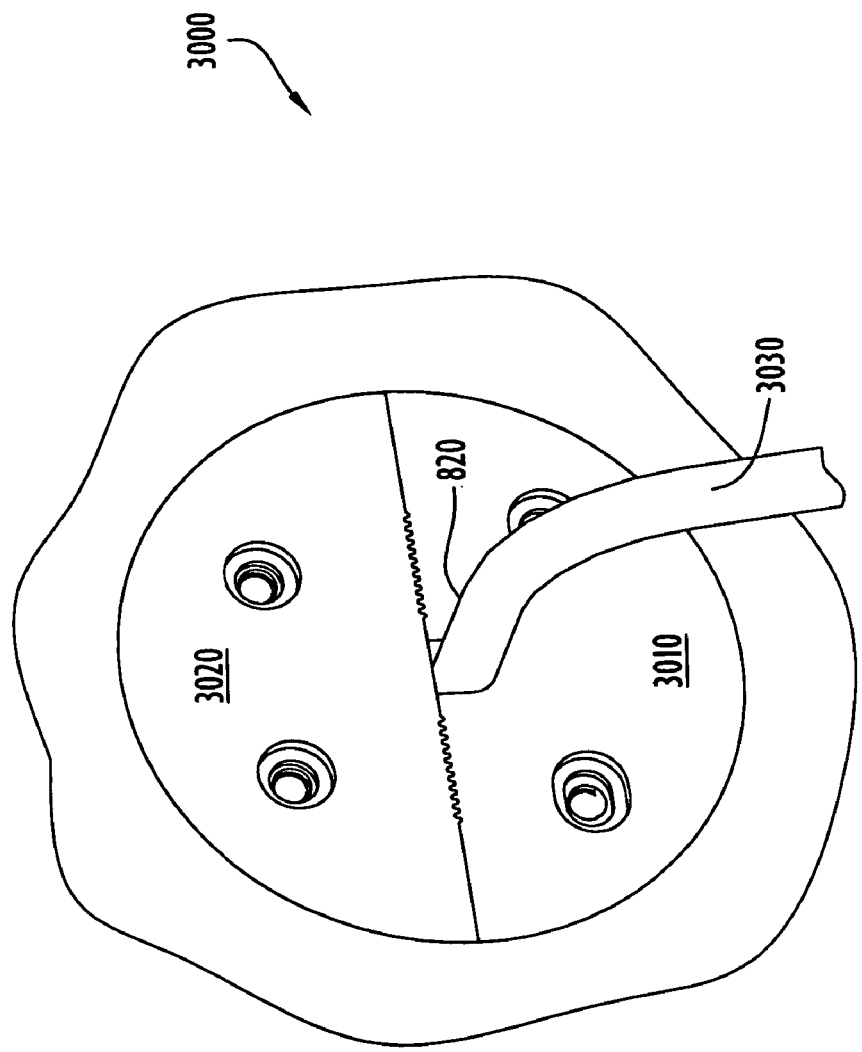
FIG. 30 illustrates an isolated perspective view of a chain tension adjustment mechanism utilizing a portion of the sprocket and crank assembly of the children's ride-on vehicle in accordance with an embodiment of the present invention.

FIG. 30 depicts a drive chain/belt tension adjustment mechanism 3000 in accordance with the present invention. As shown, the chain/belt tension adjustment mechanism 3000 is attached to the pedal bars 3030. Chain tension adjustment mechanism 3000 comprises a sprocket 830 (shown in FIGS. 7-8) connected to pedal crank axle 820. The adjustment mechanism also has a top bushing 3020 fixed with respect to the crank case 160 and a selectively positionable bottom bushing 3010 linearly movable with respect the crank case 160. The bottom bushing 3010 is also configured to be linearly moveable with respect to the fixed top bushing 3020. As explained with reference to FIG. 31 below, when the bottom bushing 3010 is moved linearly away from the rear axle 300, crank axle 820 and crank axle sprocket 830 are also moved away from the rear axle sprocket 840 to tighten the belt or chain on the sprockets 830, 840.

Figure 31:
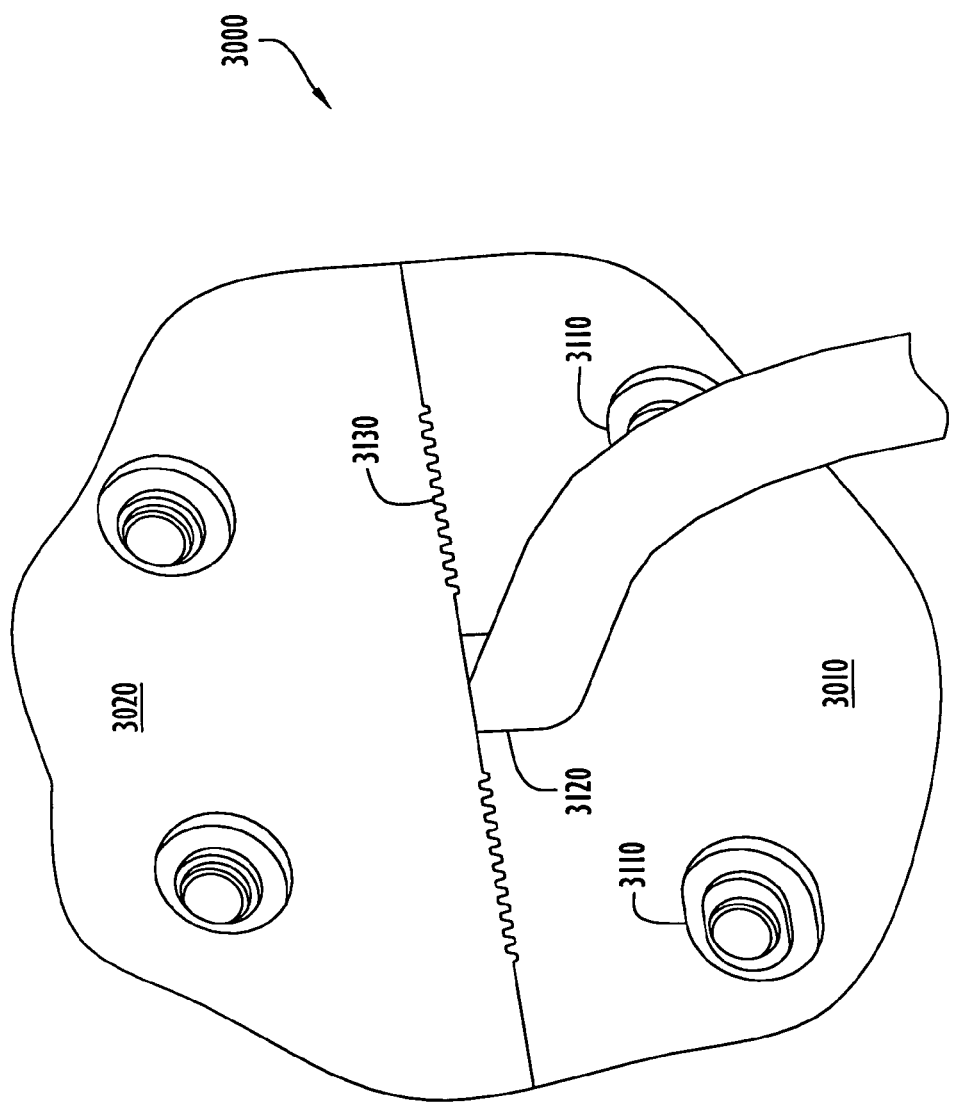
FIG. 31 illustrates an isolated close-up perspective view of the chain tension adjustment mechanism of FIG. 30.

FIG. 31 illustrates an isolated close-up perspective view of the chain tension adjustment mechanism 3000 of FIG. 30. The bottom bushing 3010 includes elongated openings 3110. Both fixed top bushing 3020 and selectively positionable bottom bushing 3010 include teeth or interlocking splined portions 3130. The elongated openings 3110 and interlocking splined portions 3130 allow a user to linearly adjust the bottom bushing 3010 with respect to the fixed top bushing 3020. Movement of the bottom bushing 3010 toward the front wheel 140 of the children's ride-on vehicle 100 causes the chain/belt within crank case 160 to be tightened. Movement of the bottom bushing 3010 toward the rear wheels 150A, 150B of the children's ride-on vehicle 100 causes the chain/belt to be loosened. After adjustment, the interlocking spline portions 3130 help maintain the relative position between the top bushing 3020 and the bottom bushing 3010 before fasteners are tightened into bottom openings 3110.

While the invention has so far been described in detail and with reference to one specific embodiment thereof, it will be apparent to one skilled in the art that various changes and modifications can be made therein without departing from the spirit and scope thereof. For example, as explained below, the rear wheels 150A, 150B may be slidably mounted to the rear axle 300 so that a user could change from the first, stabilized riding configuration of FIGS. 1-3 to the second, bicycle-like riding configuration of FIGS. 4-6 by simply pivoting the frame members 130A, 130B away from the crankcase 160 and rear axle 300 (shown generally in FIG. 16 and discussed in greater detail below), and sliding the rear wheels 150 together and then pivoting the frame members 130A, 130B toward the crankcase 160 and into engagement with rear axle 300. In other words, the wheels 150A, 150B are pivoted away from the frame members 130A, 130B by pivoting the crank case 160, the rear axle 300, and the wheels 150A, 150B away from frame members 130A, 130B. The wheels 150A, 150B can then be slid along rear axle 300 without interference from frame members 130A, 130B. When the appropriate wheel spacing between wheels 150A, 150B has been achieved, the wheels 150A, 150B along with the rear axle 300 and crank case 160 are again pivoted toward the frame members 130A, 130B and locked into their new configuration.

One significant advantage of this additional embodiment described above (where the children's ride-on vehicle 100 is reconfigured simply by sliding the rear wheels 150A, 150B back and forth along the axle 300) is that even though the wheels 150A, 150B could, if necessary, be removed from rear axle 300, transformation between riding configurations can be accomplished without removing the wheels 150A, 150B from the rear axle 300.

Figure 32:
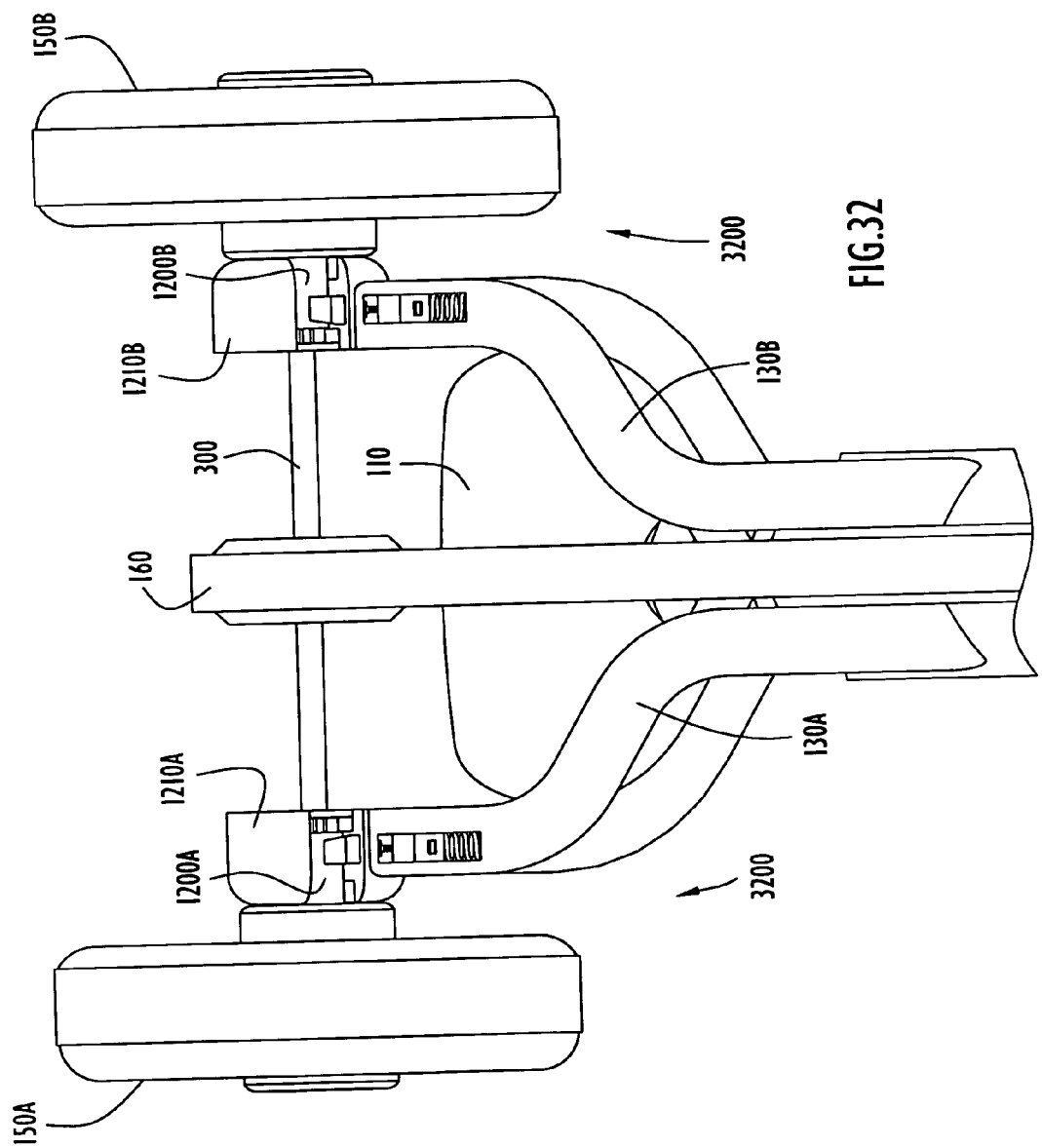
FIG. 32 illustrates a rear isolated bottom view of a children's ride-on vehicle in accordance with another embodiment of the present invention showing a rear wheel assembly, frame members, axle locks and a crankcase, the rear wheel assembly received and locked by the axle locks into slots in the frame members and the rear wheel assemblies being positioned in the first, stabilized riding position.
Figure 33:
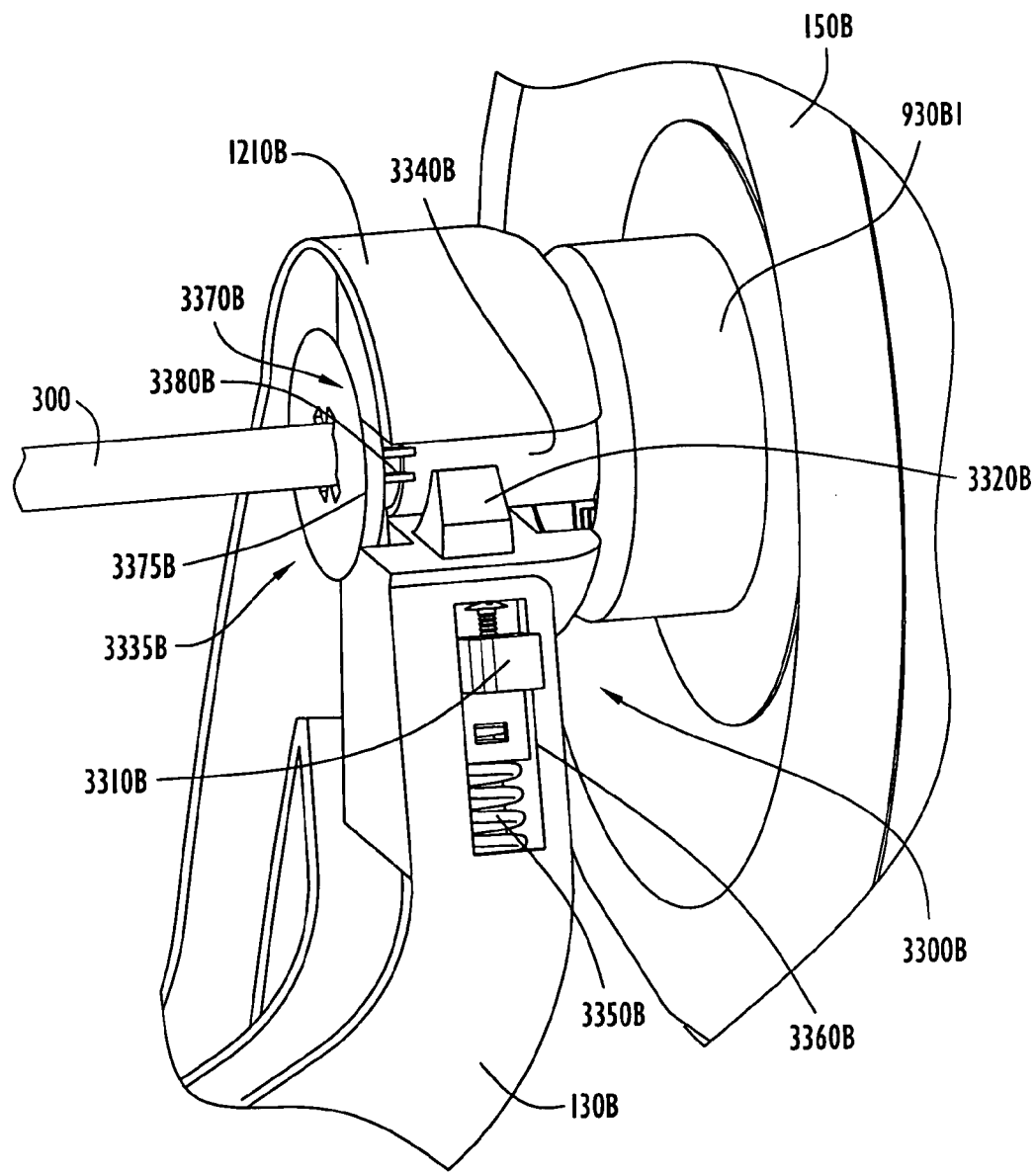
FIG. 33 illustrates an enlarged isolated bottom view of the children's ride-on vehicle of FIG. 32 showing a close-up view of one side of the rear wheel assembly locked by the axle locks into one of the slots in one of the frame members.

FIG. 32 illustrates a rear isolated bottom view of a children's ride-on vehicle 100 in accordance with an embodiment of the present invention showing a rear wheel assembly 3200, frame members 130A, 130B and a crankcase 160, the rear wheel assembly 3200 received and locked in the frame members 130A, 130B in the first, stabilized riding configuration (tricycle mode). FIG. 33 illustrates an enlarged isolated bottom view of one side of the children's ride-on vehicle 100 of FIG. 32 showing a close-up view of the rear wheel assembly 3200 locked by respective axle locks 3300A, 3300B into one of the slots 1200A, 1200B in frame members 130A, 130B. Specifically, the rear wheel assembly 3200 includes a rear axle 300, slide bushings 3335A, 3335B and rear wheels 150A, 150B slidably mounted on the rear axle 300.

FIG. 32 and FIG. 33 show slide bushings 3335A, 3335B on each end of the rear axle 300. Each slide bushing 3335A, 3335B has corresponding slide surfaces 3340A, 3340B surrounding corresponding cores 3370A, 3370B. Each core 3370A, 3370B has a pair of corresponding flanges 3375A and 3375B extending from corresponding ends of the slide surfaces 3340A, 3340B. That is, 3370A includes a pair of flanges 3375A on each of its linear ends (with the wheel 150A captured there between). Furthermore, each pair of flanges 3375A, 3375B has corresponding flange teeth 3380A, 3380B thereon for transferring torque to the wheel 150A, 150B. This method of torque transfer will be discussed in more detail below.

Figure 34:
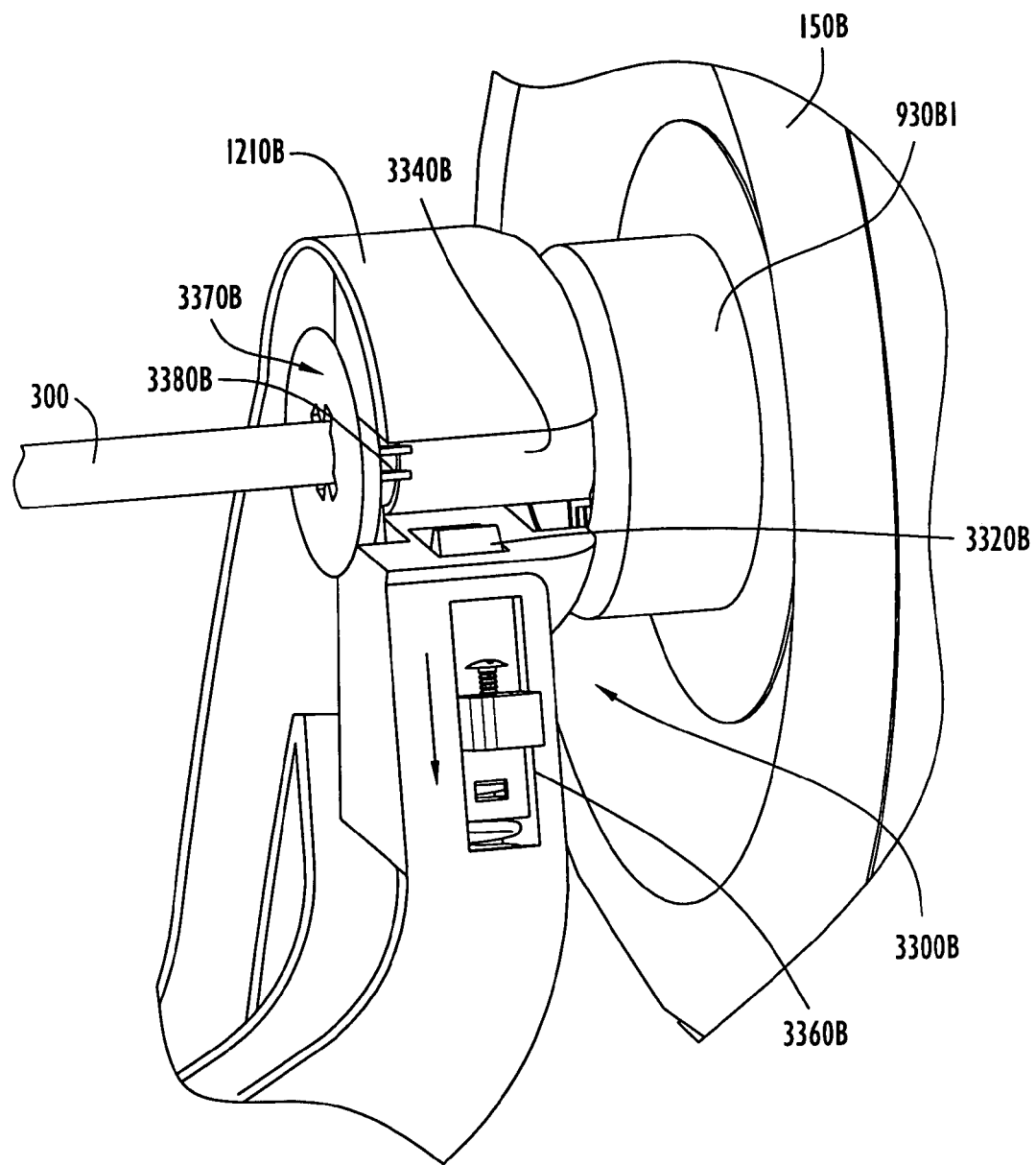
FIG. 34 illustrates an enlarged isolated bottom view of the children's ride-on vehicle of FIG. 32 showing the axle lock of one frame member being released to permit entry or exit of the rear wheel assembly from the slot in the frame member.

FIG. 33 shows one of the two rear axle receivers 1210A, 1210B of FIG. 32 that include respective slots 1200A, 1200B for receiving the slide surfaces 3340A, 3340B of the slide bushings 3335A, 3335B and one or the other of the flanges 3375A, 3375B of the slide bushings 3335A, 3335B. The rear axle receivers 1210A, 1210B (mounted at the ends of frame members 130A, 130B respectively) also include respective axle locks 3300A, 3300B for releasably securing the slide bushings 3335A, 3335B of the rear wheel assembly 3200 to the frame members 130A, 130B in the slots 1200A, 1200B. The axle locks 3300A, 3300B include respective slot latches 3320A, 3320B that extend across the openings of the slots 1200A, 1200B, contacting the slide surfaces 3340A, 3340B to retain the slide bushings 3335A, 3335B of rear wheel assembly 3200 in the slots 1200A, 1200B. The axle locks 3300A, 3300B also include respective finger actuators 3310A, 3310B that are connected to the slot latches 3320A, 3220B for retracting the slot latches 3320A, 3320B from the openings in slots 1200A, 1200B against the force of a respective springs 3350A, 3350B. The finger actuators 3310A, 3310B extend from within a cutout 3360A, 3360B in the frame members 130A, 130B. FIG. 34 illustrates an enlarged isolated bottom view of the children's ride-on vehicle 100 of FIG. 32 showing the axle lock 3300B of one frame member 130B being released to permit entry or exit of the rear wheel assembly 3200 from the slot 1200B in the frame member 130B.

Springs 3350A, 3350B normally bias the slot latches 3320A, 3320B to extend into the openings of the slots 1200A, 1200B to contact the slide surfaces 3340A, 3340B and prevent their escape from the slots 1200A, 1200B. Furthermore, the ends of the slot latches 3320A, 3320B may be tapered so that the slide bushings 3335A, 3335B may be inserted into the slots 1200A, 1200B (without engaging the finger actuators 3310A, 3310B), and locked in the slots 1200A, 1200B against removal. In other words, the slot latches 3320A, 3320B would be forced back from the opening of the slots 1200A, 1200B by pressing the slide surfaces 3340A, 3340B against the tapered ends of the slot latches 3320A, 3320B to automatically push/retract the slot latches 3320A, 3320B from the openings of the slots 1200A, 1200B against the force of the springs 3350A, 3350B.

Figure 35:
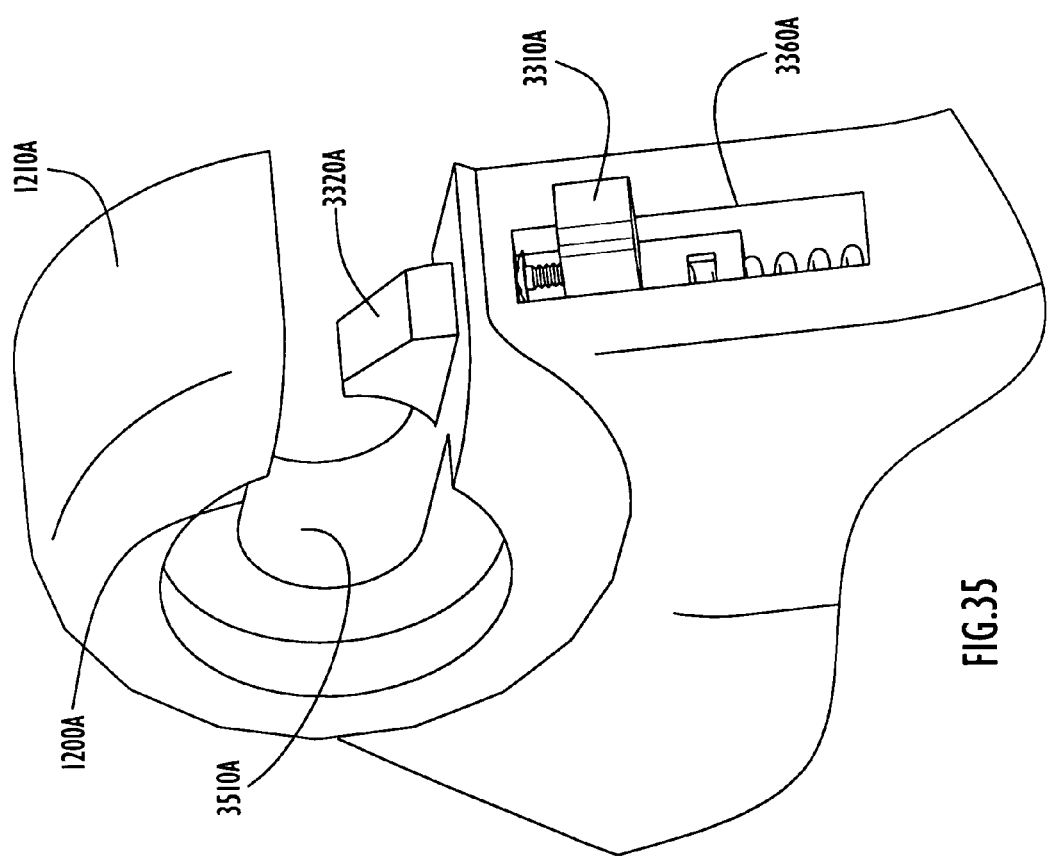
FIG. 35 illustrates a close-up view of one of the slots and axle locks of one of the frame members of FIGS. 32-34.
Figure 36:
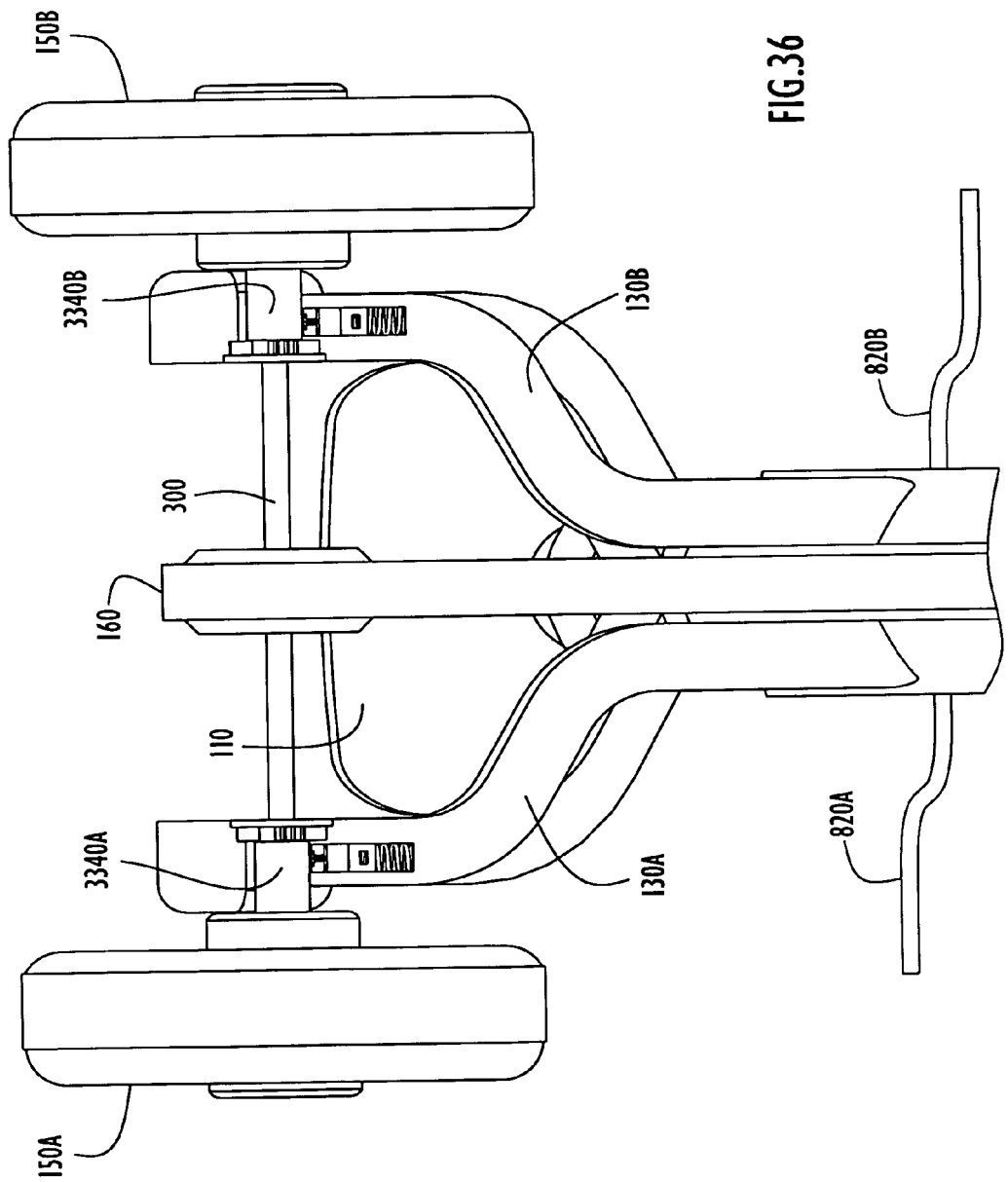
FIG. 36 illustrates a rear bottom view of the children's ride-on vehicle of FIG. 32 showing the frame members rotated away from the crankcase and rear axle, and the rear wheel assembly removed from the slots.
Figure 37:
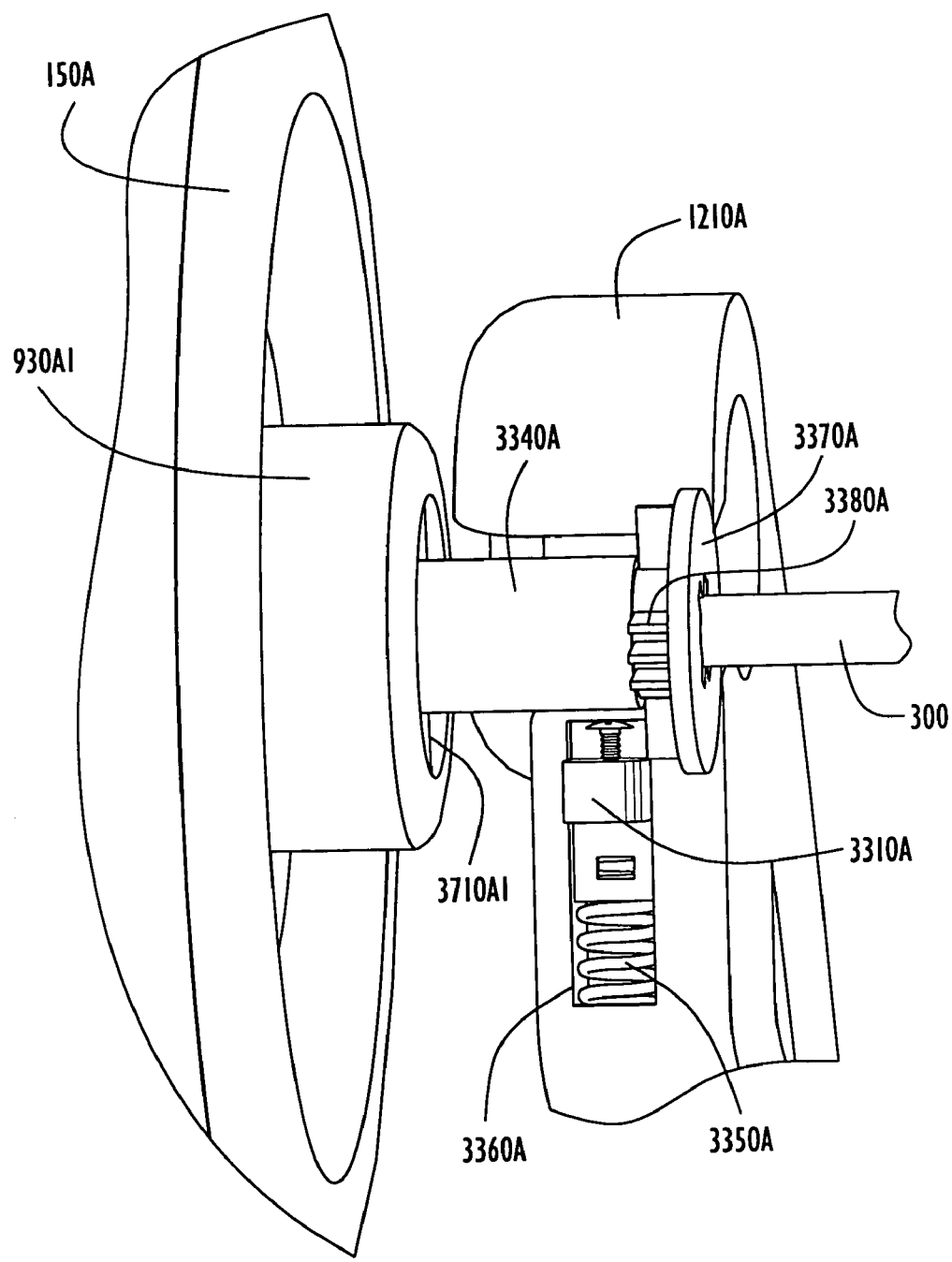
FIG. 37 illustrates a close-up bottom view of one of the sides of the rear wheel assembly of the children's ride-on vehicle of FIG. 36 being removed from the slot of a frame member.

FIG. 35 illustrates a close-up view of one of the rear axle receivers 1210A of FIG. 32 including a slot 1200A, and an axle lock 3300. FIG. 35 also shows the tapered slot latch 3320A extending into the opening of the slot 1200A and the bearing surface 3510A in the slot 1200A which the slide surface 3340A contacts. FIG. 36 illustrates a rear bottom view of the children's ride-on vehicle 100 of FIG. 32 showing the rear wheel assembly 3200 pivoted with respect to the frame members 130A, 130B and removed from the slots 1200A, 1200B. FIG. 37 illustrates a close-up bottom view of one side of the children's ride-on vehicle 100 showing slide surface 3340A of the rear axle assembly removed from slot 1200A. FIG. 37 also shows the rear wheel hub 930A1 on the slide surface 3340A and hub teeth 3710A1 for engaging flange teeth 3380A of the slide bushing 3335A when the children's ride-on vehicle 100 is configured in the bicycle configuration (discussed further below). Generally, rear wheel 150A includes wheel hubs 930A1 (inside), 930A2 (outside) and rear wheel 150B includes wheel hubs 930B1 (inside), 930B2 (outside). In addition, each wheel hub 930A1, 930A2, 930B1, 930B2 includes respective hub teeth 3710A1, 3710A2, 3710B1, 3710B2 for respectively engaging the flange teeth 3380A, (at either end of slide surface 3340A) and 3380B (at either end of slide surface 3340B) of the slide bushings 3335A, 3335B to generate propulsion. Propulsion of the children's ride-on vehicle 100 will be discussed in greater detail below.

Figure 38:
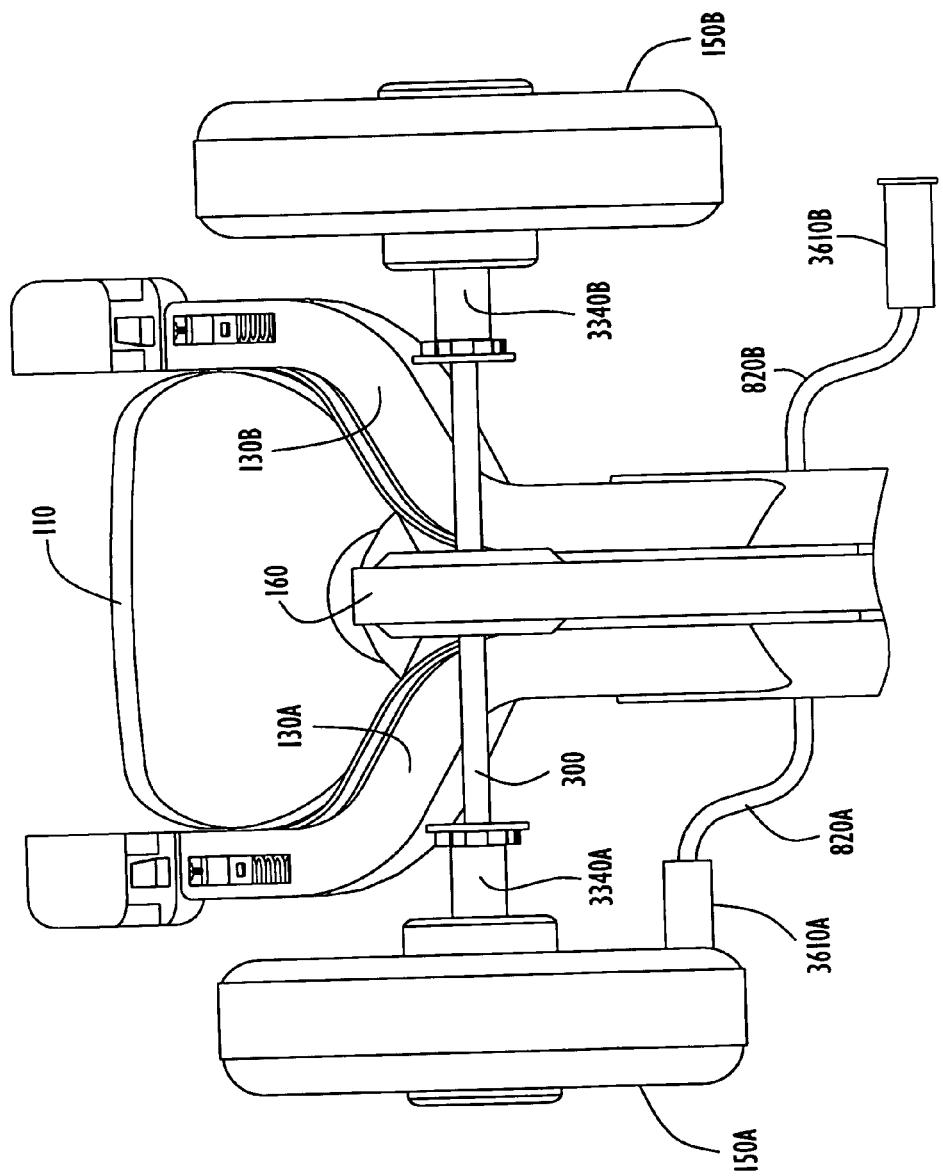
FIG. 38 illustrates a bottom view of the children's ride-on vehicle of FIG. 32 showing the frame members rotated away from the crankcase and rear axle and, the rear wheel assembly completely removed from the slots of the frame members.
Figure 39:
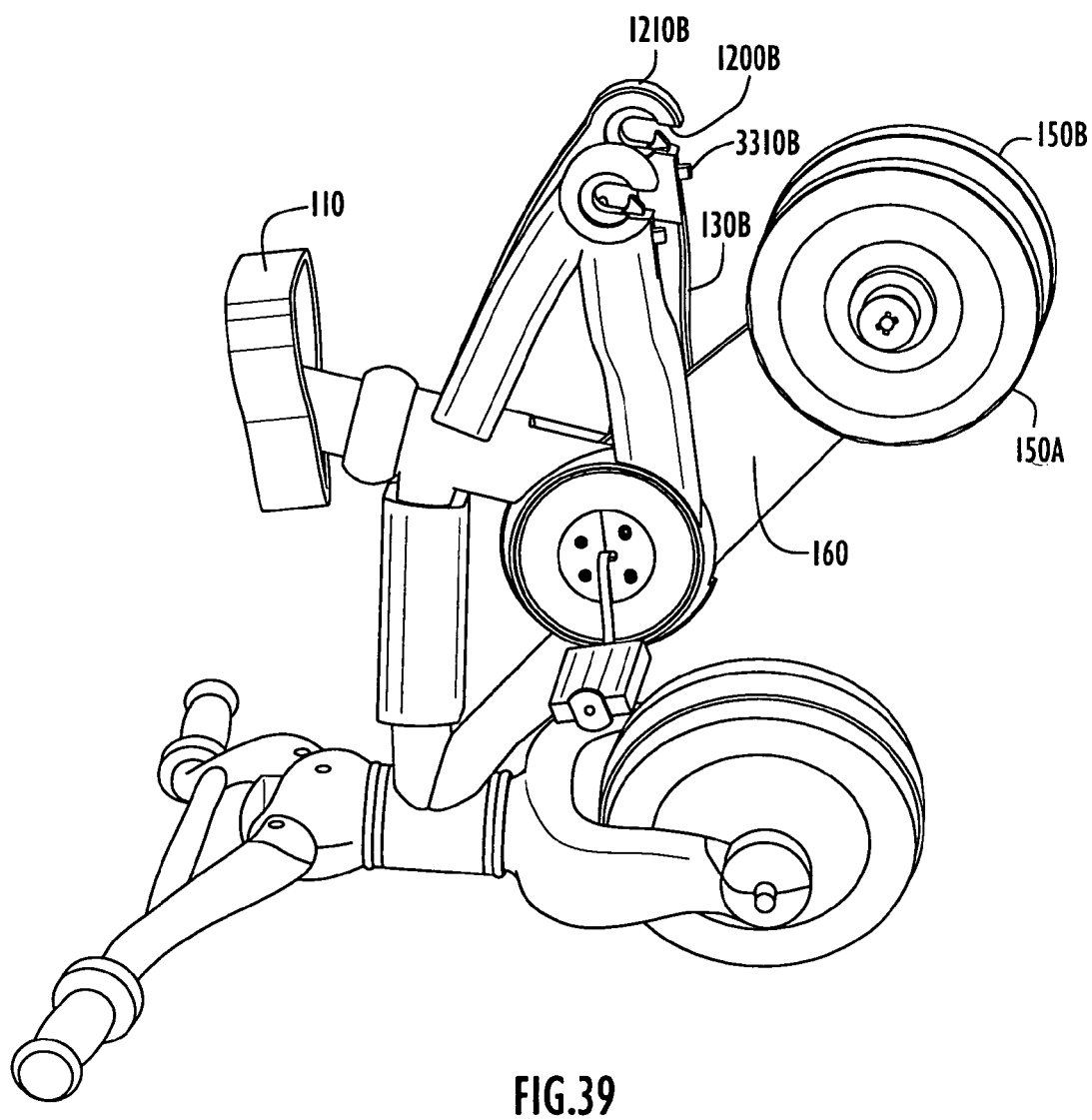
FIG. 39 illustrates a side view of the children's ride-on vehicle of FIG. 32 showing the separation of the rear wheel assembly from the slots of the frame members.

FIG. 38 illustrates a bottom view of the children's ride-on vehicle 100 of FIG. 32 with the rear wheel assembly 3200 pivoted further with respect to the frame members 130A, 130B and removed from slots 1200A, 1200B (illustrating the maximum separation from rear axle receivers 1210A, 1210B of frame members 130A, 130B). In addition, FIG. 39 illustrates a side view of the children's ride-on vehicle 100 of FIG. 38 showing the maximum separation of the rear axle and the wheels 150A, 150B from the frame members 130A, 130B. FIG. 39 best shows how the rear axle and the wheels 150A, 150B pivots (along with the crank case 160) until the wheels 150A, 150B have cleared the frame members 130A, 130B in the axial direction. After the crank case 160 and wheels 150A, 150B have been pivoted away from the frame members 130A, 130B and have cleared the frame members 130A, 130B, the position of the wheels 150A, 150B can be adjusted along the rear axle 300 by sliding the wheels 150A, 150B together (into the bicycle configuration) or apart (into the stabilized configuration) by sliding the respective slide bushings 3335A, 3335B along the rear axle 300.

Figure 40:
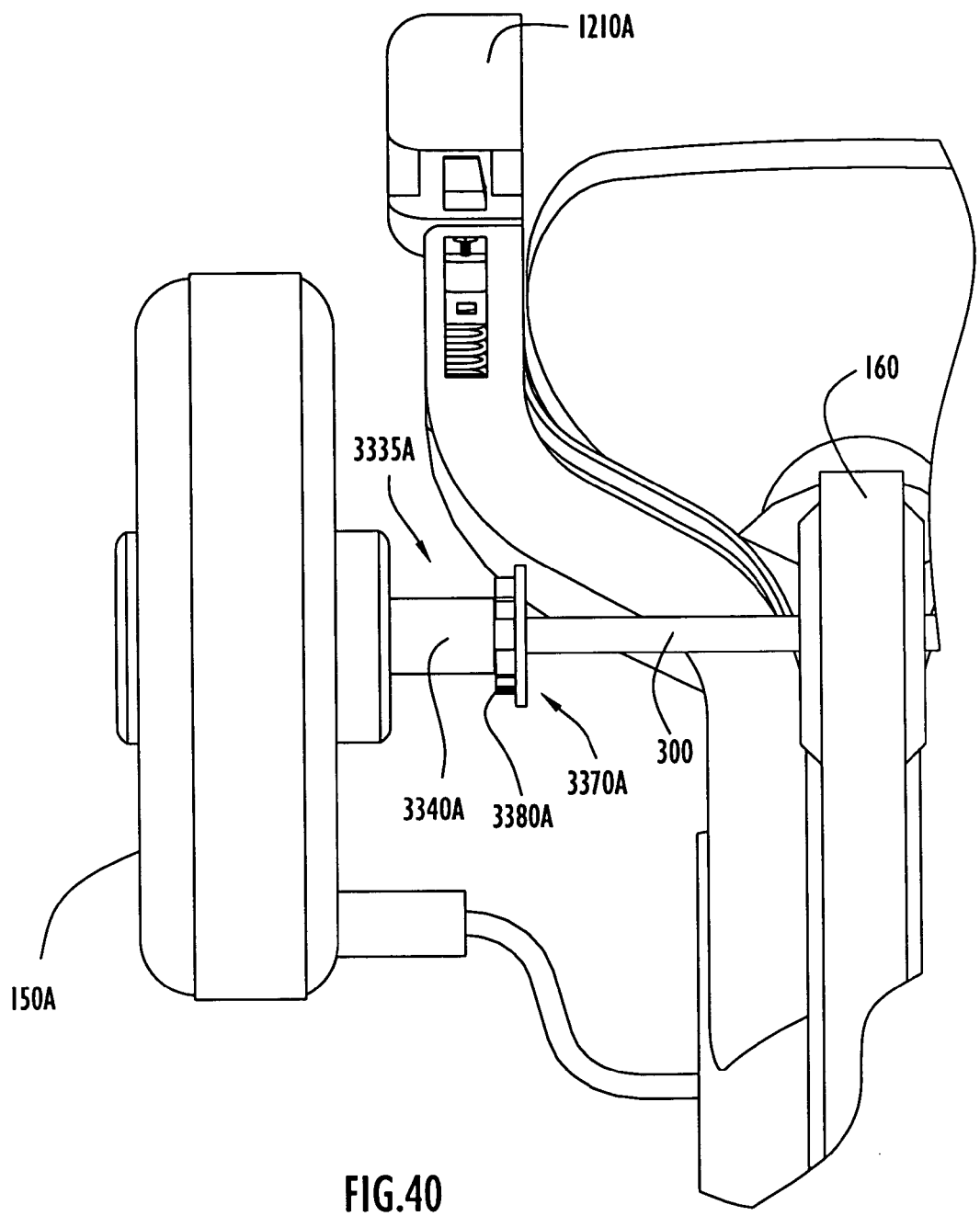
FIG. 40 illustrates an isolated bottom view of the children's ride-on vehicle of FIG. 32 showing the separation of one side of the rear wheel assembly from the slot of the frame member.
Figure 41:
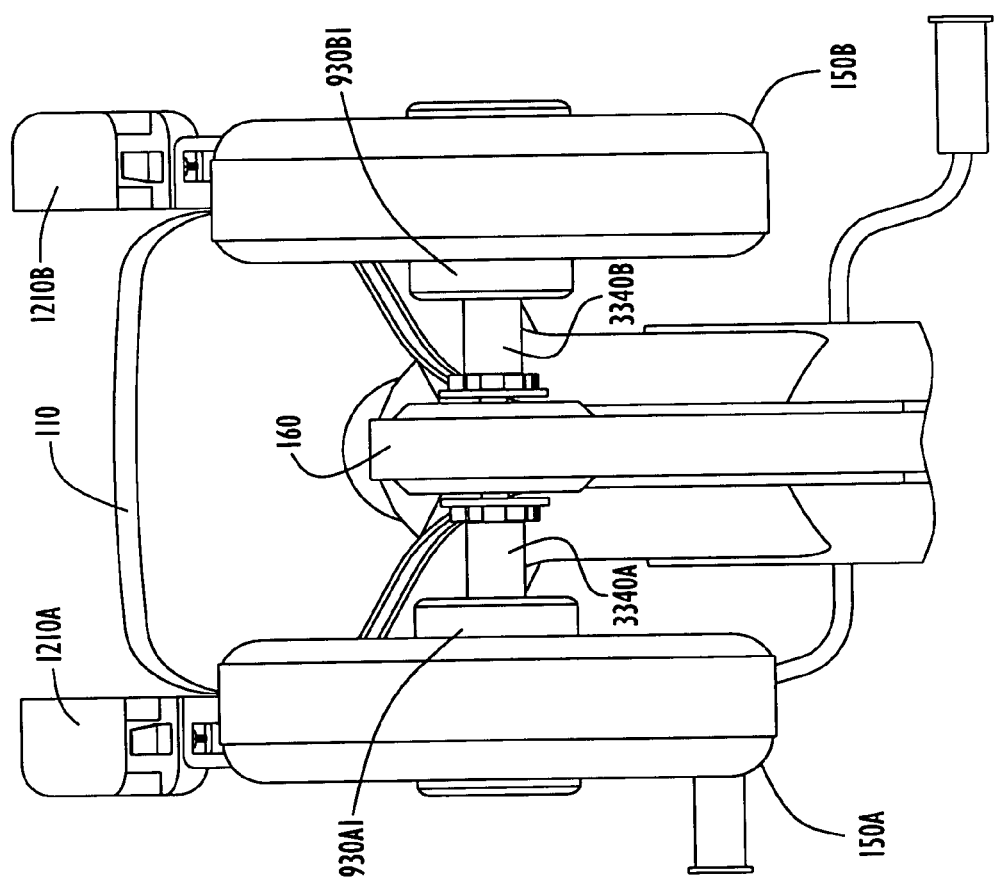
FIG. 41 illustrates a bottom view of the children's ride-on vehicle of FIG. 32 with the slide bushings positioned in their inner bicycle-like rider configuration and the wheels ready to be positioned in their inner bicycle-like rider configuration.

FIG. 40 illustrates an enlarged bottom view of one side of the children's ride-on vehicle 100 of FIG. 39 showing the separation between the slide bushing 3335A and the rear axle receiver 1210A. The wheels 150A, 150B of the device are ready to be adjusted along the rear axle 300 from the tricycle arrangement of FIGS. 38-40 into the bicycle configuration. FIG. 41 illustrates a bottom view of the children's ride-on vehicle 100 of FIG. 38 with the slide bushings 3335A, 3335B slid into their inner (bicycle) configuration. Adjustment of the slide bushings 3335A, 3335B between the position shown in FIG. 38 and the position shown in FIG. 41 is accomplished by holding the slide bushings 3335A, 3335B and sliding them toward the crank case 160 along the rear axle 300. The wheels 150A, 150B are also slid inward (toward each other along with their respective slide bushings 3335A, 3335B.

Figure 42:
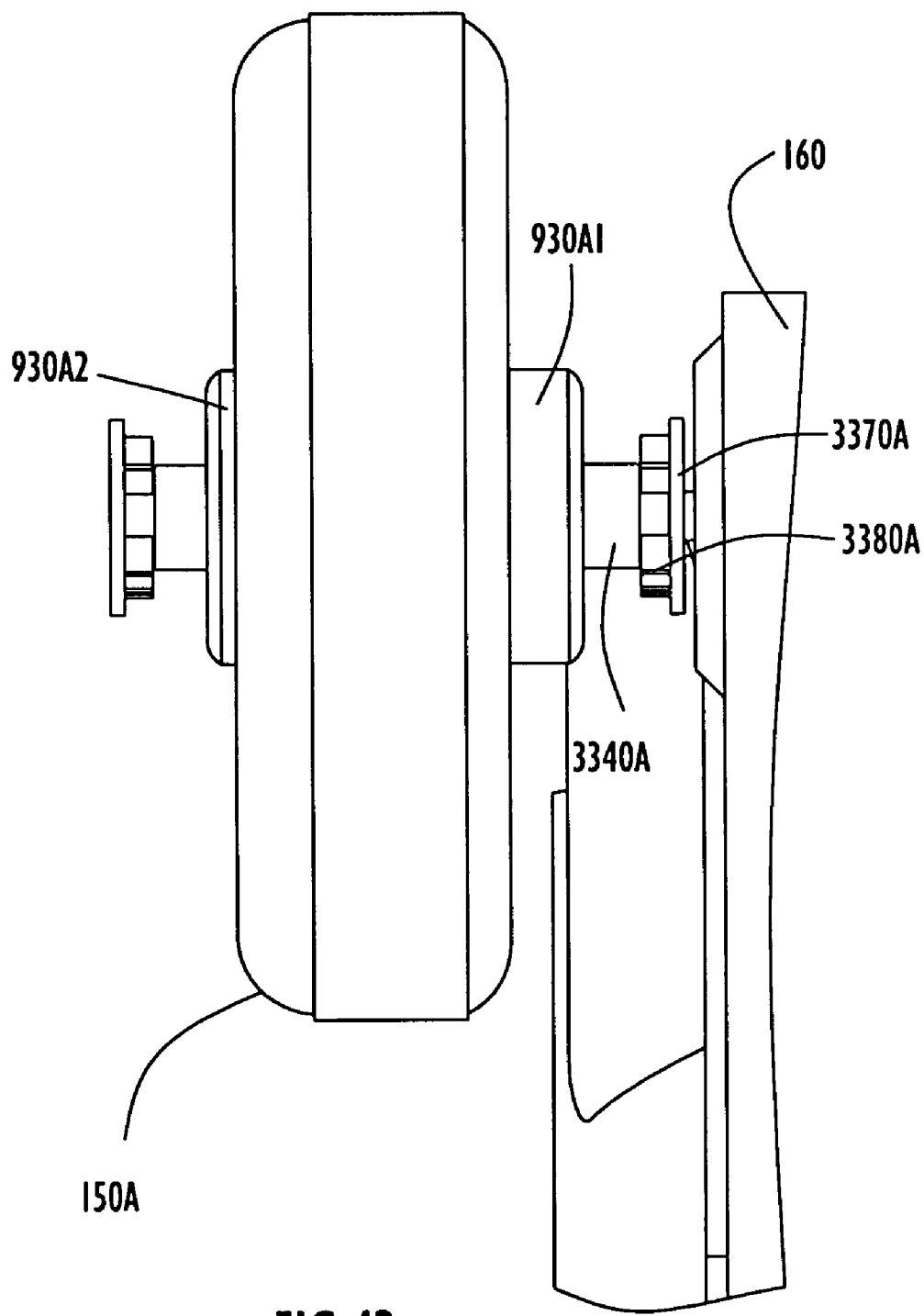
FIG. 42 illustrates an enlarged isolated bottom view of the children's ride-on vehicle of FIG. 32 showing a wheel about half way transitioned from an outer side (stabilized configuration) of the slide bushing to an inner side (bicycle-like configuration) of the slide bushing by sliding the wheel along the slide bushing.

FIG. 42 illustrates an enlarged bottom view of the children's ride-on vehicle 100 of FIG. 41 showing how a wheel 150A is slid along the slide surface 3340A toward the middle of the slide bushing 3335A. In the children's ride-on vehicle 100, wheels 150A, 150B are respectively mounted slidably on the slide bushings 3335A, 3335B so that the inner portions (not shown) of wheel hubs 930A1, 930A2, 930B1, 930B2 respectively bear against and slide along slide surfaces 3340A, 3340B of the slide bushings 3335A, 3335B. In other words, wheels 150A, 150B are slidably mounted on the slide bushings 3335A, 3335B between the pairs of flanges 3375A, 3375B. The slide bushings 3335A, 3335B, in turn, are slidably mounted between the ends of the rear axle 300. Again, FIG. 42 shows that each end of the slide bushings 3335A, 3335B includes respective flanges 3375A, 3375B with flange teeth 3380A, 3380B thereon for transferring torque to the wheels 150A, 150B. Again, the torque transfer will be discussed in greater detail below.

Figure 43:
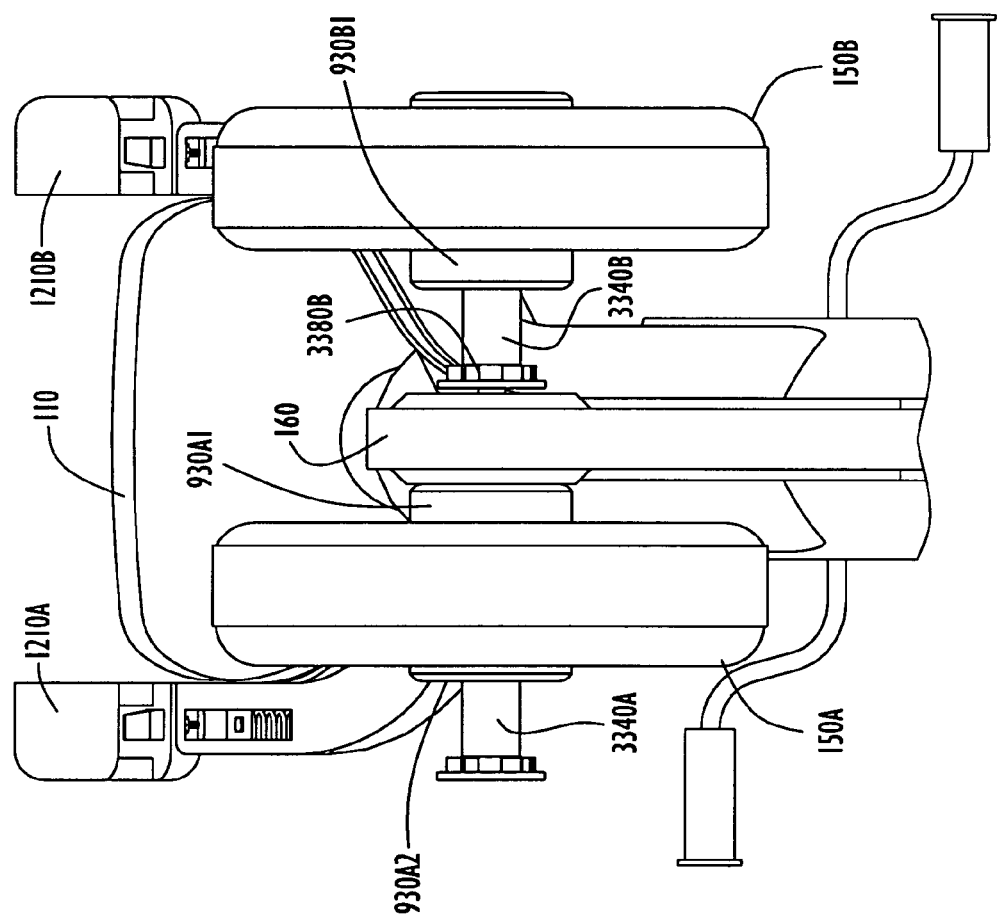
FIG. 43 illustrates a rear bottom view of the children's ride-on vehicle of FIG. 32 showing one wheel completely transitioned to the inner side (bicycle-like configuration) of the slide bushing against the crank case.
Figure 44:
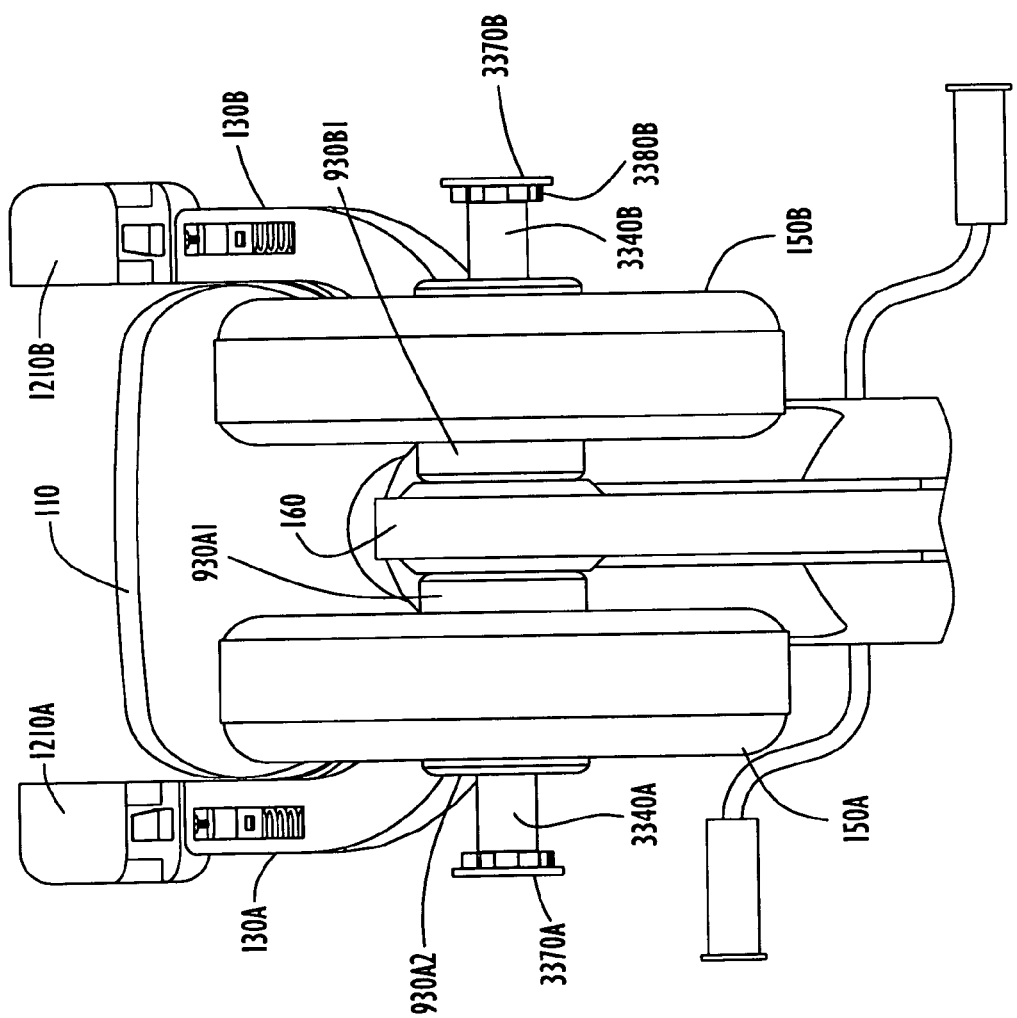
FIG. 44 illustrates a rear bottom view of the children's ride-on vehicle of FIG. 32 showing both rear wheels positioned inward on their respective slide bushings toward the crank case in the bicycle-like configuration.

FIG. 43 illustrates a rear bottom view of the children's ride-on vehicle 100 of FIG. 42 with both slide bushings 3335A, 3335B in the bicycle configuration. One wheel 150A, however, is completely slid inward along the slide bushing 3335A toward the crank case 160 into the bicycle configuration while the other wheel 150B remains in an outward position on its respective slide bushing 3335B. In the configuration of FIG. 43, a portion of the slide surface 3340A of the slide bushing 3335A is exposed on the outer side of wheel 150A. The wheel 150B has not yet been slid inward toward the crank case 160 along the slide surface 3340B into the bicycle configuration in the same way wheel 150A has already been positioned. FIG. 44 illustrates a rear bottom view of the children's ride-on vehicle 100 of FIG. 43 with both wheels 150A, 150B completely slid together along their respective slide bushings 3335A, 3335B toward the crank case 160 into the bicycle configuration.

FIG. 44 also shows how, after the wheels 150A, 150B have been completely slid together, outer portions of slide bushings 3335A, 3335B extend outwardly past the wheels 150A, 150B to expose outer portions of slide surfaces 3340A, 3340B. The rear axle 300 is dimensioned such that in the configuration of FIG. 44, the exposed outer portions of the slide bushings 3335A, 3335B are aligned with the slots 1200A, 1200B of the rear axle receivers 1210A, 1210B. The alignment between the slide bushings 3335A, 3335B and the rear axle receivers 1210A, 1210B is such that when the rear axle 300, crank case 160, and wheels 150A, 150B are pivoted back toward the frame members 130A, 130B, the slide bushings 3335A, 3335B can be received in the slots 1200A, 1200B of the rear axle receivers 1210A, 1210B and locked by the axle locks 3300A, 3300B.

Figure 45:
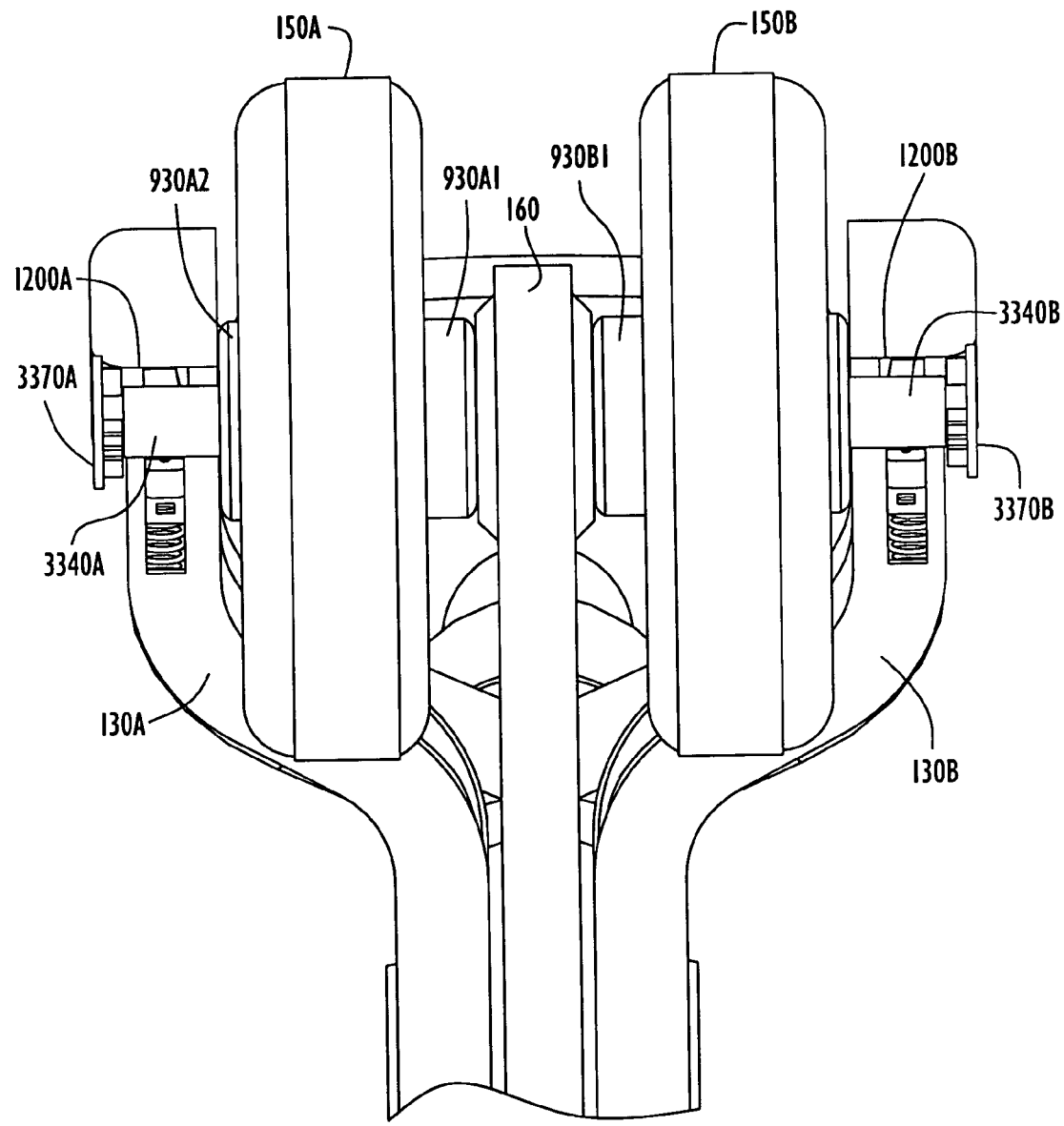
FIG. 45 illustrates a rear bottom view of the children's ride-on vehicle of FIG. 32 showing the rear wheel assembly in the bicycle-like configuration and showing the exposed outer portions of the slide bushings of the rear wheel assembly being repositioned in the slots of the frame members.
Figure 46:
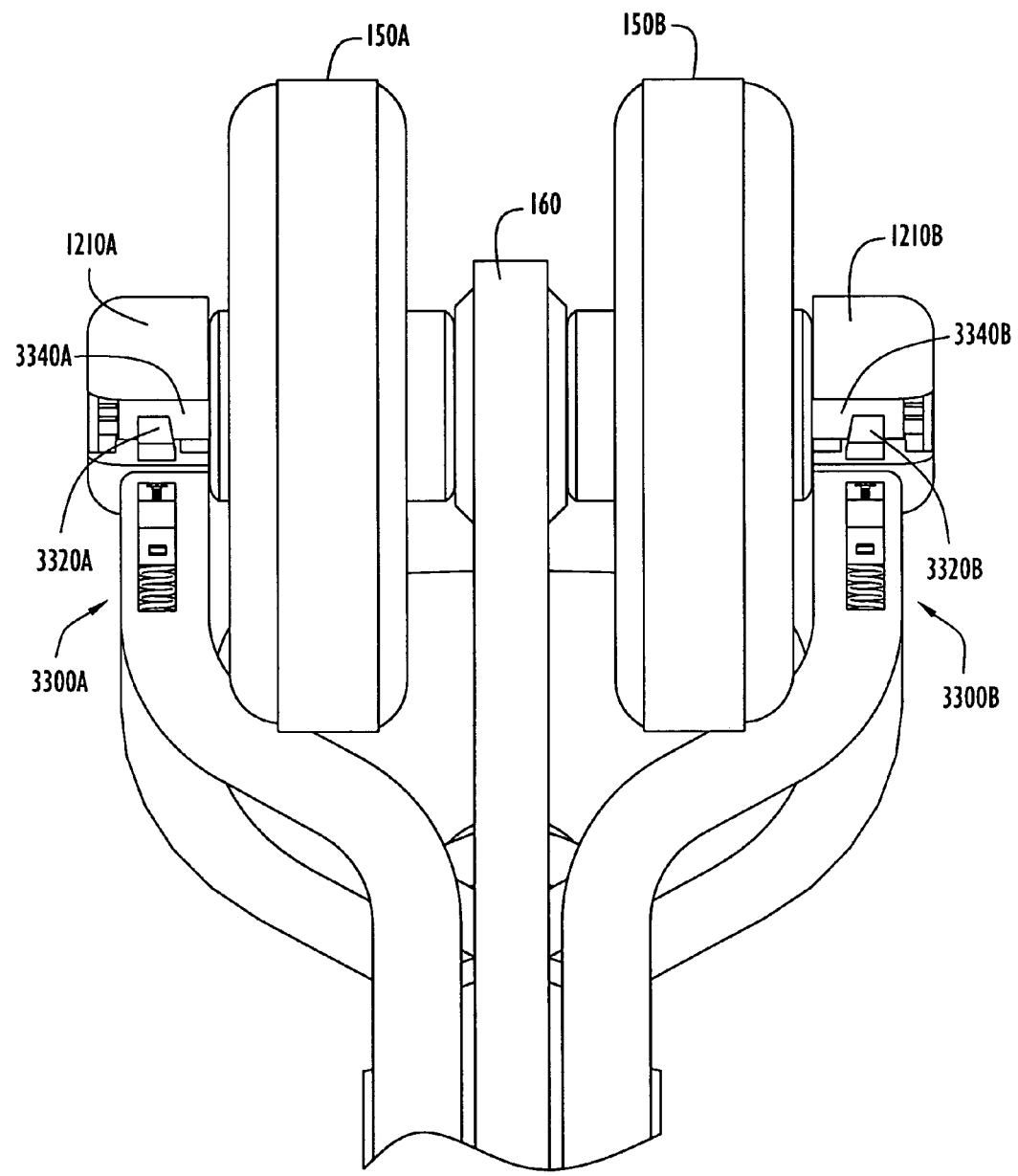
FIG. 46 illustrates a rear isolated bottom view of the children's ride-on vehicle of FIG. 32 showing the slide bushings of the rear wheel assembly repositioned in their respective slots and secured with the axle locks.

FIG. 45 illustrates a rear bottom view of the children's ride-on vehicle 100 of FIG. 44 showing the exposed outer portions of the slide bushings 3335A, 3335B being repositioned in the slots 1200A, 1200B of their respective frame members 130A, 130B in the bicycle configuration (where the rear axle 300, crank case 160, and wheels 150A, 150B have been pivoted all the way back into contact with the frame members 130A, 130B). FIG. 46 illustrates a rear bottom view of the children's ride-on vehicle 100 of the present invention showing the wheels 150A, 150B in the bicycle configuration with the slide bushings 3335A, 3335B fully repositioned in their respective slots 1200A, 1200B and secured with their respective axle locks 3300A, 3300B.

Figure 47:
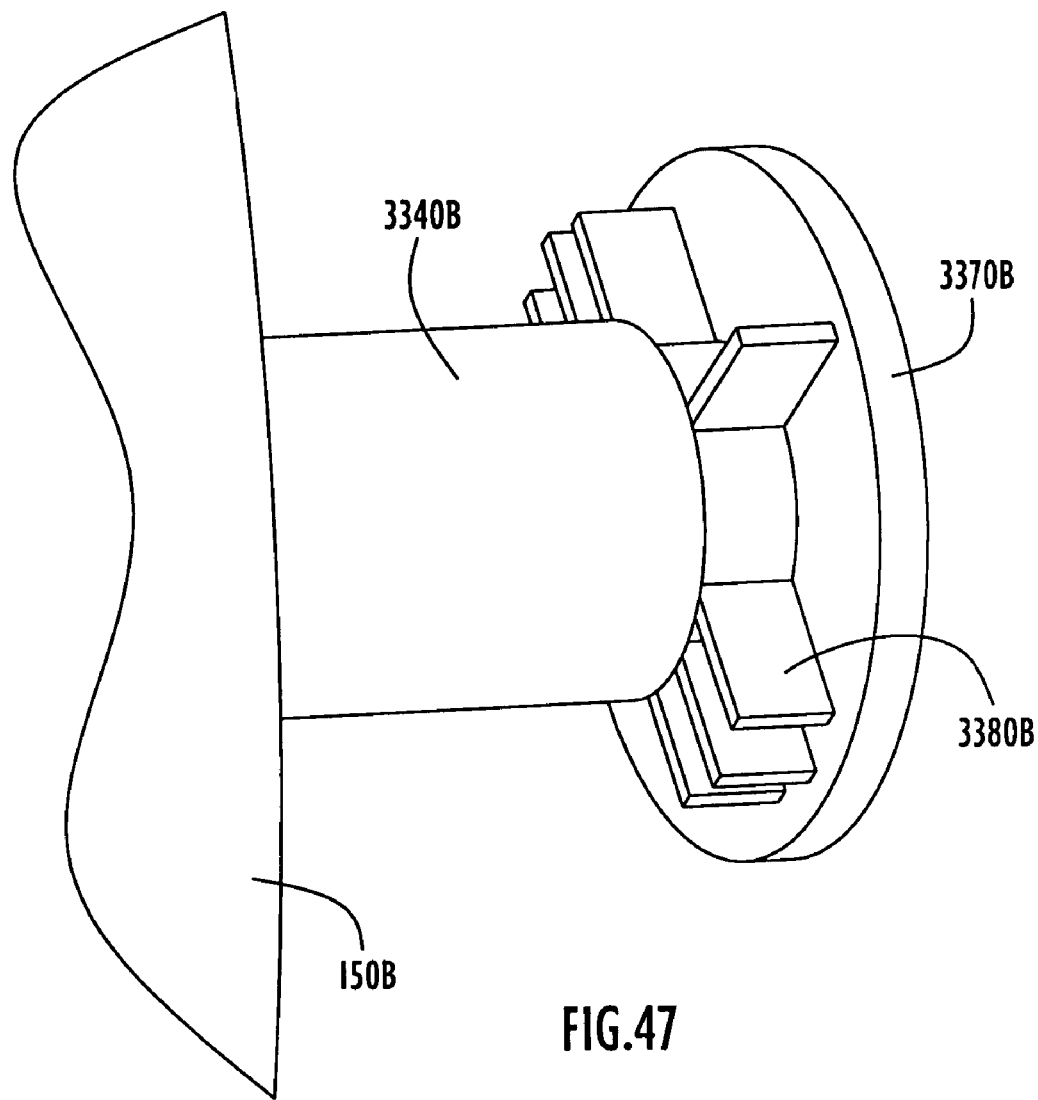
FIG. 47 illustrates a close-up isolated perspective view of the slide bushings of the children's ride-on vehicle of FIG. 32 showing the a portion of a wheel, a slide surface, a flange, and flange teeth.
Figure 48:
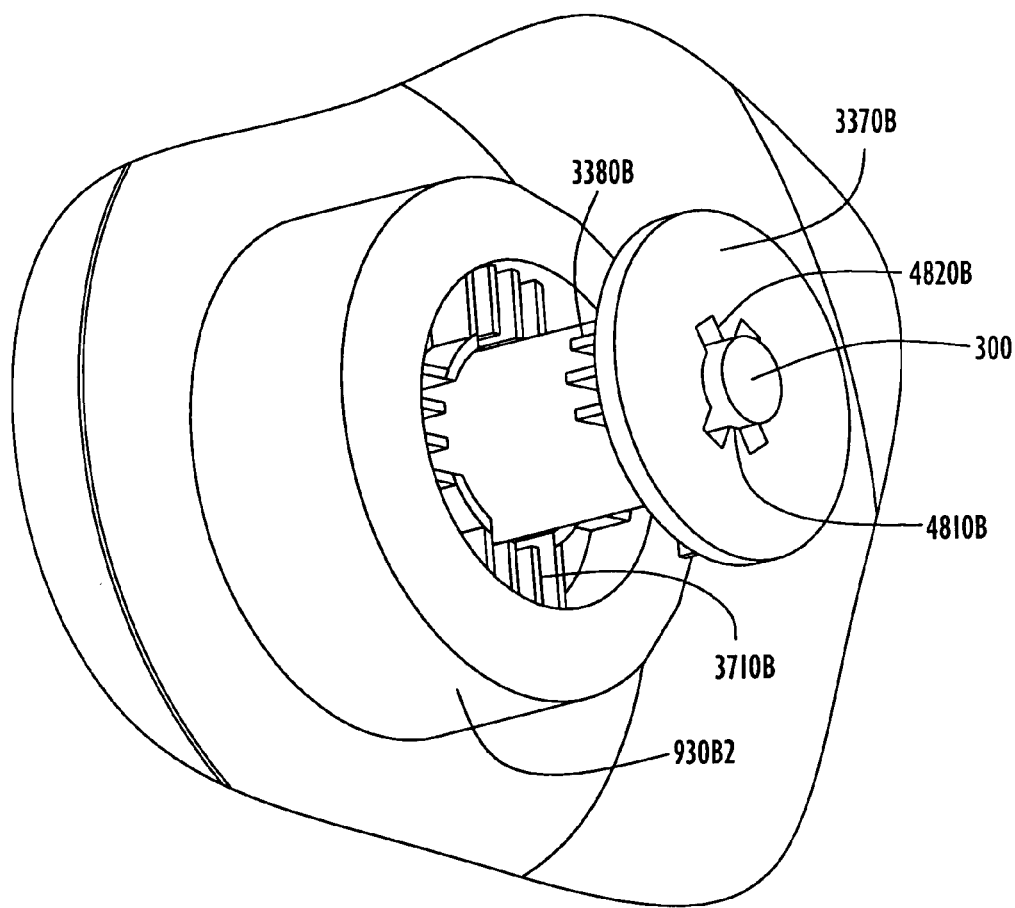
FIG. 48 illustrates an isolated close-up perspective view of a geared hub (on a portion of a wheel), a slide bushing, and the rear wheel axle of the children's ride-on vehicle of FIG. 32.

The present invention children's ride-on vehicle 100 is propelled by a rider turning the pedals with their feet. Propulsion force from the rider's feet is transferred to at least one of the rear wheels 150A, 150B in the following manner. The pedals are pivotally connected to a pedal crank axle 820 that is in turn connected to a first pulley or sprocket 830. The first pulley or sprocket 830 is connected to a belt or chain (not shown) that is linked with and turns a second pulley or sprocket 840 connected to the rear axle 300 to rotate the rear axle 300. FIG. 47 illustrates an enlarged perspective view of an extended end of a slide bushing 3335B of the children's ride-on vehicle 100 of FIG. 32 showing the flange 3375B, flange teeth 3380B, and a portion of the slide surface 3340B. FIG. 48 illustrates an enlarged perspective view of the core 3370B of the slide bushing 3335B and the rear axle 300 of the children's ride-on vehicle 100 of FIG. 32. The core 3370B has an axial opening 4810B through which the rear axle 300 passes to enable the slide bushing 3335B to slide along the rear axle 300.

FIG. 49 illustrates a an enlarged view of the rear axle 300 of the children's ride-on vehicle 100 of the present invention showing the rear axle 300 having radially extending torque projections 4910B extending from the rear axle 300. The axial opening 4810B also has receiving slots 4820B communicating with the axial opening 4810B for slidably and axially receiving the torque projections 4910B of the rear axle 300. Therefore, when the rear axle 300 turns, the torque projections 4190B interlock with the receiving slots 4820B of the core 3370B to rotate the core 3370B. The flange teeth 3380B of the rotating core 3370B also rotate along with the core 3370B. Therefore, when a rider turns the pedals the rear axle 300 rotates to rotate the flange teeth 3380B of the core 3370B. Torque is then transferred to the wheel 150B when, for example, the flange teeth 3380B interlock with the hub teeth 3710B of wheel hubs 930B1, 930B2 as shown in FIG. 43.

As the children's ride-on vehicle 100 of the present invention is transformed between the first, stabilized riding mode (tricycle) and the first, bicycle mode, wheels 150A, 150B are driven by different combinations of hub teeth 3710A and 3710B with interlocking flange teeth 3380A and 3380B. Wheel 150A for example, as shown in FIG. 42, in transitioning to the tricycle mode, is slid away from the crank case 160 such that hub teeth 3710A (not shown in FIG. 42) on hub 930A2 engages with flange teeth 3380A. On the other hand, as shown in FIG. 42, in transition to the bicycle mode, wheel 150A is slid toward the crank case 160 such that hub teeth 3710A (not shown in FIG. 42) on the opposite side of wheel 150A on hub 930A1 engage with flange teeth 3380A on the opposite end of slide surface 3340A. Wheel 150B is alternately driven in a similar manner. For example, as shown in FIG. 44, wheel 150B has been slid toward the crank case 160 into the bicycle mode such that hub teeth 3710B (not shown in FIG. 44) on hub 930B1 engage flange teeth 3380B (not shown in FIG. 44, but shown in FIG. 43). Similarly, as shown in FIG. 44, wheel 150B must be slid away from the crank case 160 to the first stabilized riding mode such that hub teeth 3710B (not shown in FIG. 44) on the opposite side of wheel 150B on hub 930B2 engage flange teeth 3380B on the opposite end of slide surface 3340B.

In the configurations discussed above, the propulsion mechanism of the children's ride-on vehicle 100 drives both wheels. However, even though the present invention is capable of operating satisfactorily driving both wheels in the first, stabilized riding mode (tricycle), there are reasons why the ride-on vehicle may operate more efficiently if, for example in the first, stabilized riding mode, only one wheel is driven. When a vehicle turns, generally one rear wheel covers a larger distance than the other rear wheel. If at the same time the wheels are forced, for example, by a mechanical linkage (axle 300) to rotate at the same speed, wheel hop may occur in much the same way it occurs in a tight turning 4-wheel drive vehicle. To insure maximum ease of handling the ride-on device of the present invention can include a mechanism for driving both wheels in the bicycle configuration while driving only one wheel in the first, stabilized riding (tricycle) configuration.

As discussed above, the ride-on vehicle 100 generally drives both wheels 150A, 150B in the first, stabilized (tricycle) riding mode by respective engagement between hub teeth 3710A and flange teeth 3380A and between hub teeth 3710B and flange teeth 3380B. To eliminate propulsion to one or the other of the wheels 150A, 150B, engagement between hub teeth 3710A and flange teeth 3380A or engagement between hub teeth 3710B and flange teeth 3380B can be eliminated. This disengagement can be accomplished by eliminating any one of hub teeth 3710A, flange teeth 3380A, hub teeth 3710B or flange teeth 3380B on the outer sides of the wheels 150A, 150B. Such elimination would also not interfere with propulsion of both wheels 150A, 150B in the bicycle mode because unlike the first, stabilized riding mode, propulsion in bicycle mode involves hub teeth 3710A, flange teeth 3380A, hub teeth 3710B and flange teeth 3380B on the inner sides of the wheels 150A, 150B.

Thus, it is intended that the present invention cover the modifications and variations of this invention that come within the scope of the appended claims and their equivalents. For example, it is to be understood that terms such as "left", "right" "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

We claim:

1. A ride-on vehicle comprising:
   at least one front wheel;
   at least two rear wheels mounted on a rear wheel axle;
   pedals and a torque transfer system for transferring torque from said pedals to at least one of the rear wheels; and
   a frame member selectively positionable in a first position proximate said rear wheel axle and a second position spaced from said rear wheel axle, wherein said children's ride-on vehicle is configured to be converted from a first, stabilized riding position in which said rear wheels are spaced apart on said rear axle in a tricycle configuration, to a second bicycle-like riding position, in which said rear wheels are in close proximity to each other on said rear wheel axle.

2. The ride-on vehicle of claim 1, wherein said torque transfer system includes a drive chain or belt operatively connected to said rear axle, and wherein said torque transfer system is pivotable relative to said frame.

3. The ride-on vehicle of claim 1, further including a pivot member pivotally connected to said frame and said rear wheel axle such that said selective positioning between said first position and said second position includes pivoting said pivot member and said rear wheel axle relative to said frame member.

4. A ride-on vehicle comprising:
   at least one font wheel;
   at least two rear wheels mounted on a rear axle;
   a frame supported by said at least one front wheel and said at least two rear wheels;
   a torque input mechanism;
   a torque transfer mechanism for transferring torque from said torque input mechanism to at least one of said rear wheels;
   wherein the ride-on vehicle is convertible between a first tricycle configuration in which said rear wheels are spaced apart on said rear axle and a second bicycle configuration in which said rear wheels are in close proximity to each other on said rear axle.

5. The ride-on vehicle of claim 4 wherein, in said first tricycle configuration, said rear wheels are positioned outside of said frame and wherein, in said second bicycle configuration, said rear wheels are positioned inside said frame.

6. The ride-on vehicle of claim 4, wherein said rear axle and said rear wheels are separated from said frame to convert between said first tricycle configuration and said second bicycle configuration.

7. The ride-on vehicle of claim 6, wherein said torque input mechanism includes pedals, a pedal crank axle, and a drive chain or belt.

8. The ride-on vehicle of claim 7, wherein said torque input mechanism is operable to transfer torque between said pedal crank axle and said rear wheels.

9. The ride-on vehicle of claim 6, further including a pivot member pivotally connected to said frame and connected to said rear axle.

10. The ride-on vehicle of claim 9, wherein said rear axle and said rear wheels are separated from said frame by pivoting said pivot member about said frame to convert between said first tricycle configuration and said second bicycle configuration.

11. The ride-on vehicle of claim 5, wherein said frame includes a rear axle lock for releasably securing said rear axle to said frame.

12. The ride-on vehicle of claim 11, wherein said ride on vehicle is converted between said first tricycle configuration and said second bicycle configuration by unlocking said rear axle from said rear axle lock, pivoting said rear axle relative to said frame, pushing said rear wheels towards each other along said rear axle, pivoting said rear axle back to said rear axle lock and relocking said rear axle with said rear axle lock.

13. A ride-on vehicle comprising:
   at least one front wheel;
   at least two rear wheels mounted on a rear wheel axle;
   a frame member selectively positionable in a first position proximate said rear wheel axle and a second position spaced from said rear wheel axle, wherein said children's ride-on vehicle is configured to be converted from a first, stabilized riding position in which said rear wheels are spaced apart on said rear wheel axle in a tricycle configuration, to a second bicycle-like riding position, in which said rear wheels are in close proximity to each other on said rear wheel axle; and
   a pivot member pivotally connected to said frame member and said rear wheel axle such that said selective positioning between said first position and said second position includes pivoting said pivot member and said rear wheel axle relative to said frame member, wherein said pivot member includes a torque transfer system for transferring torque from an input device to at least one of the rear wheels.

14. The ride-on vehicle of claim 13, wherein said input device includes at least one of a pedal, a crank axle, and a drive chain or belt.

15. A ride-on vehicle comprising:
- at least one front wheel;
- at least two rear wheels mounted on a rear wheel axle; and
- a frame member selectively positionable in a first position proximate said rear wheel axle and a second position spaced from said rear wheel axle, wherein said children's ride-on vehicle is configured to be converted from a first, stabilized riding position in which said rear wheels are spaced apart on said rear wheel axle in a tricycle configuration, to a second bicycle-like riding position, in which said rear wheels are in close proximity to each other on said rear wheel axle; and
- pedals and a torque transfer system including a drive chain or belt operatively connected to said rear wheel axle, wherein said torque transfer system is pivotable relative to said frame.

* * * * *

UNITED STATES PATENT AND TRADEMARK OFFICE
CERTIFICATE OF CORRECTION

PATENT NO. : 7,597,331 B2 Page 1 of 1
APPLICATION NO. : 11/502632
DATED : October 6, 2009
INVENTOR(S) : Schulte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 321 days.

Signed and Sealed this

Twenty-eighth Day of September, 2010

David J. Kappos
*Director of the United States Patent and Trademark Office*